US011967452B2

(12) United States Patent
Wang et al.

(10) Patent No.: US 11,967,452 B2
(45) Date of Patent: Apr. 23, 2024

(54) COIL DEVICE

(71) Applicant: TDK CORPORATION, Tokyo (JP)

(72) Inventors: Chen Wang, Tokyo (JP); Syun Ashizawa, Tokyo (JP); Satoshi Sugimoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 129 days.

(21) Appl. No.: 17/404,146

(22) Filed: Aug. 17, 2021

(65) Prior Publication Data

US 2022/0051846 A1 Feb. 17, 2022

(30) Foreign Application Priority Data

Aug. 17, 2020 (JP) ................................ 2020-137581
Jul. 26, 2021 (JP) ................................ 2021-121897

(51) Int. Cl.

*H01F 27/28* (2006.01)
*H01F 27/02* (2006.01)
*H01F 27/24* (2006.01)
*H01F 27/32* (2006.01)
*H01F 41/12* (2006.01)

(52) U.S. Cl.

CPC ........... *H01F 27/327* (2013.01); *H01F 27/02* (2013.01); *H01F 27/24* (2013.01); *H01F 27/2866* (2013.01); *H01F 41/125* (2013.01)

(58) Field of Classification Search

CPC ...... H01F 27/30; H01F 27/303; H01F 27/306; H01F 27/24; H01F 27/02; H01F 27/327
USPC ........................................................ 336/199
See application file for complete search history.

(56) References Cited

U.S. PATENT DOCUMENTS 4,309,655 A 1/1982 Lienhard et al.
6,765,468 B2 * 7/2004 Chen ....................... H01F 17/04 336/83
7,248,139 B1 * 7/2007 Podlisk ............... H01F 27/2847 336/232
11,004,592 B2 * 5/2021 Bellur ..................... H01F 30/06
11,424,068 B2 * 8/2022 Toyama ................ H01F 27/027
11,437,184 B2 * 9/2022 Mori ................... H01F 27/2852
11,587,717 B2 * 2/2023 Wang .................... H01F 27/022
2004/0160298 A1 * 8/2004 Hsu ....................... H01F 27/292 336/83
2007/0176725 A1 8/2007 Podlisk et al.
2008/0169893 A1 7/2008 Sullivan et al.

(Continued)

FOREIGN PATENT DOCUMENTS

CN 205194485 U * 4/2016
CN 205194485 U 4/2016

(Continued)

OTHER PUBLICATIONS

Sep. 14, 2023 Office Action issued in U.S. Appl. No. 17/318,358.

(Continued)

*Primary Examiner* — Bickey Dhakal
*Assistant Examiner* — Joselito S. Baisa
(74) *Attorney, Agent, or Firm* — Oliff PLC

(57) ABSTRACT

A coil device includes a first conductor, a second conductor, and a core. The second conductor is disposed inside the first conductor and at least partly extending along the first conductor. The core internally arranges the first conductor and the second conductor. An insulating layer is formed at least between the first conductor and the second conductor.

26 Claims, 41 Drawing Sheets

(56) References Cited

U.S. PATENT DOCUMENTS

| | | | |
|---|---|---|---|
| 2017/0345545 A1 | 11/2017 | Liu et al. | |
| 2018/0336986 A1 | 11/2018 | Xin et al. | |
| 2019/0027288 A1 | 1/2019 | Sato et al. | |
| 2019/0237245 A1 | 8/2019 | Ashizawa et al. | |
| 2019/0272945 A1* | 9/2019 | Arai | H01F 27/292 |
| 2020/0279688 A1 | 9/2020 | Toyama et al. | |

FOREIGN PATENT DOCUMENTS

| | | | | | |
|---|---|---|---|---|---|
| DE | 102019215525 | A1 | * | 4/2021 | H01F 17/06 |
| JP | 2004087607 | A | * | 3/2004 | |
| JP | 2007-184509 | A | | 7/2007 | |
| JP | 2010-073523 | A | | 4/2010 | |
| JP | 2019-134147 | A | | 8/2019 | |
| JP | 2020145414 | A | * | 9/2020 | H01F 17/06 |
| TW | I677887 | B | | 11/2019 | |
| TW | M585974 | U | | 11/2019 | |
| TW | I690953 | B | | 4/2020 | |
| WO | 9217892 | A1 | | 10/1992 | |
| WO | WO-2019119046 | A1 | * | 6/2019 | H01F 27/12 |

OTHER PUBLICATIONS

Feb. 29, 2024 Office Action issued in U.S. Appl. No. 17/318,637.

English Translation of Foreign Patent Document No. CN205194485U published by CNIPA on Apr. 27, 2016.

* cited by examiner

COIL DEVICE

BACKGROUND OF THE INVENTION

The present invention relates to a coil device used as, for example, an inductor.

As a coil device used as an inductor or so, for example, a coil device described in Patent Document 1 is known. The coil device described in Patent Document 1 includes two conductors and a core for internally arranging the two conductors. In the coil device described in Patent Document 1, the magnetic coupling between the two conductors is increased by forming a region in which no magnetic material is disposed between the two conductors.

In the coil device described in Patent Document 1, however, it is difficult to sufficiently increase the magnetic coupling between the two conductors due to the configuration, and required is a technique that can sufficiently increase the magnetic coupling between the two conductors.

Patent Document 1: JP2007184509 (A)

BRIEF SUMMARY OF INVENTION

The present invention has been achieved under such circumstances. It is an object of the invention to provide a coil device having a sufficiently large magnetic coupling.

To achieve the above object, a coil device according to a first aspect of the present invention comprises:

a first conductor;

a second conductor disposed inside the first conductor and at least partly extending along the first conductor; and a core for internally arranging the first conductor and the second conductor, wherein an insulating layer is formed at least between the first conductor and the second conductor.

The coil device according to the first aspect of the present invention includes a first conductor and a second conductor disposed inside the first conductor and at least partly extending along the first conductor, and an insulating layer is formed at least between the first conductor and the second conductor. In this case, the first conductor and the second conductor are arranged while overlapping with each other (double) with a predetermined interval. Under such an arrangement, the magnetic flux can efficiently be transmitted between the first conductor and the second conductor, and the magnetic coupling between the first conductor and the second conductor can be increased sufficiently. In addition, since the first conductor and the second conductor are sufficiently insulated via the insulating layer existing therebetween, it is possible to prevent a short-circuit failure generated between the first conductor and the second conductor, and the coil device can have a high reliability.

Preferably, the second conductor is made of a flat wire, and the insulating layer is made of an insulating film formed on a surface of the second conductor. When a flat wire with an insulating film is used as the second conductor, the insulating layer can exist between the first conductor and the second conductor by simply disposing the second conductor inside the first conductor in an overlapping manner, and the above-mentioned effect can be obtained easily.

Preferably, the first conductor and the second conductor are adhered via a fusion layer formed by fusing the insulating layer formed on a surface of the second conductor. In this structure, the insulating layer made of the fusion layer can be filled in the space between the first conductor and the second conductor without gaps, and the first conductor and the second conductor can be insulated sufficiently.

Preferably, the insulating layer is formed between the core and the first conductor or the second conductor. In this structure, since the core and the first or second conductor are sufficiently insulated via the insulating layer existing therebetween, it is possible to prevent a short-circuit failure generated between the core and the first or second conductor, and the coil device can have a high reliability.

Preferably, the first conductor is made of a conductive plate with a plating layer formed on a surface of the conductive plate. In this structure, a connection member, such as solder and conductive adhesive agent, easily adheres to the surface of the first conductor, and the first conductor can firmly be connected to a mounting surface of a mounting board. In particular, when the connection member is solder, a solder fillet can easily be formed on the side surface of the first conductor, and the first conductor and the mounting surface of the mounting board can thereby firmly be connected.

Preferably, the second conductor includes a mount facing surface capable of facing a mounting surface, the mount facing surface consists of a joinable surface not including the insulating layer and a non-joinable surface including the insulating layer, and the non-joinable surface is located closer to the first conductor than the joinable surface. In this case, the above-mentioned connection member easily adheres to the joinable surface, but does not easily adhere to the non-joinable surface. Thus, the non-joinable surface can prevent the connection member adhered to the joinable surface from protruding toward the first conductor, and it is possible to effectively prevent a short-circuit failure generated between the first conductor and the second conductor.

Preferably, the joinable surface includes a standing part standing from the mounting surface. In this structure, the connection member can be attached not only to an opposite surface to the mounting surface of the mounting board, but also to the standing part of the mounting part. Thus, when the connection member is solder, a solder fillet can be formed on the standing part of the joinable surface, and the second conductor can firmly be connected to the mounting surface of the mounting board. In the above-mentioned structure, it is possible to prevent formation of, for example, solder balls on the mounting part of the second conductor.

Preferably, an outer bending part bending outward is provided at an end of the first conductor, an inner bending part bending inward is provided at an end of the second conductor, and a radius of curvature of an inner surface of the outer bending part is larger than that of an outer surface of the inner bending part. In this case, a bending angle of the inner surface of the outer bending part (the inner surface of the first conductor at the position of the outer bending part) is smaller than that of the outer surface of the inner bending part (the outer surface of the second conductor at the position of the inner bending part). Thus, the outer surface of the inner bending part bends sharply near the mounting surface of the mounting board, but the inner surface of the outer bending part bends gently from a position away from the mounting surface of the mounting board. Thus, a comparatively large space is formed between the inner surface of the outer bending part and the outer surface of the inner bending part, and it is possible to effectively prevent a short-circuit failure generated between the first conductor and the second conductor in the surroundings of the mounting surface of the mounting board.

Preferably, a cross-sectional area of the first conductor perpendicular to its extending direction is larger than that of the second conductor perpendicular to its extending direction. In this structure, the DC resistance of the first conductor can be smaller than that of the second conductor.

Preferably, a bottom surface of the core is disposed away from a mounting surface. In this structure, it is possible to sufficiently secure the insulation between the bottom surface of the core and the mounting surface of the mounting board. In particularly, when the core is made of a metal magnetic material or so, it is possible to effectively prevent a short-circuit failure generated between the bottom surface of the core and the mounting surface of the mounting board.

Preferably, an insulating coating layer is provided at least on a bottom surface of the core. In this structure, the insulating coating layer can sufficiently insulate between the bottom surface of the core and the second conductor (or the first conductor) and between the bottom surface of the core and the mounting surface of the mounting board.

Preferably, a mounting part of the first conductor and a mounting part of the second conductor are insulated by a resin spacer. In this structure, it is possible to effectively prevent a short-circuit failure generated between the first mounting part and the second mounting part.

To achieve the above object, a coil device according to a second aspect of the present invention comprises:

- a first conductor including a first outer mounting part formed at one end and a second outer mounting part formed at the other end;
- a second conductor disposed inside the first conductor and including a first inner mounting part formed at one end and a second inner mounting part formed at the other end;
- a core for internally arranging the first conductor and the second conductor; and
- a resin spacer including:
  - a first side insulating part disposed between the first outer mounting part and the first inner mounting part; and
  - a second side insulating part disposed between the second outer mounting part and the second inner mounting part.

The coil device according to the second aspect of the present invention includes: a first conductor including a first outer mounting part formed at one end and a second outer mounting part formed at the other end; and a second conductor disposed inside the first conductor and including a first inner mounting part formed at one end and a second inner mounting part formed at the other end. That is, in the coil device according to the second aspect of the present invention, similarly to the coil device according to the first aspect of the present invention, the first conductor and the second conductor are arranged while overlapping with each other (double) with a predetermined interval. Under such an arrangement, the magnetic flux can efficiently be transmitted between the first conductor and the second conductor, and the magnetic coupling between the first conductor and the second conductor can be increased sufficiently.

In addition, the coil device according to the second aspect of the present invention includes: a resin spacer including: a first side insulating part disposed between the first outer mounting part and the first inner mounting part; and a second side insulating part disposed between the second outer mounting part and the second inner mounting part. Since the first side insulating part is disposed between the first outer mounting part and the first inner mounting part, the insulation distance therebetween can be secured sufficiently via the first side insulating part, and the first outer mounting part and the first inner mounting part can be insulated sufficiently. Likewise, since the second side insulating part is disposed between the second outer mounting part and the second inner mounting part, the insulation distance therebetween can be secured sufficiently via the second side insulating part, and the second outer mounting part and the second inner mounting part can be insulated sufficiently. Thus, it is possible to prevent a short-circuit failure generated between the first conductor and the second conductor, and the coil device can have a high reliability.

Preferably, a bottom surface of the resin spacer is disposed higher than bottom surfaces of the first inner mounting part and the second inner mounting part and is disposed higher than bottom surfaces of the first outer mounting part and the second outer mounting part. In such a configuration, when the coil device is mounted on the mounting board in a state where the resin spacer is attached, the resin spacer can be prevented from interfering (contacting) with the mounting board, and the mounting strength between the coil device and the mounting board can be secured sufficiently.

Preferably, the resin spacer includes an inner insulating part disposed between one end and the other end of the second conductor and disposed between a bottom surface of the core and the first inner mounting part or between the bottom surface of the core and the second inner mounting part. When the inner insulating part is (partly) disposed between the bottom surface of the core and the first inner mounting part, the insulation distance therebetween can be secured sufficiently via the inner insulating part, and the bottom surface of the core and the first inner mounting part can be insulated sufficiently. Likewise, when the inner insulating part is (partly) disposed between the bottom surface of the core and the second inner mounting part, the insulation distance therebetween can be secured sufficiently via the inner insulating part, and the bottom surface of the core and the second inner mounting part can be insulated sufficiently.

When the inner insulating part is (partly) disposed between the bottom surface of the core and the first inner mounting part so as to fill the space therebetween with (a part of) the inner insulating part, it is possible to effectively prevent a problem that the first inner mounting part and the bottom surface of the core are connected by a solder ball in connecting the first inner mounting part to a land pattern of the mounting board with, for example, solder (generation of short-circuit failure). Likewise, when the inner insulating part is (partly) disposed between the bottom surface of the core and the second inner mounting part so as to fill the space therebetween with (a part of) the inner insulating part, it is possible to effectively prevent a problem that the second inner mounting part and the bottom surface of the core are connected by a solder ball in connecting the second inner mounting part to a land pattern of the mounting board with, for example, solder (generation of short-circuit failure).

A first gap may be formed between the first side insulating part and one end of the inner insulating part in a first direction, a second gap may be formed between the second side insulating part and the other end of the inner insulating part in the first direction, the first side insulating part, the second side insulating part, and the inner insulating part may extend in a second direction perpendicular to the first direction, and the resin spacer may include a first connection part connecting one ends in the second direction of the first side insulating part, the second side insulating part, and the inner insulating part along the first direction. In such a configuration, one end of the second conductor can be engaged with the resin spacer via the first gap, and the other end of the second conductor can be engaged with the resin spacer via the second gap. Thus, the resin spacer is easily attached to the second conductor. When the first side insulating part, the second side insulating part, and the inner insulating part are connected by the connection part, it is possible to configure the resin spacer in which these are integrated via the connection part, and it is easier to attach the resin spacer to the second conductor as compared with the case where these are configured separately.

Preferably, a first outer inclined part inclined so as to be lower outward in the second direction is formed on at least one of an upper surface and a lower surface of the first connection part. After the resin spacer is attached to the second conductor, for example, when a treatment for attaching the first conductor and the second conductor to the core is carried out, the above-mentioned configuration can prevent the connection part of the resin spacer from interfering (contacting) with, for example, the bottom surface of the core during the treatment and can easily carry out the treatment.

Preferably, a second outer inclined part inclined so as to be lower outward in the second direction is formed on at least one of an upper surface and a lower surface of the inner insulating part at the other end of the inner insulating part located opposite to the first connection part in the second direction. In such a configuration, it is also possible to prevent the inner insulating part of the resin spacer from interfering (contacting) with, for example, the bottom surface of the core in the attachment of the resin spacer to the second conductor, and the resin spacer is attached smoothly.

Preferably, a width of the inner insulating part in the first direction becomes smaller toward outside in the second direction at the other end of the inner insulating part located opposite to the first connection part in the second direction. In such a configuration, it is possible to prevent both ends of the resin spacer in the first direction from interfering (contacting) with one end and the other end of the second conductor in the attachment of the resin spacer to the second conductor, and the resin spacer is attached smoothly.

Preferably, the resin spacer includes a protrusion part protruding from a bottom surface of the resin spacer and at least partly disposed between a first tip of the first inner mounting part and a second tip of the second inner mounting part. In such a configuration, the first tip and the second tip can be insulated favorably via the protrusion part, and it is possible to prevent a problem that they are connected by, for example, a solder ball (generation of short-circuit failure).

Preferably, a first step surface located on one side of the protrusion part and a second step surface located on the other side of the protrusion part are formed on the bottom surface of the resin spacer, the first inner mounting part is in contact with the first step surface, and the second inner mounting part is in contact with the second step surface. In such a configuration, the first inner mounting part is fixed to the first step surface, the second inner mounting part is fixed to the second step surface, and the resin spacer can thereby be attached to the second conductor in a stable state.

A first gap may be formed between the first side insulating part and one end of the inner insulating part in a first direction, a second gap may be formed between the second side insulating part and the other end of the inner insulating part in the first direction, the first side insulating part, the second side insulating part, and the inner insulating part may extend in a second direction perpendicular to the first direction, and the resin spacer may include: a first connection part connecting one ends in the second direction of the first side insulating part, the second side insulating part, and the inner insulating part along the first direction; and a second connection part connecting the other ends in the second direction of the first side insulating part, the second side insulating part, and the inner insulating part along the first direction.

In such a configuration, the first gap is surrounded by the first side insulating part, one end of the inner insulating part in the first direction, the first connection part, and the second connection part, and the second gap is surrounded by the second side insulating part, the other end of the inner insulating part in the first direction, the first connection part, and the second connection part. The resin spacer can be attached to the core in a stable state by, for example, fixing the resin spacer to the bottom surface of the core in a state where one end and the other end of the second conductor are inserted in the first gap and the second gap, respectively.

Preferably, a first concave part located on one side in the second direction and a second concave part located on the other side in the second direction are formed on a bottom surface of the resin spacer, the first inner mounting part is housed in the first concave part, and the second inner mounting part is housed in the second concave part. When the first inner mounting part is housed in the first concave part and the second inner mounting part is housed in the second concave part, the first inner mounting part and the second inner mounting part can be prevented from being exposed outside and can be insulated favorably.

The resin spacer may include a first arm part standing from the first connection part and a second arm part standing from the second connection part, a first convex part protruding inward in the first direction may be formed at a tip of the first arm part, a second convex part protruding inward in the first direction may be formed at a tip of the second arm part, a first concave part may be formed on a side surface of the core on one side in the first direction, a second concave part may be formed on a side surface of the core on the other side in the first direction, the first convex part may engage with the first concave part, and the second convex part may engage with the second concave part. The first arm part can be fixed to the side surface of the core on one side in the first direction by engaging the first convex part with the first concave part. Likewise, the second arm part can be fixed to the side surface of the core on the other side in the first direction by engaging the second convex part with the second concave part. As a result, the resin spacer can be fixed to the core via the first arm part and the second arm part.

Preferably, a third inclined part inclined so as to be lower outward is formed at a position facing the first outer mounting part on a surface of the first side insulating part, and a fourth inclined part inclined so as to be lower outward is formed at a position facing the second outer mounting part on a surface of the second side insulating part. The first side insulating part can be prevented from interfering (contacting) with the first outer mounting part by forming the third inclined part on the surface of the first side insulating part. Likewise, the second side insulating part can be prevented from interfering (contacting) with the second outer mounting part by forming the fourth inclined part on the surface of the second side insulating part.

One of the first inner mounting part and the first outer mounting part may have a bent shape bent in a substantially L-shaped manner, the other of the first inner mounting part and the first outer mounting part may have a substantially linear shape, one of the second inner mounting part and the second outer mounting part may have a bent shape bent in a substantially L-shaped manner, and the other of the second inner mounting part and the second outer mounting part may have a substantially linear shape. For example, when the first inner mounting part and the second inner mounting part have a substantially linear shape, the first conductor can have a simple shape and is processed easily. When the first outer mounting part and the second outer mounting part have a bent shape (substantially L shape), the second conductor can be connected to a land pattern of the mounting board in a stable state.

DETAILED DESCRIPTION OF INVENTION

Hereinafter, the present invention is explained based on embodiments shown in the figures.

First Embodiment

Figure 1A:
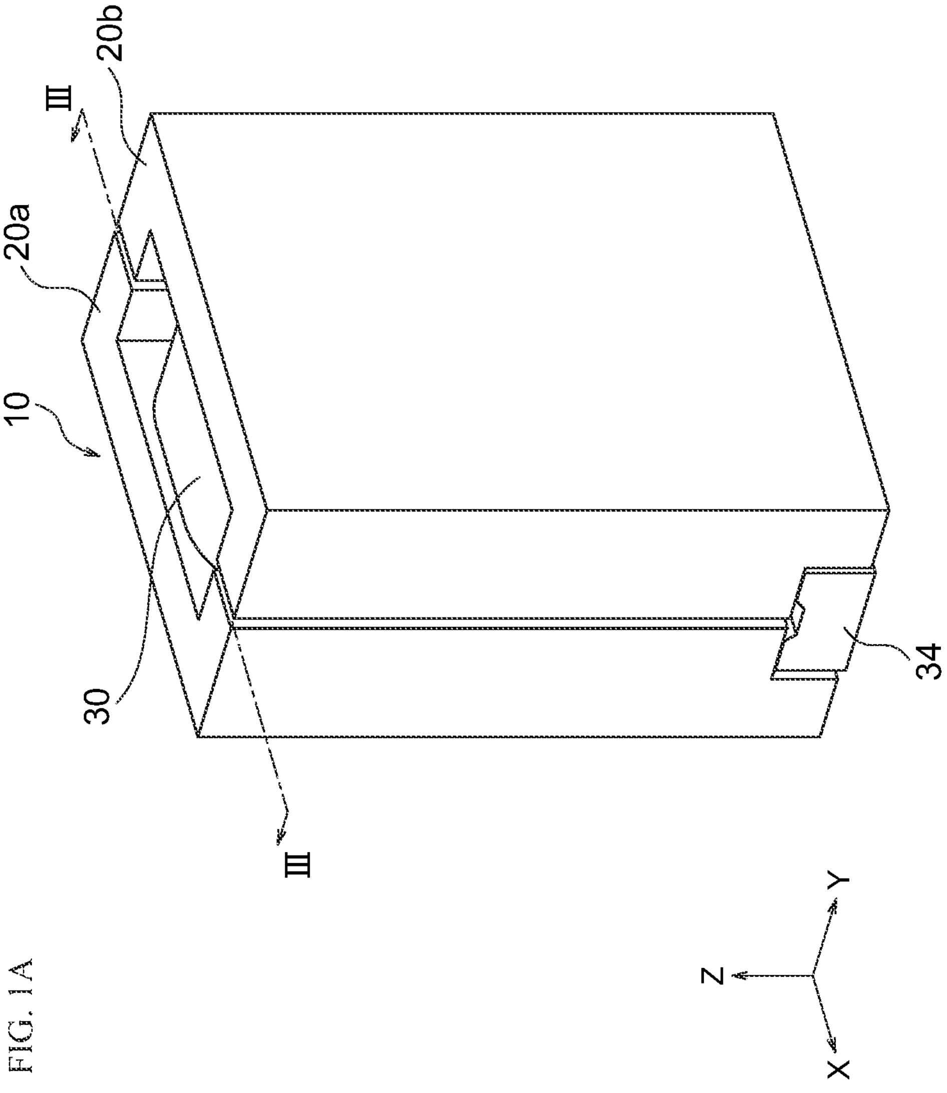
FIG. 1A is a perspective view of a coil device according to First Embodiment of the present invention.

As shown in FIG. 1A, a coil device 10 according to First Embodiment of the present invention has a substantially rectangular parallelepiped shape and functions as a combined coil used for power supply circuits or so. Preferably, the coil device 10 has a width of 3.0-20.0 mm in the X-axis direction, a width of 3.0-20.0 mm in the Y-axis direction, and a width of 3.0-20.0 mm in the Z-axis direction.

Figure 2:
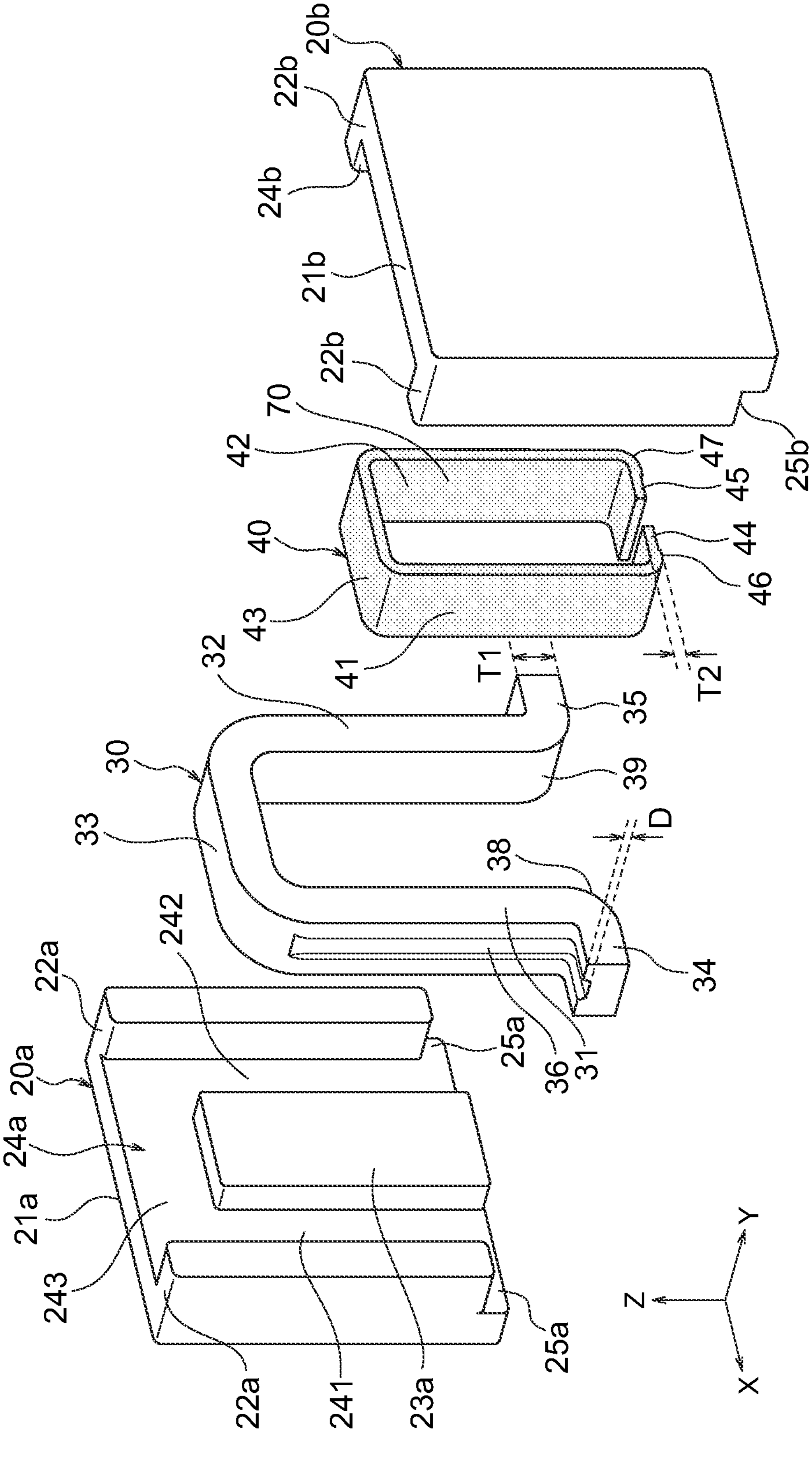
FIG. 2 is an exploded perspective view of the coil device shown in FIG. 1A.

As shown in FIG. 2, the coil device 10 includes a first core 20*a*, a second core 20*b*, a first conductor 30, and a second conductor 40. Either one of the conductors 30 and 40 functions as a primary coil, and the other one of the conductors 30 and 40 functions as a secondary coil. The details of the conductors 30 and 40 are explained below.

The first core 20*a* and the second core 20*b* have the same shape and have what is called an E shape. The first core 20*a* and the second core 20*b* are arranged to face each other in the Y-axis direction and are joined with adhesive agent or so. The first core 20*a* and the second core 20*b* are made of magnetic material and are manufactured by molding and sintering, for example, a magnetic material having a comparatively high permeability, such as Ni—Zn based ferrite and Mn—Zn based ferrite, or a magnetic powder made of metal magnetic material.

The first core 20*a* includes a first base 21*a*, a pair of first outer legs 22*a* and 22*a*, a first middle leg 23*a* disposed between the pair of first outer legs 22*a* and 22*a*, a first groove 24*a*, and first side grooves 25*a* and 25*a*. The first base 21*a* has a substantially flat plate shape (substantially rectangular parallelepiped shape).

The pair of first outer legs 22*a* and 22*a* is formed at one end and the other end of the first base 21*a* in the X-axis direction with a predetermined interval in the X-axis direction. The first outer legs 22*a* and 22*a* protrude from one surface of the first base 21*a* in the Y-axis direction toward one side in the Y-axis direction by a predetermined length. The first outer legs 22*a* and 22*a* have an elongated shape in the Z-axis direction and extend from the upper end to the lower end of the first base 21*a* in the Z-axis direction.

The first middle leg 23*a* is formed at an approximately central part of the first base 21*a* in the X-axis direction. The first middle leg 23*a* protrudes from one surface of the first base 21*a* in the Y-axis direction toward one side in the Y-axis direction by a predetermined length. The first middle leg 23*a* has an elongated shape in the Z-axis direction and extends from an upper point to the lower end of the first base 21*a* in the Z-axis direction. The protrusion width of the first middle leg 23*a* in the Y-axis direction is substantially equal to that of the first outer legs 22*a* and 22*a* in the Y-axis direction. In the illustrated example, the width of the first middle leg 23*a* in the X-axis direction is larger than that of the first outer leg 22*a* (22*a*) in the X-axis direction and is approximately 2-3 times as large as that of the first outer leg 22*a* (22*a*) in the X-axis direction.

Figure 3:
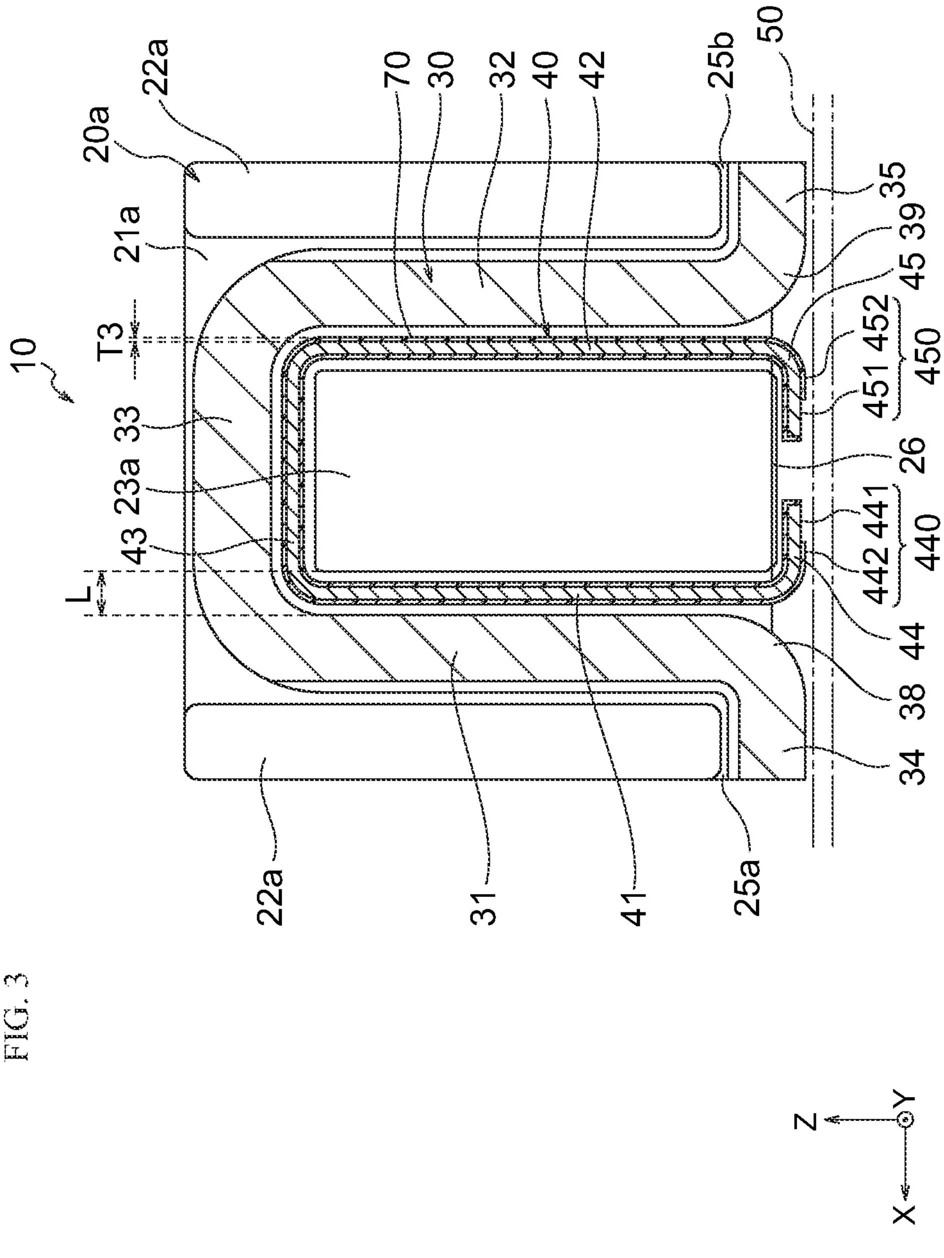
FIG. 3 is a cross-sectional view of the coil device shown in FIG. 1A along the III-III line.

As shown in FIG. 3, an insulating coating is applied to a surface of the first middle leg 23*a* opposite to a mounting surface 50 of a mounting board, and an insulating coating layer 26 is formed on this surface. The insulating coating layer 26 is made of a resin-based material, such as epoxy resin and urethane resin. Preferably, the insulating coating layer 26 has a thickness of 1-200 μm. Incidentally, the insulating coating layer 26 is similarly formed on the bottom surface of the second middle leg 23*b* of the second core 20*b*.

As shown in FIG. 2, the first groove 24*a* has a shape corresponding to that of the first conductor 30 (approximately U shape) and extends along the circumference of the first middle leg 23*a*. The conductor 30 and the second conductor 40 can be arranged while overlapping with each other in the first groove 24*a*. The first groove 24*a* includes a first side part 241, a second side part 242, and an upper part 243.

The first side part 241 and the second side part 242 extend substantially linearly in the Z-axis direction from the upper end to the lower end of the first base 21*a* in the Z-axis direction. The first side part 241 is formed between the first outer leg 22*a* located on one side in the X-axis direction and the first middle leg 23*a*, and the second side part 242 is formed between the first outer leg 22*a* located on the other side in the X-axis direction and the first middle leg 23*a*. The width of the side part 241 (242) in the X-axis direction is larger than the sum of thicknesses (plate thicknesses) of the conductors 30 and 40. As mentioned below, conductor side parts 31 and 41 of the conductors 30 and 40 are arranged in the first side part 241, and conductor side parts 32 and 42 of the conductors 30 and 40 are arranged in the second side part 242.

The upper part 243 is formed in an upper part of the first base 21*a* and extends in the X-axis direction. The upper part 243 connects the upper end of the first side part 241 and the upper end of the second side part 242. The width of the upper part 243 in the Z-axis direction is larger than the sum of thicknesses (plate thicknesses) of the conductors 30 and 40. As mentioned below, conductor upper parts 33 and 44 of the conductors 30 and 40 are arranged in the upper part 243.

The pair of first side grooves 25*a* and 25*a* is formed below the first outer legs 22*a* and 22*a* located on one side and the other side in the X-axis direction and extends in the X-axis direction toward one end and the other end of the first base 21*a* in the X-axis direction. The first side groove 25*a* (25*a*) is connected to the lower end of the side part 241 (242) and is a substantially L-shaped groove formed by the side part 241 (242) and the first side groove 25*a* (25*a*). The width of the first side groove 25*a* (25*a*) in the Z-axis direction is as large as or larger than the thickness (plate thickness) of the first conductor 30. As mentioned below, mounting parts 34 and 35 of the first conductor 30 are arranged in the first side grooves 25*a* and 25*a*.

The second core 20*b* includes a second base 21*b*, a pair of second outer legs 22*b* and 22*b*, a second middle leg 23*b* (FIG. 1B) disposed between the pair of second outer legs 22*b* and 22*b*, a second groove 24*b*, and second side grooves 25*b* and 25*b*. The second outer legs 22*b* and 22*b* are arranged opposite to the first outer legs 22*a* and 22*a*, and the second middle leg 23*b* is disposed opposite to the first middle leg 23*a*. The shape of the second core 20*b* is similar to that of the first core 20*a*. Thus, the shape of each part of the second core 20*b* is not explained.

Figure 1B:
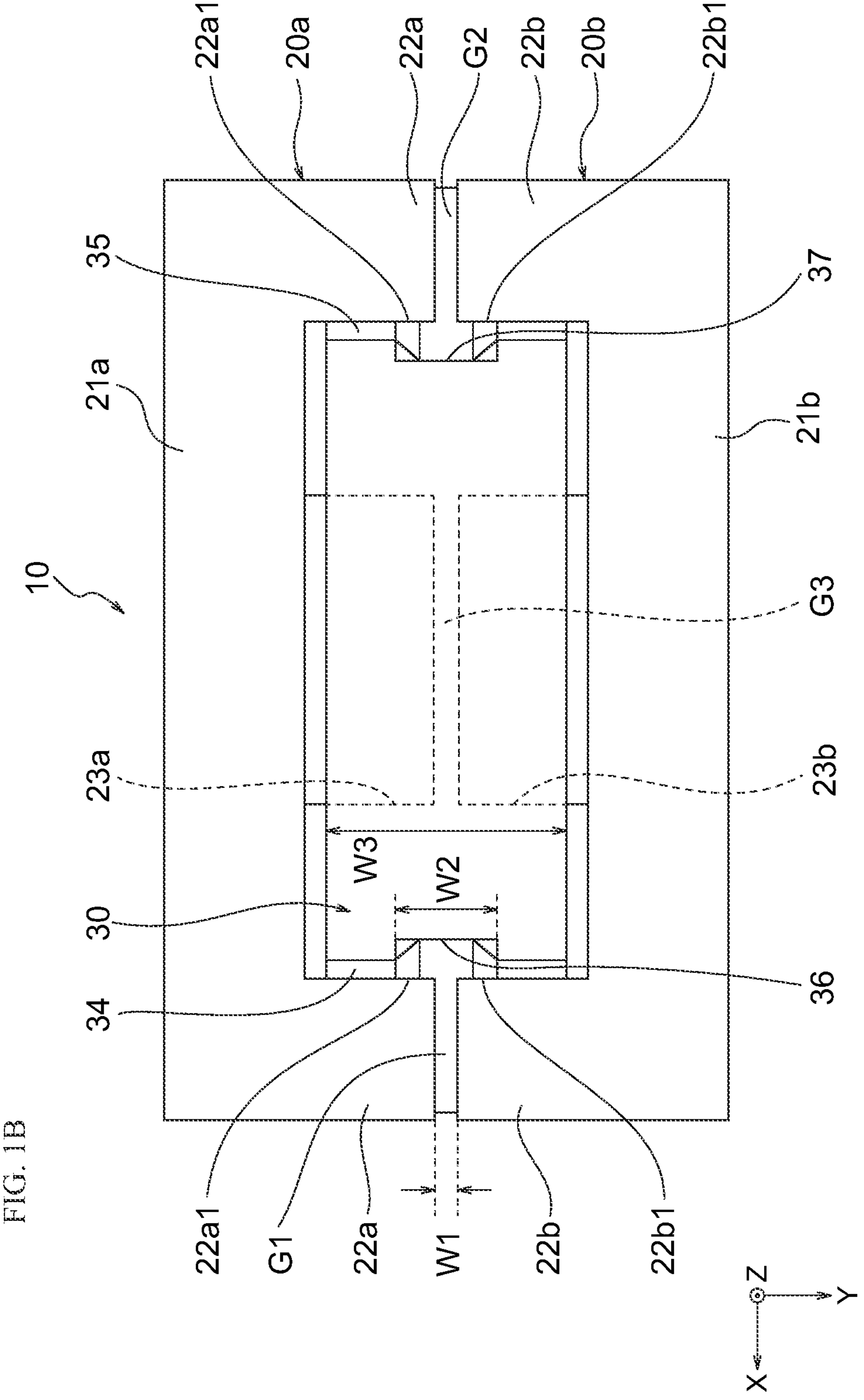
FIG. 1B is a plane view of the coil device shown in FIG. 1A.

As shown in FIG. 1B, the first core 20*a* and the second core 20*b* can be combined by joining one surface of the first core 20*a* located opposite to the first base 21*a* in the Y-axis direction and one surface of the second core 20*b* located opposite to the second base 21*b* in the Y-axis direction via adhesive agent or so (not illustrated). For more detail, the outer legs 22*a* and 22*b* and/or the middle legs 23*a* and 23*b* of the cores 20*a* and 20*b* are joined.

When the first core 20*a* and the second core 20*b* are combined while facing each other in the Y-axis direction, gaps G1 and G2 each having a predetermined width in the Y-axis direction are formed between the first core 20*a* and the second core 20*b* at a position where the outer legs 22*a* and 22*b* are formed, and a gap G3 having a predetermined width in the Y-axis direction is formed at a position where the middle legs 23*a* and 23*b* are formed.

The gap G1 has a predetermined length in the X-axis direction and is formed between the outer legs 22*a* and 22*b* located on one side in the X-axis direction. The gap G2 has a predetermined length in the X-axis direction and is formed between the outer legs 22*a* and 22*b* located on the other side in the X-axis direction. The length of the gap G1 (G2) in the X-axis direction is equal to that of the outer leg 22*a* (22*b*) in the X-axis direction. The gap G1 (G2) also has a predetermined length in the Z-axis direction, and this length is equal to that of the outer leg 22*a* (22*b*) in the Z-axis direction.

The gap G3 has a predetermined length in the X-axis direction and is formed between the first middle leg 23*a* and the second middle leg 23*b*. The length of the gap G3 in the X-axis direction is equal to that of the middle leg 23*a* (23*b*) in the X-axis direction. In the illustrated example, the length of the gap G3 in the X-axis direction is larger than that of the gap G1 (G2) in the X-axis direction. The gap G3 also has a predetermined length in the Z-axis direction, and this length is equal to that of the first middle leg 23*a* (23*b*) in the Z-axis direction. The gaps G1-G3 are formed on the same line along the boundary between the first core 20*a* and the second core 20*b*.

The width W1 of the gap G1 in the Y-axis direction is preferably 0.1-1.0 mm, more preferably 0.1-0.5 mm. This is also the case with the gap G2 and the gap G3 in the Y-axis direction. Incidentally, the gaps G1-G3 may have mutually different widths in the Y-axis direction.

As shown in FIG. 2, the first conductor 30 is made of a conductive plate and has a curved shape (approximately U shape). The first conductor 30 is disposed between the first core 20*a* and the second core 20*b* together with the second conductor 40. The first conductor 30 is made of, for example, a good metal conductor, such as copper, copper alloy, silver, and nickel, but may be any conductive material. The first conductor 30 is manufactured by, for example, machining a metal plate, but may be manufactured by any other method.

In the illustrated example, the first conductor 30 has a vertically long shape as a whole, and the height of the first conductor 30 in the Z-axis direction is larger than the length of the first conductor 30 in the X-axis direction. The cross-sectional area of the first conductor 30 perpendicular to its extending direction is larger than that of the second conductor 40 perpendicular to its extending direction. The thickness (plate thickness) of the first conductor 30 is larger than that (plate thickness) of the second conductor 40. Preferably, the first conductor 30 has a thickness of 0.5-2.5 mm, and the second conductor 40 has a thickness of 0.1-1 mm. The first conductor 30 may be as wide as the second conductor 40 in the Y-axis direction.

A plating layer is formed on the entire surface of the first conductor 30. The plating layer is composed of a single layer or a plurality of layers and is composed of, for example, a metal plating layer, such as Cu plating, Ni plating, Sn plating, Ni—Sn plating, Cu—Ni—Sn plating, Ni—Au plating, and Au plating. The plating layer is formed by, for example, applying an electric field plating or an electroless field plating to the surface of the first conductor 30. The plating layer may have any thickness, but preferably has a thickness of 1-30 μm.

The first conductor 30 includes a first conductor side part 31, a second conductor side part 32, a conductor upper part 33, a first mounting part (outer mounting part) 34, and a second mounting part (outer mounting part) 35. The first conductor side part 31 and the second conductor side part 32 extend in the Z-axis direction. In the first conductor 30, the first conductor side part 31 side functions as an input terminal (or an output terminal), and the second conductor side part 32 side functions as an output terminal (or an input terminal). The conductor upper part 33 extends in the X-axis direction and connects the first conductor side part 31 and the second conductor side part 32.

The first mounting part 34 and the second mounting part 35 are formed at one end and the other end of the conductor 30, respectively. That is, the mounting part 34 (35) is formed continuously (integrally) to the lower end of the conductor side part 31 (32). The mounting part 34 (35) is bent substantially perpendicularly to the conductor side part 31 (32) and extends outward in the X-axis direction. The first conductor 30 can be connected to the mounting surface 50 (FIG. 3) of the mounting board via the mounting parts 34 and 35. The first conductor 30 is connected to the mounting surface 50 using a connection member, such as solder and conductive adhesive agent.

As shown in FIG. 1A, the end (end surface) of the mounting part 34 (35) is exposed outward from the sides of the cores 20*a* and 20*b* in the X-axis direction. Likewise, as shown in FIG. 3, the lower surface of the mounting part 34 (35) is exposed outward from the bottom of the core 20*a* (20*b*). Since the mounting parts 34 and 35 are exposed in such a manner, the heat generated in the surroundings of the mounting parts 34 and 35 can efficiently be released to the outside of the cores 20*a* and 20*b*.

A first outer bending part 38 bending outward in the X-axis direction (opposite to the second conductor 40 side) is formed near the boundary between the first conductor side part 31 and the first mounting part 34, and a second outer bending part 39 bending outward in the X-axis direction is formed near the boundary between the second conductor side part 32 and the second mounting part 35.

In the present embodiment, as shown in FIG. 1B and FIG. 2, a first outer notch 36 and a second outer notch 37 are formed on the outer surface of the first conductor 30. The first outer notch 36 is formed on the front surfaces of the first conductor side part 31 and the first mounting part 34 and extends in the extending direction (longitudinal direction) of the first conductor side part 31 and the first mounting part 34. The first outer notch 36 is made of a concave groove, and taper surfaces are formed on the inside of the concave groove. The shape of the first outer notch 36 is the same as that of the first conductor side part 31 and the first mounting part 34 and is an approximately L shape. The first outer notch 36 is formed at an approximately central part of the first conductor side part 31 and the first mounting part 34 in the Y-axis direction and continuously extends from the upper end of the first conductor side part 31 to the end of the first mounting part 34.

The second outer notch 37 is formed on the front surfaces of the second conductor side part 32 and the second mounting part 35 and extends in the extending direction (longitudinal direction) of the second conductor side part 32 and the second mounting part 35. The second outer notch 37 is made of a concave groove, and taper surfaces are formed on the inside of the concave groove. The shape of the second outer notch 37 is the same as that of the second conductor side part 32 and the second mounting part 35 and is an approximately L shape. The second outer notch 37 is formed at an approximately central part of the second conductor side part 32 and the second mounting part 35 in the Y-axis direction and continuously extends from the upper end of the second conductor side part 32 to the end of the second mounting part 35.

The outer notch 36 (37) is formed on the first conductor 30 at a position corresponding to the gap G1 (G2) (a position close to the gap G1 (G2)). For more detail, the outer notch 36 (37) is formed on the conductor side part 31 (32) so as to extend in the Z-axis direction along an outer leg edge 22*a*1 (22*b*1) of the outer leg 22*a* (22*b*) next to the first conductor 30, and the outer notch 36 (37) is formed on the mounting part 34 (35) so as to extend in the X-axis direction along the lower end of the outer leg 22*a* (22*b*).

The first outer notch 36 is opposite to (faces) the other end of the gap G1 in the X-axis direction. At the position corresponding to the gap G1, the surface of the first conductor 30 and the other end of the gap G1 in the X-axis direction are away from each other by a distance corresponding to the depth D of the first outer notch 36. The second outer notch 37 is opposite to (faces) one end of the gap G2 in the X-axis direction. At the position corresponding to the gap G2, the surface of the first conductor 30 and one end of the gap G2 in the X-axis direction are away from each other by a distance corresponding to the depth of the second outer notch 37.

The width of the outer notch 36 (37) in the Y-axis direction is larger than that of the gap G1 (G2) in the Y-axis direction. The ratio W2/W1 of the width W2 of the first outer notch 36 in the Y-axis direction to the width W1 of the gap G1 in the Y-axis direction is preferably 0.5-10, more preferably 1-7, still more preferably 3-5. This is also the case with the ratio of the width of the second outer notch 37 in the Y-axis direction to the width of the gap G2 in the Y-axis direction.

The ratio W2/W3 of the width W2 of the first outer notch 36 in the Y-axis direction to the width W3 of the first conductor 30 in the Y-axis direction is preferably 0.2-0.8, more preferably 0.3-0.5. This is also the case with the ratio of the width of the second outer notch 37 in the Y-axis direction to the width of the first conductor 30 in the Y-axis direction.

The ratio D/T1 of the depth D of the first outer notch 36 to the thickness T1 of the first conductor 30 is preferably 0.1-0.5, more preferably 0.2-0.4. This is also the case with the ratio of the depth of the second outer notch 37 to the thickness T1 of the first conductor 30.

Preferably, the relation between the depth D of the first outer notch 36 and the width W1 of the gap G1 in the Y-axis direction satisfies D>W1, but may not satisfy this. The ratio D/W1 of the depth D to the width W1 is preferably 0.5-5, more preferably 1-3. This is also the case with the relation between the depth of the second outer notch 37 and the width of the gap G2 in the Y-axis direction.

In the present embodiment, at the position corresponding to the gaps G1 and G2, the leakage magnetic flux generated in the gaps G1 and G2 can be prevented from hitting the conductor side parts 31 and 32 and the mounting parts 34 and 35 by determining each value of W2/W1, W2/W3, D/T1, and D/W1 or satisfying D>W1.

As shown in FIG. 2, the second conductor 40 is formed of a flat wire and has a curved shape (substantially U shape). The second conductor 40 can be made of the same material as the first conductor 30. The second conductor 40 is disposed inside the cores 20*a* and 20*b* (inside the grooves 24*a* and 24*b*) together with the first conductor 30. When the conductors 30 and 40 are arranged inside the groove 24*a* and 24*b*, the second conductor 40 is disposed inside the first conductor 30 at a predetermined interval, the middle legs 23*a* and 23*b* are arranged inside the second conductor 40, and the outer legs 22*a* and 22*b* are arranged outside the first conductor 30.

In the illustrated example, the second conductor 40 has a vertically long shape, and the height of the second conductor 40 in the Z-axis direction is larger than the length of the second conductor 40 in the X-axis direction. The second conductor 40 is smaller than the first conductor 30 and is surrounded by the first conductor 30 at the time of disposing the second conductor 40.

The second conductor 40 includes a first conductor side part 41, a second conductor side part 42, a conductor upper part 43, a first mounting part (inner mounting part) 44, and a second mounting part (inner mounting part) 45. The first conductor side part 41 and the second conductor side part 42 extend in the Z-axis direction and are arranged opposite to each other in the X-axis direction. In the second conductor 40, the first conductor side part 41 side functions as an input terminal (or an output terminal), and the second conductor side part 42 side functions as an output terminal (or an input terminal).

The first conductor side part 41 of the second conductor 40 extends substantially in parallel to the first conductor side part 31 of the first conductor 30, and the second conductor side part 42 of the second conductor 40 extends substantially in parallel to the second conductor side part 32 of the first conductor 30.

The conductor upper part 43 extends in the X-axis direction and connects the upper ends of the first conductor side part 41 and the second conductor side part 42. The conductor upper part 43 of the second conductor 40 extends substantially in parallel to the conductor upper part 33 of the first conductor 30.

The first mounting part 44 and the second mounting part 45 are formed at one end and the other end of the first conductor 30, respectively. That is, the mounting part 44 (45) is formed continuously (integrally) to the lower end of the conductor side part 41 (42).

The mounting part 44 (45) is bent substantially perpendicularly to the conductor side part 41 (42) and extends inward in the X-axis direction. As shown in FIG. 3, the mounting part 44 (45) extends along the bottom surface of the middle leg 23*a* (23*b*), and a predetermined space is formed between the upper surface of the mounting part 44 (45) and the bottom surface of the middle leg 23*a* (23*b*). As mentioned above, since the insulating coating layer 26 is formed on the bottom surface of the middle leg 23*a* (23*b*), the middle leg 23*a* (23*b*) and the mounting part 44 (45) are insulated favorably.

The extending direction of the first mounting part 44 of the second conductor 40 is opposite to that of the first mounting part 34 of the first conductor 30 in the X-axis direction. The extending direction of the second mounting part 45 of the second conductor 40 is opposite to that of the second mounting part 35 of the first conductor 30 in the X-axis direction.

The second conductor 40 can be connected to the mounting surface 50 of the mounting board via the mounting parts 44 and 45. The second conductor 40 is connected to the mounting surface 50 via a connection member, such as solder and conductive adhesive agent.

The lower surfaces of the mounting parts 44 and 45 are exposed outward from the bottom of the cores 20*a* and 20*b*. Since the mounting parts 44 and 45 are exposed in such a manner, the heat generated in the surroundings of the mounting parts 44 and 45 can efficiently be released to the outside of the cores 20*a* and 20*b*.

The mounting part 44 (45) includes a mount facing surface 440 (450) capable of facing the mounting surface 50 of the mounting board. The mount facing surface 440 (450) is a surface for connecting to the mounting surface 50. The details of the mount facing surface 440 (450) are mentioned below.

An insulating layer 70 is formed between the first conductor 30 and the second conductor 40. The insulating layer 70 exists between the first conductor 30 and the second conductor 40 and favorably insulates the first conductor 30 and the second conductor 40. The insulating layer 70 according to the present embodiment is made of an insulating film formed on the surface of the second conductor 40 and is formed integrally with the second conductor 40. In the illustrated example, the surface (outer surface) of the insulating layer 70 is not contacted with the inner surface of the first conductor 30, and a space is formed between the outer surface of the insulating layer 70 and the inner surface of the first conductor 30.

Various modes of the insulating layer 70 can be considered. For example, the insulating layer 70 may be a fusion layer formed by fusing an insulating film on the surface of the second conductor 40. In this case, the inner surface of the first conductor 30 and the outer surface of the second conductor 40 are connected via a fusion layer (insulating layer 70), and the insulating layer 70 can be filled in the space between the first conductor 30 and the second conductor 40 without gaps, and the first conductor 30 and the second conductor 40 can be insulated sufficiently. When the first conductor 30 and the second conductor 40 are connected via the insulating layer 70, the magnetic coupling between the first conductor 30 and the second conductor 40 can be enhanced.

The fusion layer can be formed by heating the insulating film formed on the surface of the second conductor 40. Incidentally, the fusion layer may be formed separately from the insulating film formed on the surface of the second conductor 40. For example, the insulating film and the fusion layer may be formed as two layers on the surface of the second conductor 40.

For example, the insulating layer 70 may be made of a resin body, such as resin spacer, formed separately from the second conductor 40. In this case, when the resin body has a bent shape corresponding to the shape (substantially U shape) of the space between the first conductor 30 and the second conductor 40, the insulating layer 70 can be formed along the outer surface of the second conductor 40 and the inner surface of the first conductor 30.

As shown in FIG. 2, the insulating layer 70 covers the entire surface of the second conductor 40 (excluding joinable surfaces 441 and 451 of the mount facing surfaces 440 and 450 mentioned below). The range in which the insulating layer 70 is formed is not limited to one shown in the figure. The insulating layer 70 is formed at a position where at least the inner surface of the first conductor 30 and the outer surface of the second conductor 40 face each other.

As shown in FIG. 3, when the distance between the inner surface of the first conductor 30 and the outer surface of the second conductor 40 is L, the thickness T3 of the insulating layer 70 is appropriately determined within the range of $0<T3\leq L$. For example, when the insulating layer 70 is made of an insulating film formed on the surface of the second conductor 40, the thickness of the insulating film is preferably 1-200 μm, more preferably 1-100 μm. For example, when the insulating layer 70 is made of the above-mentioned resin body formed separately from the second conductor 40, the insulating layer 70 may have a thickness that is larger than the above-mentioned one.

The insulating layer 70 may be made of any material, such as polyester, polyesteramide, polyamide, polyamideimide, polyurethane, epoxy, and epoxy-modified acrylic resin.

The insulating layer 70 entirely covers the outer surfaces, the inner surfaces, and the side surfaces perpendicular to them of the conductor side parts 41 and 42 and the conductor upper part 43. Since the insulating layer 70 is formed on the inner surfaces of the conductor side parts 41 and 42 and the conductor upper part 43, the second conductor 40 and the middle legs 23*a* and 23*b* of the cores 20*a* and 20*b* can be insulated favorably.

Between the second conductor 40 and the middle legs 23*a* and 23*b* of the cores 20*a* and 20*b*, the insulating layer 70 is formed integrally with the second conductor 40 and extends along the inner surface of the second conductor 40 (the conductor side parts 41 and 42 and the conductor upper part 43). Incidentally, the mode of the insulating layer 70 formed between the second conductor 40 and the middle legs 23*a* and 23*b* of the cores 20*a* and 20*b* is similar to that of the insulating layer 70 formed between the first conductor 30 and the second conductor 40 mentioned above.

The insulating layer 70 entirely covers the inner surfaces, the side surfaces, and the end surfaces (each end surface of the second conductor 40) of the mounting parts 44 and 45, but simply partly covers the outer surfaces (mount facing surfaces 440 and 450) of the mounting parts 44 and 45.

For more detail, the mount facing surface 440 (450) includes a joinable surface 441 (451), on which the insulating layer 70 is not formed, and a non-joinable surface 442 (452), on which the insulating layer 70 is formed. Since the insulating layer 70 is not formed on the joinable surface 441 (451), the joinable surface 441 (451) has conductivity, and the joinable surfaces 441 and 451 and the mounting surface 50 of the mounting board can be connected via a connection member, such as solder.

The joinable surface 441 (451) is formed from an approximately central part of the mounting part 44 (45) in the X-axis direction to the tip of the mounting part 44 (45) (each end of the second conductor 40). The non-joinable surface 442 (452) is formed from the base of the mounting part 44 (45) (the connection part with the conductor side part 41 (42)) to an approximately central part of the mounting part 44 (45) in the X-axis direction. In the present embodiment, the non-joinable surface 442 (452) is thereby formed close to the first conductor 30 than the joinable surface 441 (451).

In the present embodiment, the insulating layer 70 is formed on the entire inner surface of the second conductor 40 along its longitudinal direction, but there is a region where the insulating layer 70 is not formed only at both ends of the outer surface of the second conductor 40 in its longitudinal direction.

As shown in FIG. 2, a first inner bending part 46 bending inward in the X-axis direction (opposite to the first conductor 30 side) is formed near the boundary between the first conductor side part 41 and the first mounting part 44, and a second inner bending part 47 bending inward in the X-axis direction is formed near the boundary between the second conductor side part 42 and the second mounting part 45. The radius of curvature of the outer surface of the inner bending part 46 (47) of the second conductor 40 is smaller than that of the inner surface of the outer bending part 38 (39) of the first conductor 30.

In the manufacture of the coil device 10, the first core 20*a*, the second core 20*b*, the first conductor 30, and the second conductor 40 shown in FIG. 2 are prepared. As the second conductor 40, for example, prepared is a flat wire having an insulating film (insulating layer 70) formed on its surface and machined into the shape shown in FIG. 2. Incidentally, such a flat wire having an insulating film can be formed, for example, by immersing a metal plate into a resin solution.

The joinable surface 441 (451) not including the insulating layer 70 is formed on the mount facing surface 440 (450) of the second conductor 40. The joinable surface 441 (451) is formed by irradiating the above-mentioned flat wire with laser irradiation at a position where the joinable surface 441 (451) should be formed and peeling the insulating layer 70 from the mount facing surface 440 (450). Incidentally, the insulating layer 70 may be peeled off by polishing the surface of the flat wire with a file or so. Preferably, the peeled portion of the insulating layer 70 is soldered by solder dipping or so. This makes it possible to improve the solder wettability of the joinable surfaces 441 and 451. Incidentally, the joinable surfaces 441 and 451 may be formed before or after the flat wire is machined into the shape shown in FIG. 2.

Next, the first conductor 30 and the second conductor 40 are arranged inside the first groove 24*a* (second groove 24*b*) of the first core 20*a* (second core 20*b*) while overlapping with each other. For more detail, the second conductor 40 is disposed so as to surround the first middle leg 23*a* (second middle leg 23*b*), and the first conductor 30 is thereafter disposed so as to surround the second conductor 40 with a predetermined interval. At this time, the first conductor 30 and/or the second conductor 40 may be fixed to the first core 20*a* with an adhesive agent or so.

Incidentally, the inner surface of the first conductor 30 and the outer surface of the second conductor 40 may be joined in advance via the insulating layer 70 (fusion layer) and disposed inside the first groove 24*a* (second groove 24*b*) of the first core 20*a* (second core 20*b*). When the first conductor 30 and the second conductor 40 are integrated via the insulating layer 70, the first core 20*a* (second core 20*b*) is easily disposed inside the first groove 24*a* (second groove 24*b*) of the first core 20*a* (second core 20*b*).

Next, the first core 20*a* (second core 20*b*) is combined with the second core 20*b* (first core 20*a*) so that the first conductor 30 and the second conductor 40 are contained in the second groove 24*b* (first groove 24*a*).

At this time, as shown in FIG. 1B, the first core 20*a* and the second core 20*b* are combined with a predetermined interval in the Y-axis direction so that: the gap G1 is formed between the outer legs 22*a* and 22*b* located on one side in the X-axis direction; the gap G2 is formed between the outer legs 22*a* and 22*b* located on the other side in the X-axis direction; and the gap G3 is formed between the first middle leg 23*a* and the second middle leg 23*b*.

Thus, the outer notch 36 (37) is disposed to face the gap G1 (G2), and the outer bending part 38 (39) is disposed to face the gap G3. After that, the coil device 10 shown in FIG. 1A is obtained by joining the first core 20*a* and the second core 20*b* with an adhesive agent or so.

Figure 1C:
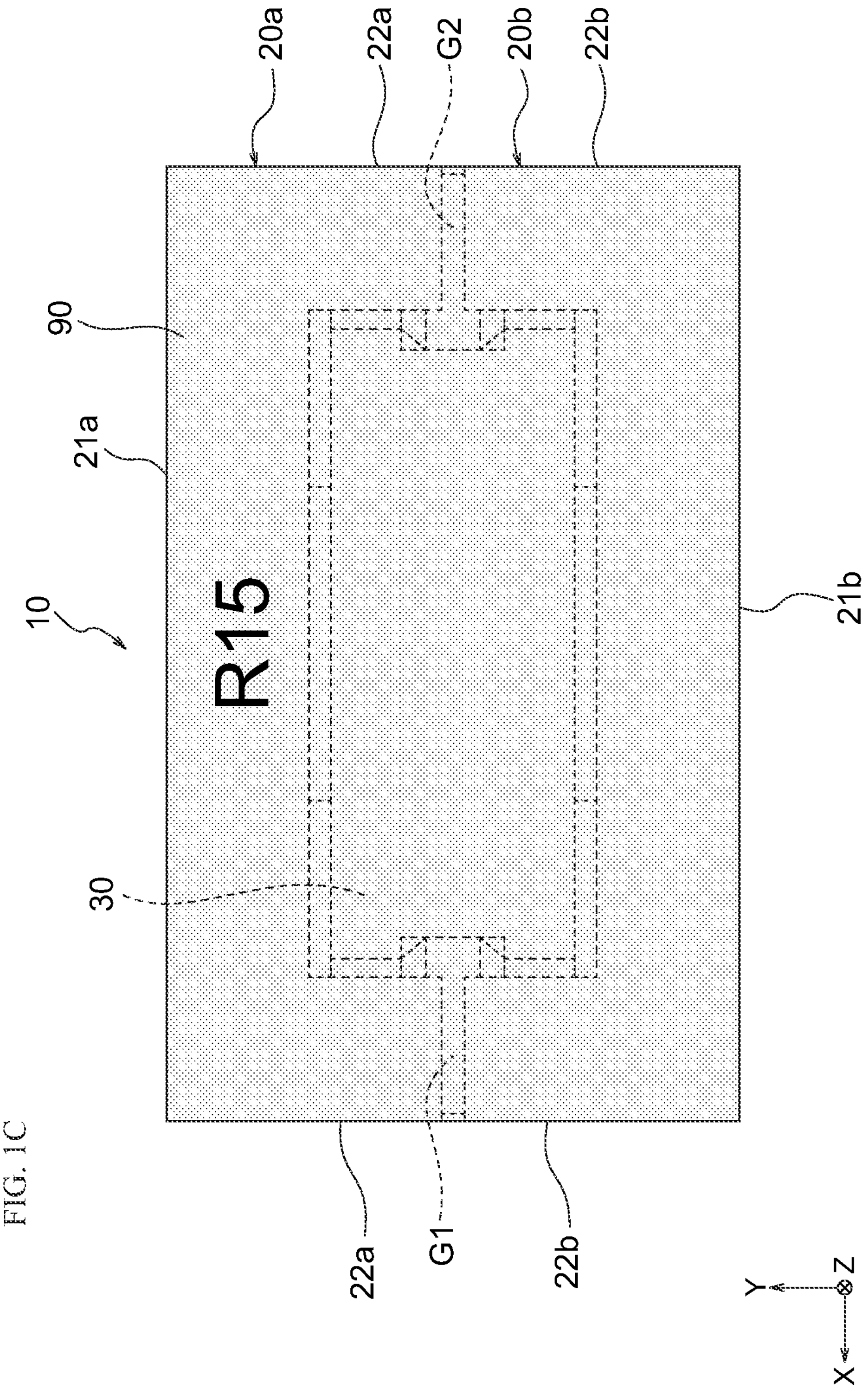
FIG. 1C is a plane view of the coil device shown in FIG. 1A on which a tape member is attached.

After that, as shown in FIG. 1C, a tape member 60 may be attached to the upper surfaces of the cores 20*a* and 20*b* so as to print characters such as a serial number (identifier/character "R15" in the illustrated example) on the surface of the tape member 60. Instead, a tape member 60 on which characters (identifiers) such as a serial number are printed in advance may be attached to the upper surfaces of the cores 20*a* and 20*b*. The tape member 60 is, for example, a Kapton tape and is attached so as to straddle the cores 20*a* and 20*b*. Characters are printed on the tape member 60 by laser irradiation or so. In the prior arts, characters are engraved on the upper surface of the core by laser irradiation, and a tape member is attached so as to cover the characters from above. In this case, however, there is a problem that the characters engraved on the upper surface of the core are difficult to see. Like the present embodiment, when the characters are printed on the tape member attached on the upper surface of the core or when the tape member on which characters are printed is attached to the upper surface of the core, the characters can be seen clearly, and the above-mentioned problem can be prevented effectively As shown in FIG. 2 and FIG. 3, the coil device 10 according to the present embodiment includes the first conductor 30 and the second conductor 40 disposed inside the first conductor 30 and at least partly (the conductor side parts 41 and 42 and the conductor upper part 33) extending along the first conductor 30 (the conductor side parts 31 and 32 and the conductor upper part 33), and the insulating layer 70 is at least formed between the first conductor 30 and the second conductor 40. In this case, the first conductor 30 and the second conductor 40 are arranged while overlapping with each other (double) with a predetermined interval. Under such an arrangement, the magnetic flux can efficiently be transmitted between the first conductor 30 and the second conductor 40, and the magnetic coupling between the first conductor 30 and the second conductor 40 can be increased sufficiently. In addition, since the first conductor 30 and the second conductor 40 are sufficiently insulated via the insulating layer 70 existing therebetween, it is possible to prevent a short-circuit failure generated between the first conductor 30 and the second conductor 40, and the coil device 10 can have a high reliability.

The second conductor 40 according to the present embodiment is made of a flat wire, and the insulating layer 70 is made of an insulating film formed on a surface of the second conductor 40. Since a flat wire with an insulating film is used as the second conductor 40, the insulating layer 70 can exist between the first conductor 30 and the second conductor 40 by simply disposing the second conductor 40 inside the first conductor 30 in an overlapping manner, and the above-mentioned effect can be obtained easily.

In the present embodiment, the insulating layer 70 is formed between the middle leg 23*a* (23*b*) of the core 20*a* (20*b*) and the second conductor 40. Thus, the middle leg 23*a* (23*b*) and the second conductor 40 are insulated sufficiently via the insulating layer 70 existing therebetween. Thus, it is possible to prevent a short-circuit failure generated between the middle leg 23*a* (23*b*) and the second conductor 40, and the coil device 10 can have a high reliability.

The first conductor 30 according to the present embodiment is made of a conductive plate having a plating layer on a surface of the conductive plate. Thus, a connection member, such as solder and conductive adhesive agent, easily adheres to the surface of the first conductor 30, and the first conductor 30 can firmly be connected to the mounting surface 50 of the mounting board. In particular, when the connection member is solder, a solder fillet can easily be formed on the side surface of the first conductor 30, and the first conductor 30 and the mounting surface 50 of the mounting board can thereby firmly be connected.

In the present embodiment, the mount facing surface 440 (450) includes the joinable surface 441 (451) not including the insulating layer 70 and the non-joinable surface 442 (452) including the insulating layer 70, and the non-joinable surface 442 (452) is located closer to the first conductor 30 than the joinable surface 441 (451). In this case, the above-mentioned connection member easily adheres to the joinable surface 441 (451), but does not easily adhere to the non-joinable surface 442 (452). Thus, the non-joinable surface 442 (452) can prevent the connection member adhered to the joinable surface 441 (451) from protruding toward the first conductor 30, and it is possible to effectively prevent a short-circuit failure generated by solder balls or so between the first conductor 30 and the second conductor 40.

In the present embodiment, a radius of curvature of the inner surface of the outer bending part 38 (39) is larger than that of the outer surface of the inner bending part 46 (47) of the second conductor 40. In this case, a bending angle of the inner surface of the outer bending part 38 (39) is smaller than that of the outer surface of the inner bending part 46 (47). Thus, the outer surface of the inner bending part 46 (47) bends sharply near the mounting surface 50 of the mounting board, but the inner surface of the outer bending part 38 (39) bends gently from a position away from the mounting surface 50 of the mounting board. Thus, a comparatively large space is formed between the inner surface of the outer bending part 38 (39) and the outer surface of the inner bending part 46 (47), and it is possible to effectively prevent a short-circuit failure generated between the first conductor 30 and the second conductor 40 in the surroundings of the mounting surface 50. Moreover, even if a land pattern of the mounting board to be connected with the mounting parts 44 and 45 of the second conductor 40 is wide in the X-axis direction, the mounting parts 34 and 35 of the first conductor 30 and the land pattern can be prevented from contacting with each other.

In the present embodiment, a cross-sectional area of the first conductor 30 perpendicular to its extending direction is larger than that of the second conductor 40 perpendicular to its extending direction. Thus, the DC resistance of the first conductor 30 can be smaller than that of the second conductor 40.

In the present embodiment, the insulating coating layer 26 is formed on the bottom surface of the middle leg 23*a* (23*b*) of the core 20*a* (20*b*). Thus, the bottom surface of the middle leg 23*a* (23*b*) and the second conductor 40 can sufficiently be insulated by the insulating coating layer 26.

Second Embodiment

A coil device 110 according to Second Embodiment of the present invention is different from the coil device 10 according to First Embodiment only in the following matters and has structure and effect similar to those of the coil device 10 according to First Embodiment. In the figures, common members with First Embodiment are given common references and are not explained.

Figure 4A:
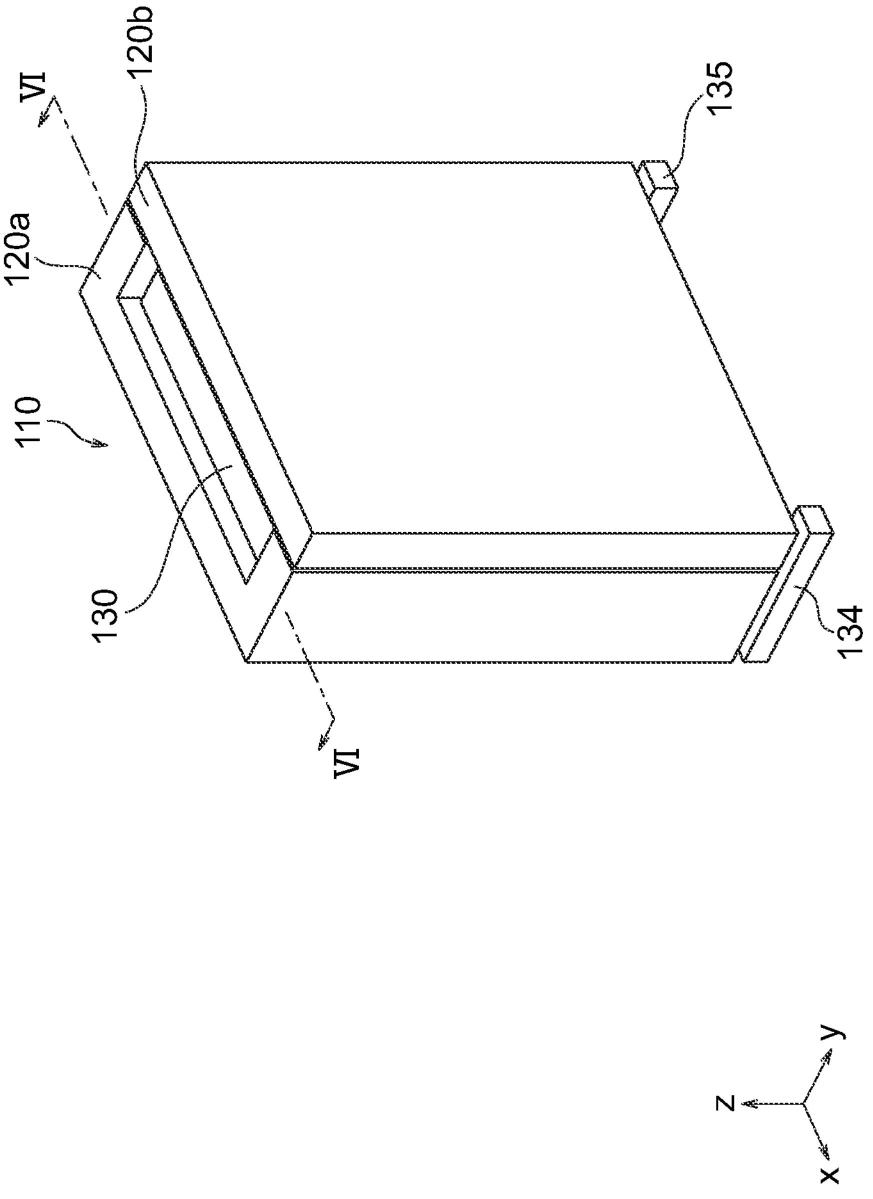
FIG. 4A is a perspective view of a coil device according to Second Embodiment of the present invention.
Figure 5:
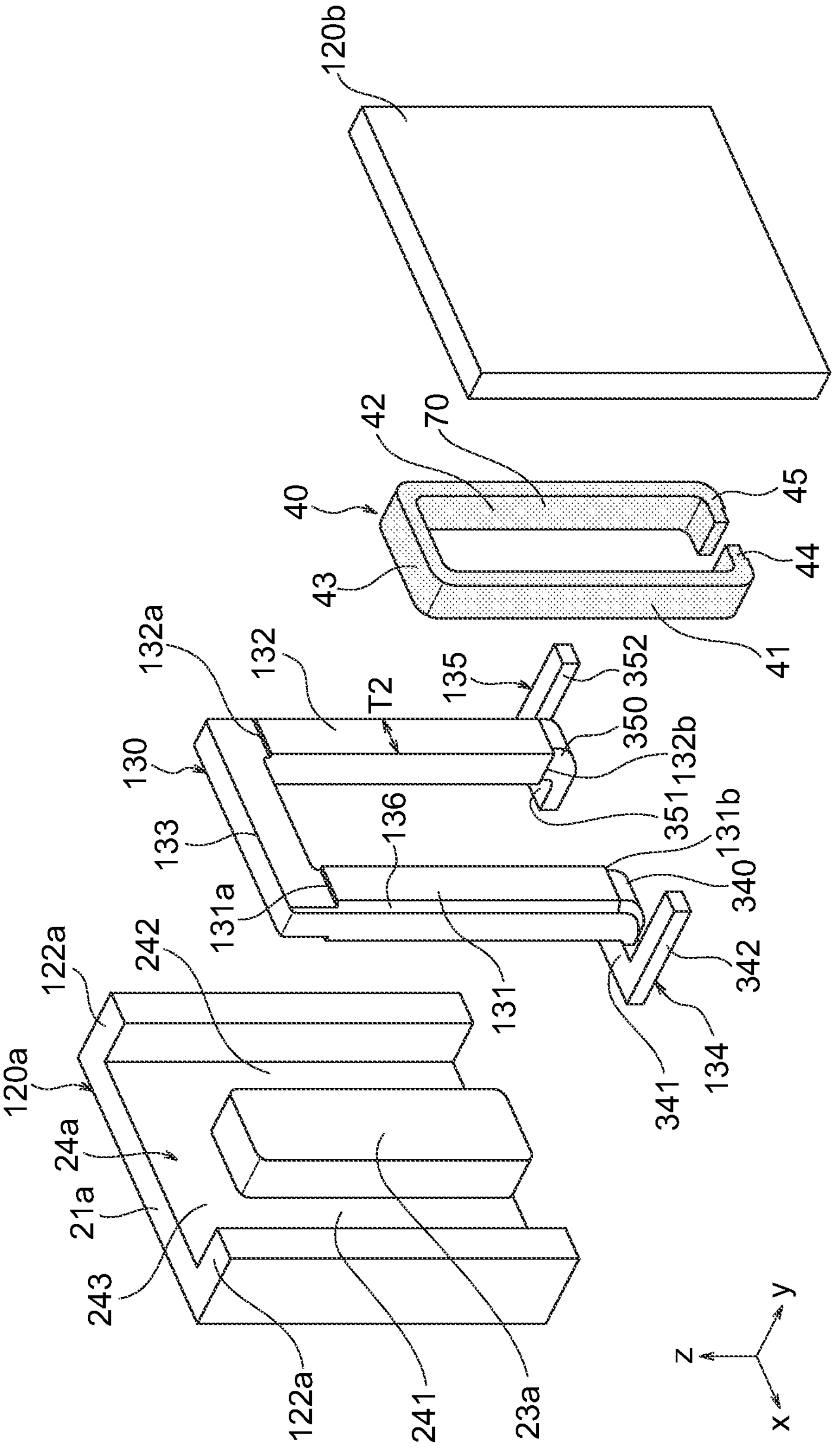
FIG. 5 is an exploded perspective view of the coil device shown in FIG. 4A.

As shown in FIG. 4A and FIG. 5, the coil device 110 includes a first core 120*a*, a second core 120*b*, a first conductor 130, and the second conductor 40. The first core 120*a* is different from the first core 20*a* according to First Embodiment in that the first core 120*a* includes a pair of first outer legs 122*a* and 122*a*, but does not include the side grooves 25*a* and 25*b* shown in FIG. 2. The first outer legs 122*a* and 122*a* are longer in the Z-axis direction by the amount of no arrangement of the side grooves 25*a* and 25*b*.

The second core 120*b* is different from the second core 20*b* according to First Embodiment in that the second core 120*b* has a flat plate shape. When the first core 120*a* and the second core 120*b* are combined, what is called an EI type core is formed.

Figure 4B:
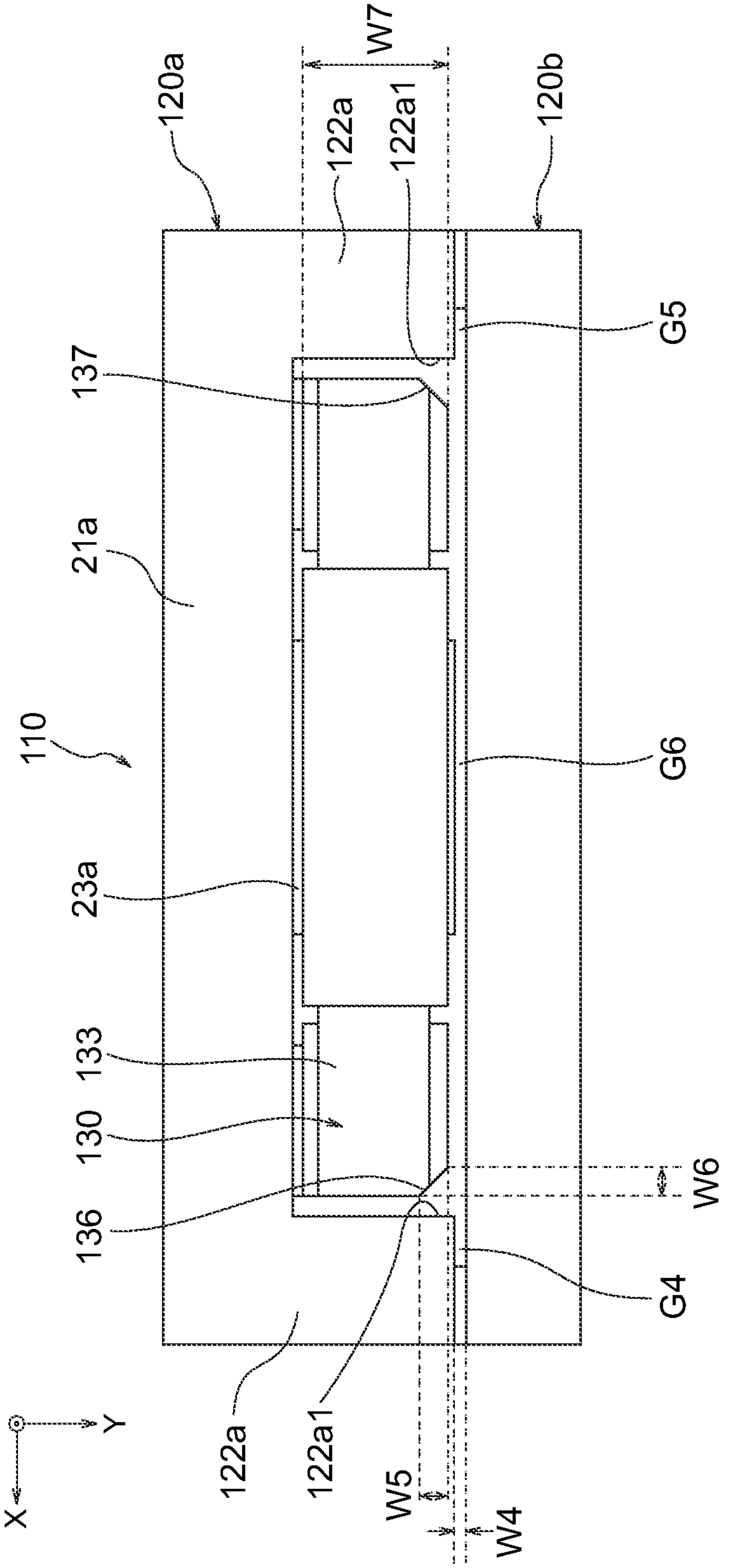
FIG. 4B is a plane view of the coil device shown in FIG. 4A.

As shown in FIG. 4B, a gap G4 is formed between the first outer leg 122*a* located on one side in the X-axis direction and the second core 120*b*, and a gap G5 is formed between the first outer leg 122*a* located on the other side in the X-axis direction and the second core 120*b*. The gap G4 (G5) extends in the Z-axis direction and the X-axis direction along the first outer leg 122*a* (122*a*).

Moreover, a gap G6 is formed between the middle leg 23*a* and the second core 120*b*. The gap G6 extends in the Z-axis direction and the X-axis direction along the middle leg 23*a*.

As shown in FIG. 5, the first conductor 130 includes a first conductor side part 131, a second conductor side part 132, a conductor upper part 133, a first mounting part 134, and a second mounting part 135. Steps 131*a* (132*a*) are formed at the upper end of the conductor side part 131 (132), and a step 131*b* (132*b*) is formed at the lower end of the conductor side part 131 (132). The steps 131*a* (132*a*) are formed on both side surfaces (surfaces parallel to the XZ plane) of the conductor side part 131 (132), and the step 131*b* (132*b*) is formed on the inner surface (surface parallel to the YZ plane) of the conductor side part 131 (132).

The width of the conductor upper part 133 in the Y-axis direction is smaller than that of the first conductor 30 shown in FIG. 2 in the Y-axis direction by the amount of formation of the steps 131*a* and 132*a* at the upper ends of the conductor side parts 131 and 132.

The first mounting part 134 includes a first mounting bending part 340, a first mounting connection part 341, and a first mounting body part 342. The second mounting part 135 includes a second mounting bending part 350, a second mounting connection part 351, and a second mounting body part 352. The mounting bending part 340 (350) is formed continuously (integrally) to the lower end of the conductor side part 131 (132). The mounting part 340 (350) bends substantially perpendicularly to the conductor side part 131 (132) and extends toward the first core 120*a* side in the Y-axis direction.

The mounting connection part 341 (351) is formed continuously (integrally) to the end of the mounting bending part 340 (350) and connects the mounting bending part 340 (350) and the mounting body part 342 (352). The mounting connection part 341 (351) extends outward in the X-axis direction.

The mounting body part 342 (352) is formed continuously (integrally) to the end of the mounting connection part 341 (351) and extends toward the second core 120*b* side in the Y-axis direction. The first conductor 130 can be connected to a mounting surface of a mounting board (not shown) via the mounting body parts 342 and 352. The mounting body part 342 (352) is connected to the mounting surface using a connection member, such as solder and conductive adhesive agent.

A first outer notch 136 and a second outer notch 137 are formed on the outer surface of the first conductor 130. The outer notch 136 (137) extends continuously in the extending direction (longitudinal direction) of the conductor side part 131 (132) and the mounting bending part 340 (350). A part (upper end) of the outer notch 136 (137) is also formed at the end of the conductor upper part 133 in the X-axis direction.

As shown in FIG. 4B and FIG. 5, the first outer notch 136 is made of a chamfered portion obtained by chamfering one corners of the conductor upper part 133, the first conductor side part 131, and the first mounting bending part 340 in the Y-axis direction (corners between the outer surfaces and the side surfaces of the conductor upper part 133, the conductor side part 131, and the first mounting bending part 340), and the second outer notch 137 is made of a chamfered portion obtained by chamfering one corners of the conductor upper part 133, the second conductor side part 132, and the second mounting bending part 350 in the Y-axis direction (corners between the outer surfaces and the side surfaces of the conductor upper part 133, the second conductor side part 132, and the second mounting bending part 350). At the positions of the outer notches 136 and 137, an inclined surface (C surface) is formed on each of the conductor upper part 133, the conductor side part 131 (132), and the mounting bending part 340 (350).

The outer notches 136 and 137 are formed on the conductor 130 at positions corresponding to the gaps G4 and G5 (positions close to the gaps G4 and G5). For more detail, the outer notches 136 and 137 are formed in the conductor 130 so as to extend in the Z-axis direction along outer edges 122*a*1 and 122*a*1 of the outer legs 122*a* and 122*a* next to the conductor 130.

The first outer notch 136 diagonally faces the other end of the gap G4 in the X-axis direction. At the position corresponding to the gap G4, the surface of the conductor 130 and the other end of the gap G4 in the Y-axis direction are away from each other by a distance corresponding to a width W5 of the first outer notch 136 in the Y-axis direction or a width W6 of the first outer notch 136 in the X-axis direction. The second outer notch 137 diagonally faces one end of the gap G5 in the X-axis direction. At the position corresponding to the gap G5, the surface of the conductor 130 and one end of the gap G5 in the Y-axis direction are away from each other by a distance corresponding to a width of the second outer notch 137 in the Y-axis direction or a width of the second outer notch 137 in the X-axis direction.

Preferably, the width of the outer notch 136 (137) in the Y-axis direction is larger than that of the gap G4 (G5) in the Y-axis direction, but may not be larger than that of the gap G4 (G5) in the Y-axis direction. The ratio W5/W4 of the width W5 of the first outer notch 136 in the Y-axis direction to the width W4 of the gap G4 in the Y-axis direction is preferably 0.5-6, more preferably 1-5, still more preferably 2-4. This is also the case with the ratio of the width of the second outer notch 137 in the Y-axis direction to the width of the gap G5 in the Y-axis direction.

Preferably, the width of the outer notch 136 (137) in the X-axis direction is larger than that of the gap G4 (G5) in the Y-axis direction, but may not be larger than that of the gap G4 (G5) in the Y-axis direction. The ratio W6/W4 of the width W6 of the first outer notch 136 in the X-axis direction to the width W4 of the gap G4 in the Y-axis direction is preferably 0.5-6, more preferably 1-5, still more preferably 2-4. This is also the case with the ratio of the width of the second outer notch 137 in the X-axis direction to the width of the gap G5 in the Y-axis direction.

The ratio W5/W7 of the width W5 of the first outer notch 136 in the Y-axis direction to the width W7 of the conductor 130 in the Y-axis direction is preferably 0.1-0.5, more preferably 0.2-0.3. This is also the case with the ratio of the width of the second outer notch 137 in the Y-axis direction to the width W7 of the conductor 130 in the Y-axis direction.

The ratio W6/T2 of the width W6 of the first outer notch 136 in the X-axis direction to the thickness T2 of the conductor 130 (FIG. 5) is preferably 0.1-0.9, more preferably 0.3-0.7. This is also the case with the ratio of the width of the second outer notch 137 in the X-axis direction to the thickness T2 of the conductor 130.

In the present embodiment, at the positions corresponding to the gaps G4 and G5, the leakage magnetic flux generated in the gaps G4 and G5 can be prevented from hitting the conductor upper part 133 by determining each value of W5/W4, W6/W4, W5/W7 and W6/T2 as mentioned above or satisfying W5>W4 or W6>W4.

In the present embodiment, effects similar to those of First Embodiment are also obtained. In the present embodiment, the size of the mounting part 134 (135) (particularly, the size of the mounting body part 342 (352)) is smaller than that of the mounting part 34 (35) according to First Embodiment, and the coil device 110 can thereby be downsized.

Figure 6:
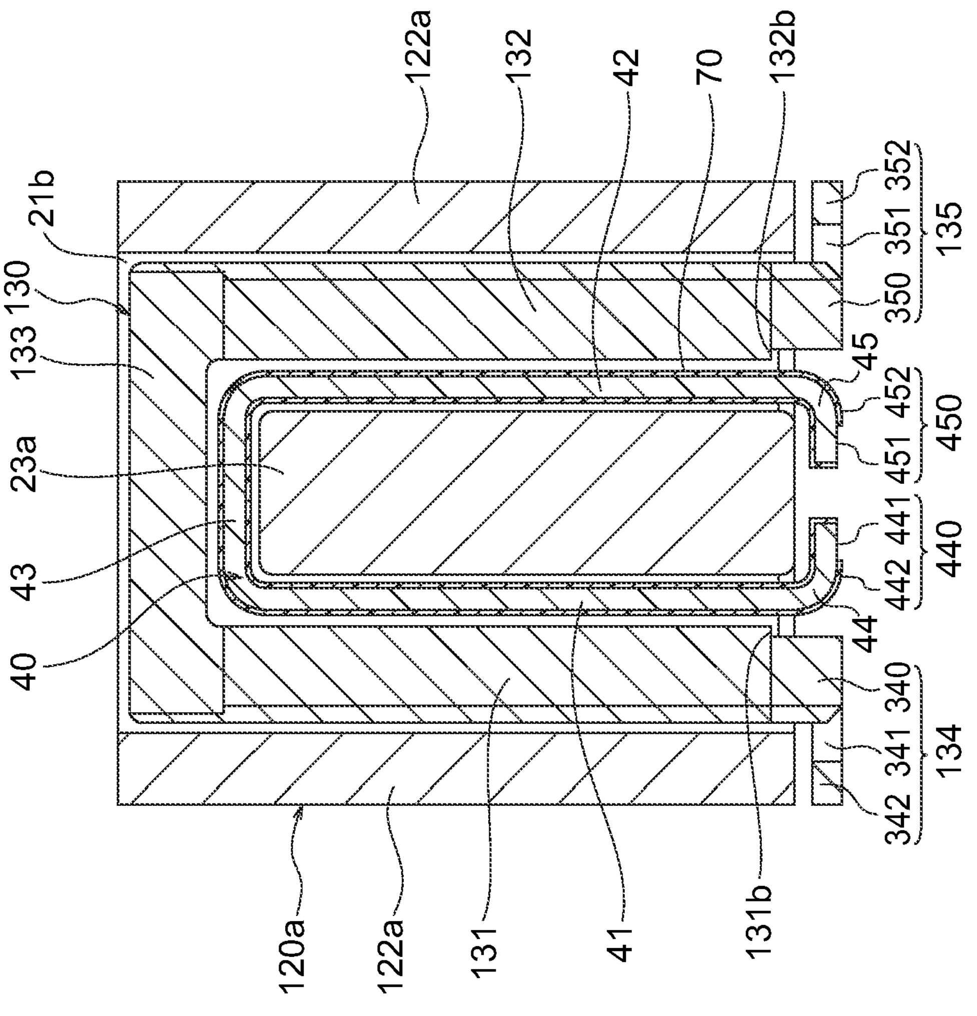
FIG. 6 is a cross-sectional view of the coil device shown in FIG. 4A along the VI-VI line.

In the present embodiment, since the step 131*b* (132*b*) is formed at the lower end of the conductor side part 131 (132) as shown in FIG. 6, a space is formed between the mounting part 134 (135) (mounting bending part 340 (350)) of the first conductor 130 and the mounting part 44 (45) of the second conductor 40 by the amount of the step 131*b* (132*b*), and it is possible to effectively prevent a short-circuit failure generated between the first conductor 130 and the second conductor 40 in the surroundings of the mounting surface of the mounting board (not shown).

Third Embodiment

A coil device 210 according to Third Embodiment of the present invention is different from the coil device 10 according to First Embodiment only in the following matters and has structure and effect similar to those of the coil device 10 according to First Embodiment. In the figures, common members with First Embodiment and Second Embodiment are given common references and are not explained.

Figure 7:
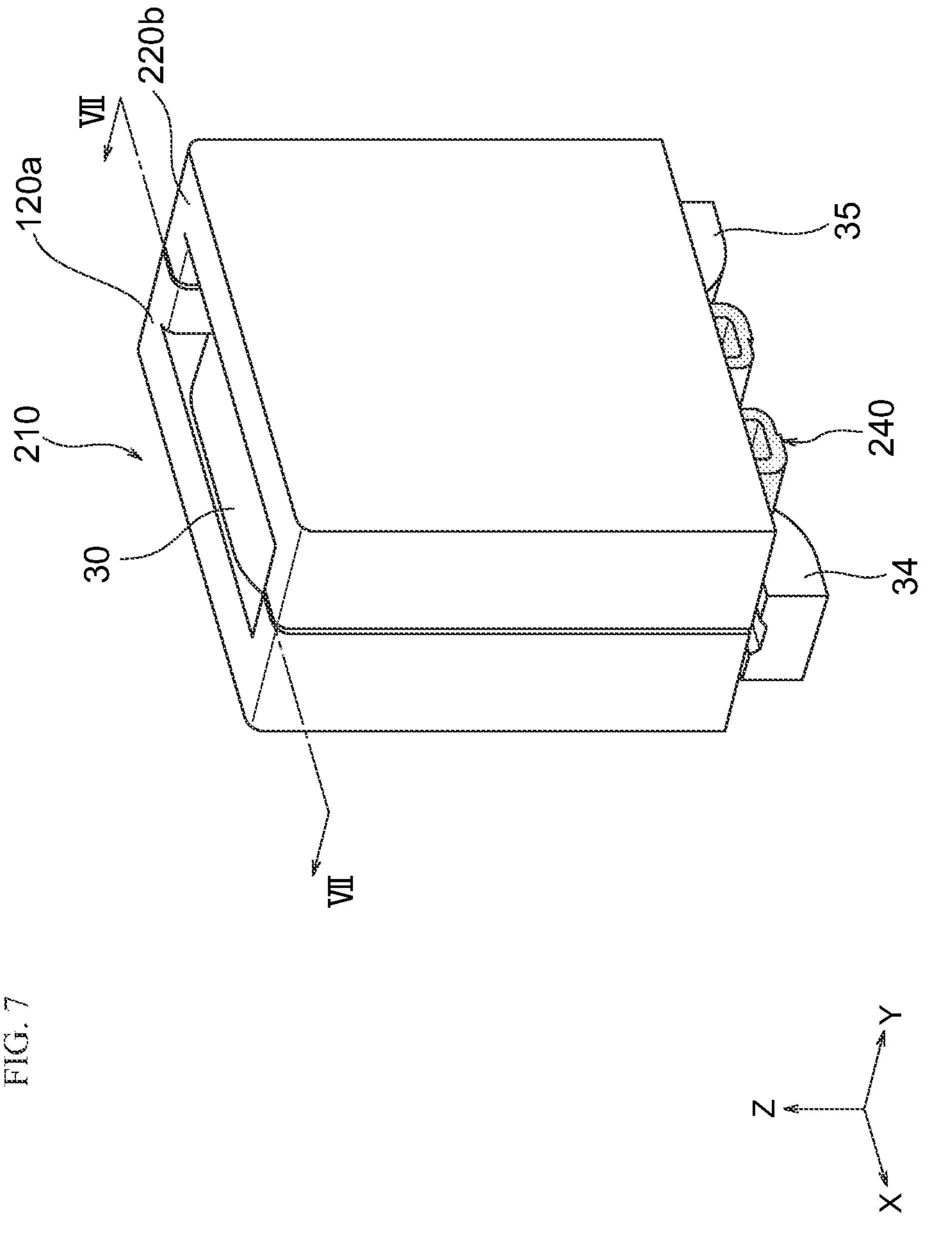
FIG. 7 is a perspective view of a coil device according to Third Embodiment of the present invention.

As shown in FIG. 7, the coil device 210 includes the first core 120*a*, a second core 220*b*, the first conductor 30, and a second conductor 240. The second core 220*b* has a similar shape to the first core 120*a*.

Figure 8:
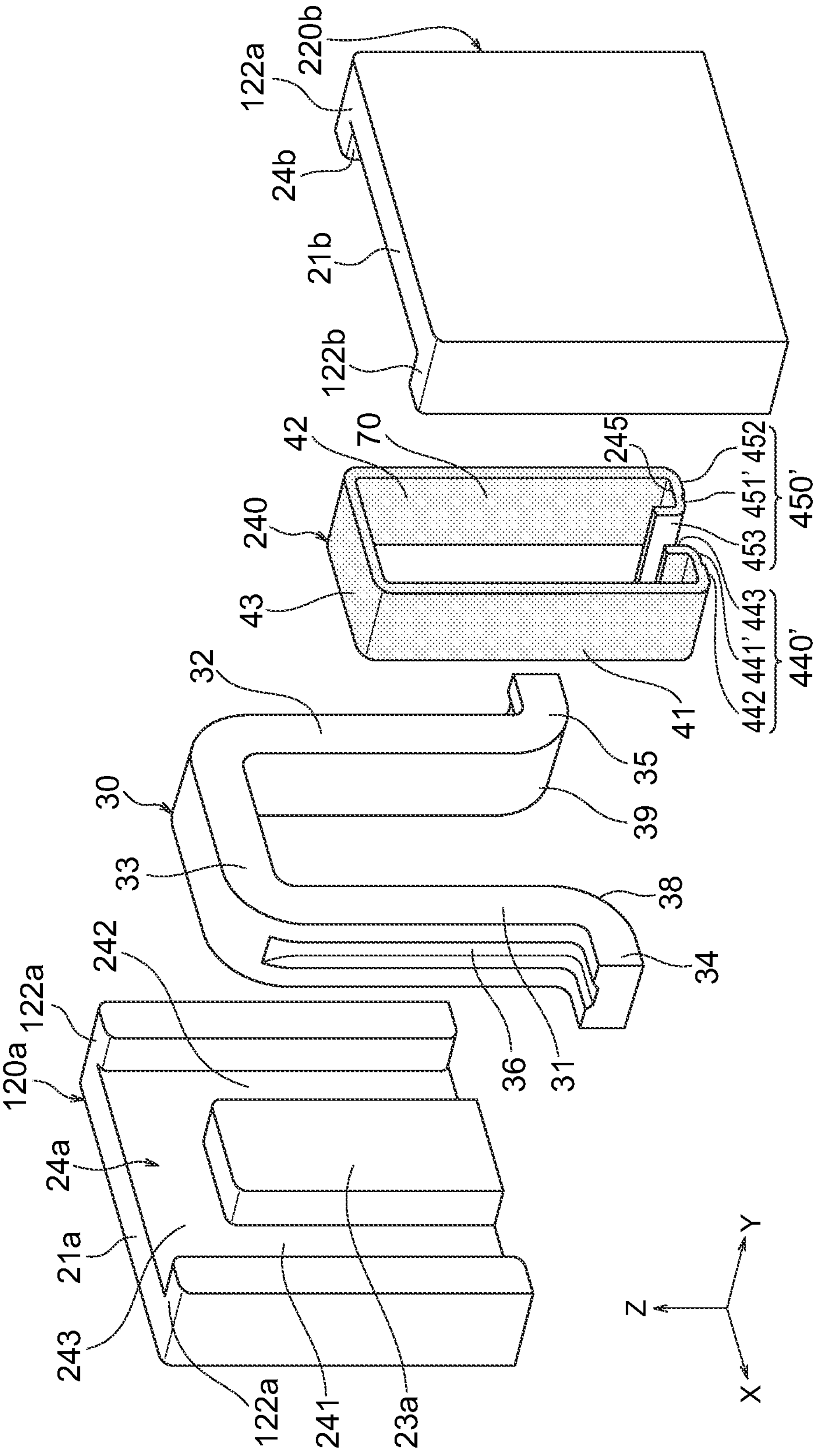
FIG. 8 is an exploded perspective view of the coil device shown in FIG. 7.
Figure 9:
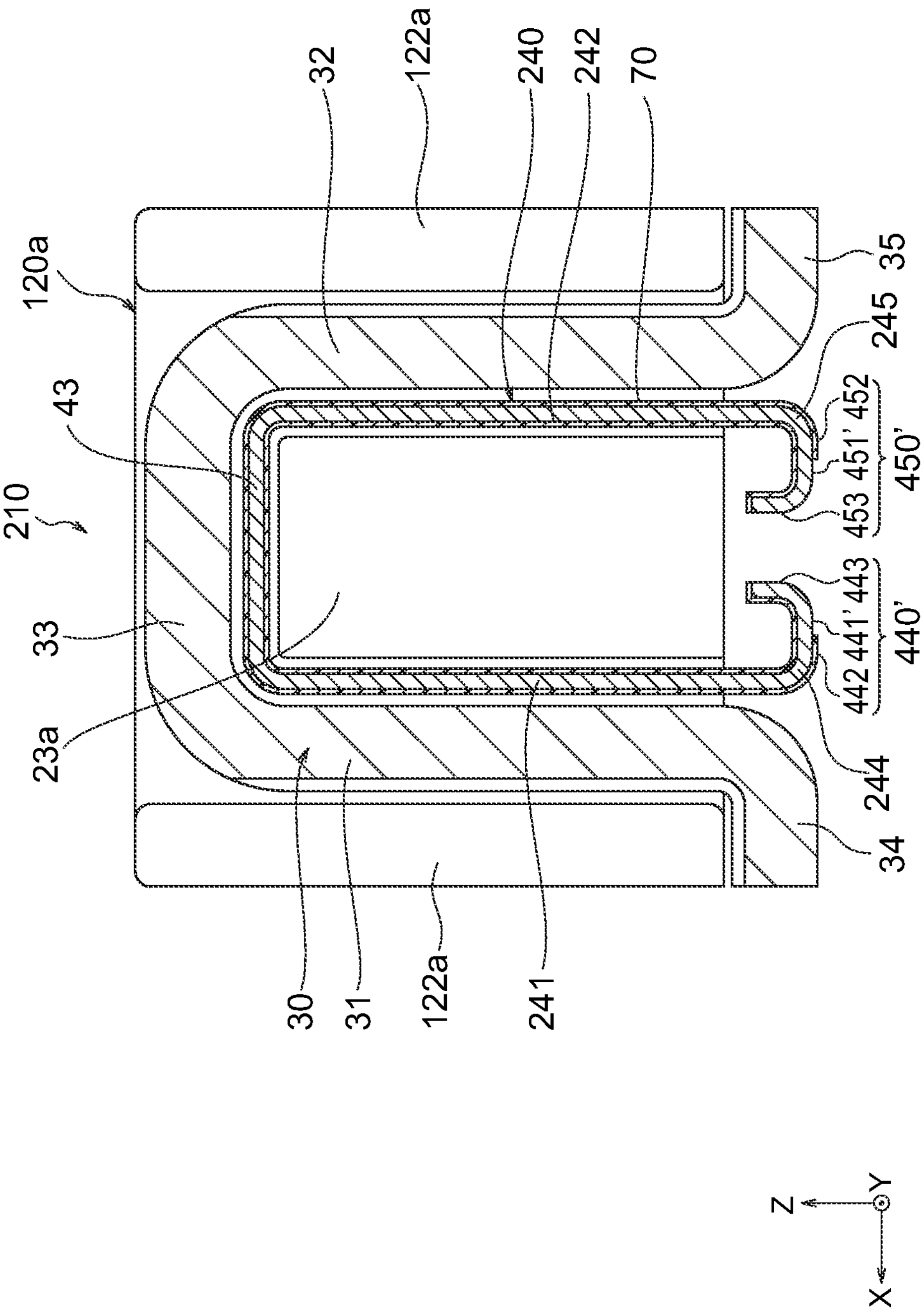
FIG. 9 is a cross-sectional view of the coil device shown in FIG. 7 along the VII-VII line.

As shown in FIG. 8, the second conductor 240 includes a first mounting part 244 and a second mounting part 245. The ends of the mounting parts 244 and 245 (each end of the second conductor 240) stand upward. As shown in FIG. 9, the end surface of the mounting part 244 (245) is disposed with a predetermined interval to the bottom surfaces of the middle legs 23*a* and 23*b* of the cores 120*a* and 220*b* in the Z-axis direction.

The first mounting part 244 includes a first mount facing surface 440', and the second mounting part 245 includes a second mount facing surface 450'. The first mount facing surface 440' includes a first standing part 443 standing from a mounting surface of a mounting board (not shown), and the second mount facing surface 450' includes a second standing part 453 standing from a mounting surface of a mounting board (not shown). The standing part 443 (453) stands from the mounting surface of the mounting board at a half-way position of a joinable surface 441' (451') in the X-axis direction.

In the present embodiment, effects similar to those of First Embodiment are also obtained, and the mount facing surface 440' (450') includes the standing part 443 (453). Thus, a connection member can be attached not only to an opposite surface to the mounting surface of the mounting board, but also to the standing part 443 (453) of the mounting part 244 (245). Thus, when the connection member is solder, a solder fillet can be formed on the standing part 443 (453), and the second conductor 240 can firmly be connected to the mounting surface of the mounting board. Moreover, it is possible to prevent a short-circuit failure generated between the mounting parts 244 and 245 due to formation of, for example, solder balls on the mounting parts 244 and 245 of the second conductor.

In the present embodiment, the bottom surfaces of the cores 120*a* and 220*b* are arranged separately from the mounting surface of the mounting board (not shown). For more detail, as shown in FIG. 7, the bottom surfaces of the cores 120*a* and 120*b* are arranged separately from the bottom surfaces of the mounting parts 34 and 35 to be connected with the mounting surface of the mounting board by a distance equal to or larger than the thickness of the first conductor 30. In the present embodiment, it is thereby possible to sufficiently secure the insulation between the bottom surfaces of the cores 120*a* and 220*b* and the mounting surface of the mounting board. In particularly, when the cores 120*a* and 220*b* are made of a metal magnetic material or so, it is possible to effectively prevent a short-circuit failure generated between the bottom surfaces of the cores 120*a* and 220*b* and the mounting surface.

Fourth Embodiment

A coil device 310 according to Fourth Embodiment of the present invention is different from the coil device 10 according to First Embodiment only in the following matters and has structure and effect similar to those of the coil device 10 according to First Embodiment. In the figures, common members with First Embodiment to Third Embodiment are given common references and are not explained.

Figure 10:
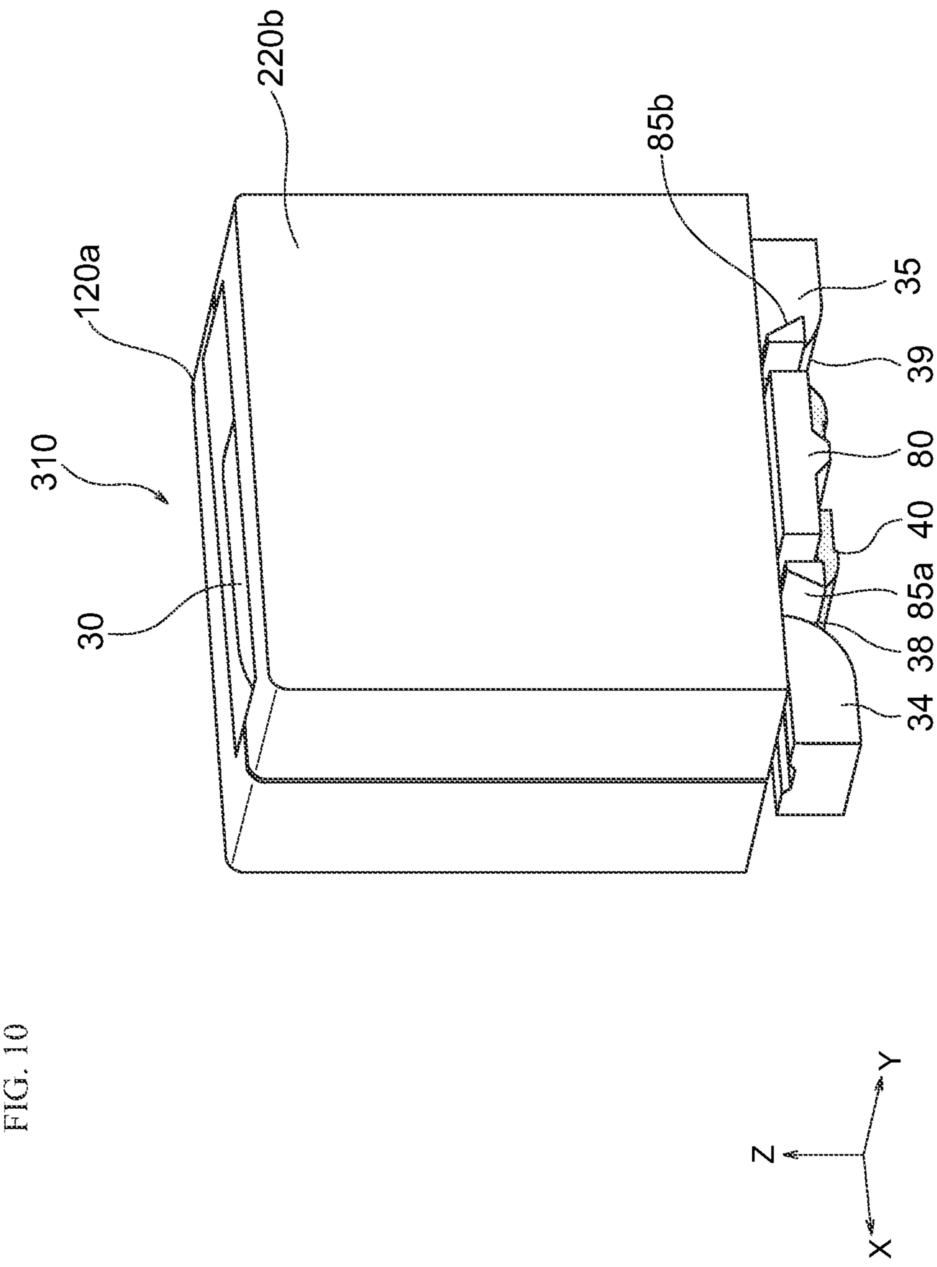
FIG. 10 is a perspective view of a coil device according to Fourth Embodiment of the present invention.

As shown in FIG. 10, the coil device 310 includes a first core 120*a*, a second core 220*b*, the first conductor 30, the second conductor 40, and a resin spacer 80. The resin spacer 80 is disposed below the cores 120*a* and 220*b* and fixed so as to straddle the first conductor 30 and the second conductor 40. The resin spacer 80 mainly favorably insulates the first conductor 30 and the second conductor 40.

Figure 11:
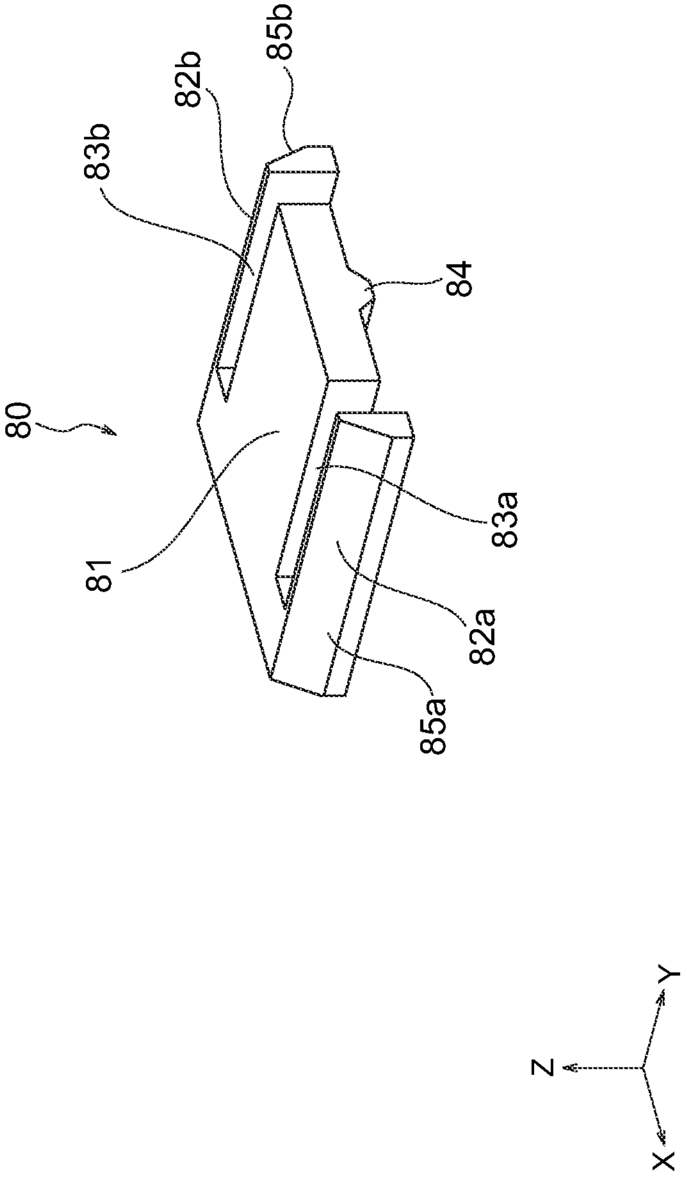
FIG. 11 is a perspective view of a resin spacer shown in FIG. 10.
Figure 12:
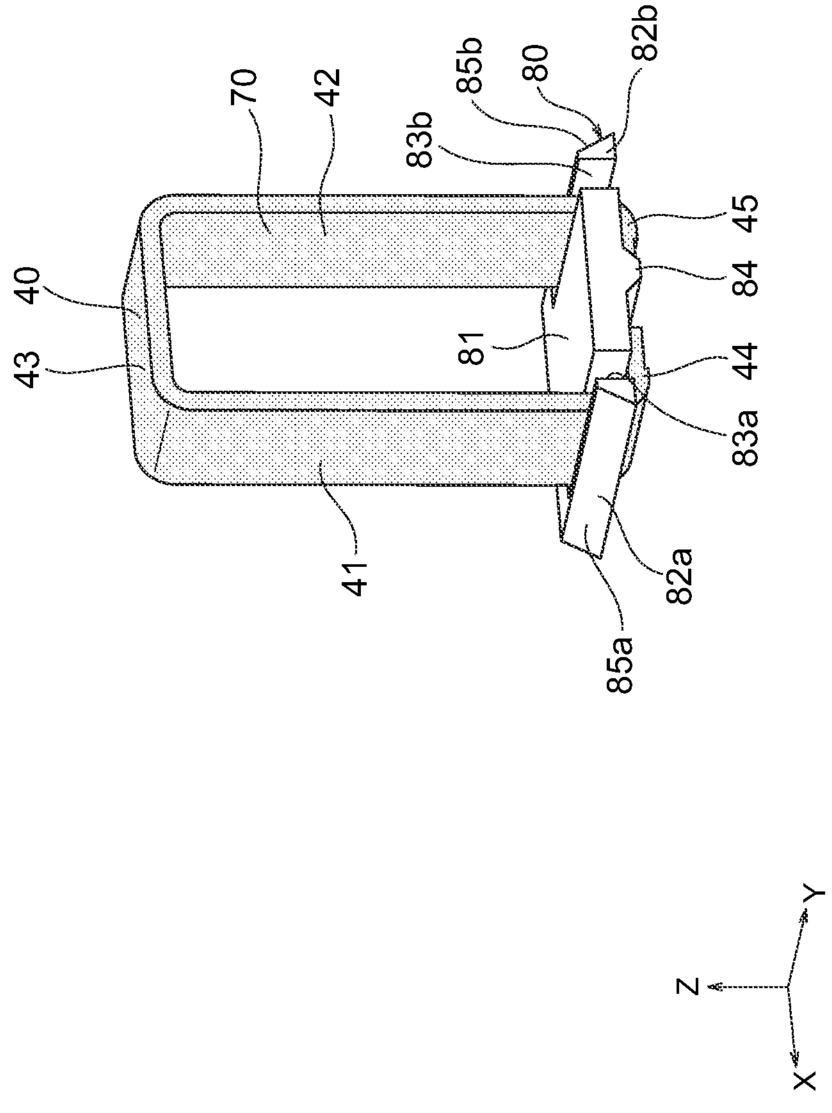
FIG. 12 is a perspective view of the resin spacer shown in FIG. 11 to which a second conductor is attached.

As shown in FIG. 11 and FIG. 12, the resin spacer 80 includes a base part 81, a first side insulating part 82*a*, a second side insulating part 82*b*, a first groove part 83*a*, a second groove part 83*b*, and a protrusion part 84.

The base part 81 has a flat plate shape. The base part 81 is disposed above the first mounting part 44 and the second mounting part 45 and fixed so as to be sandwiched by the lower ends of the first conductor side part 41 and the second conductor side part 42 of the second conductor 40.

The protrusion part 84 extending in the Y-axis direction is formed at an approximately central part of the base part 81 in the X-axis direction. The protrusion part 84 is disposed in the space formed between the mounting parts 44 and 45 of the second conductor 40. The downward protrusion width of the protrusion part 84 is substantially equal to the thickness (plate thickness) of the mounting part 44 (45). The protrusion part 84 can divide the mounting parts 44 and 45 in the X-axis direction. When the second conductor 40 is connected to a mounting surface of a mounting board (not shown) via a connection member, such as solder, the protrusion part 84 prevents a phenomenon (solder bridge) where the mounting parts 44 and 45 are connected by the connection member (solder balls).

The first groove part 83*a* is formed between the base part 81 and the first side insulating part 82*a*, and the second groove part 83*b* is formed between the base part 81 and the second side insulating part 82*b*. The groove part 83*a* (83*b*) extends in the Y-axis direction. One end of the groove part 83*a* (83*b*) in the Y-axis direction is closed, but the other end of the groove part 83*a* (83*b*) in the Y-axis direction is open. The lower end of the conductor side part 41 (42) of the second conductor 40 can be inserted into the groove part 83*a* (83*b*) via the other end of the groove part 83*a* (83*b*) in the Y-axis direction.

The first side insulating part 82*a* is disposed on one side of the base part 81 in the X-axis direction across the first groove part 83*a*. The second side insulating part 82*b* is disposed on the other side of the base part 81 in the X-axis direction across the second groove part 83*b*. The side insulating part 82*a* (82*b*) extends in the Y-axis direction and has a width in the Y-axis direction similar to that of the base part 81. A first inclined part 85*a* is formed on the upper surface of the first side insulating part 82*a*, and a second inclined part 85*b* is formed on the upper surface of the second side insulating part 82*b*.

The first side insulating part 82*a* is disposed between the first mounting part 34 of the first conductor 30 (FIG. 10) and the first conductor side part 41 of the second conductor 40. At this time, the first inclined part 85*a* is disposed along the shape of the first outer bending part 38 of the first conductor 30.

The second side insulating part 82*b* is disposed between the second mounting part 35 of the first conductor 30 (FIG. 10) and the second conductor side part 42 of the second conductor 40. At this time, the second inclined part 85*b* is disposed along the shape of the second outer bending part 39 of the first conductor 30.

When the conductors 30 and 40 are connected to the mounting surface of the mounting board (not shown) via a connection member, such as solder, the side insulating part 82*a* (82*b*) prevents a phenomenon (solder bridge) where the mounting part 34 (35) of the first conductor 30 and the mounting part 44 (45) of the second conductor 40 are connected by the connection member.

In the present embodiment, effects similar to those of First Embodiment are also obtained. In the present embodiment, the mounting part 34 (35) of the first conductor 30 and the mounting part 44 (45) of the second conductor 40 are insulated by the resin spacer 80. Thus, it is possible to effectively prevent a short-circuit failure generated between the first mounting part 34 (35) and the second mounting part 44 (45).

Fifth Embodiment

A coil device 410 according to Fifth Embodiment of the present invention is different from the coil device 310 according to Fourth Embodiment only in the following matters and has structure and effect similar to those of the coil device 310 according to Fourth Embodiment. In the figures, common members with Fourth Embodiment are given common references and are not explained.

Figure 13:
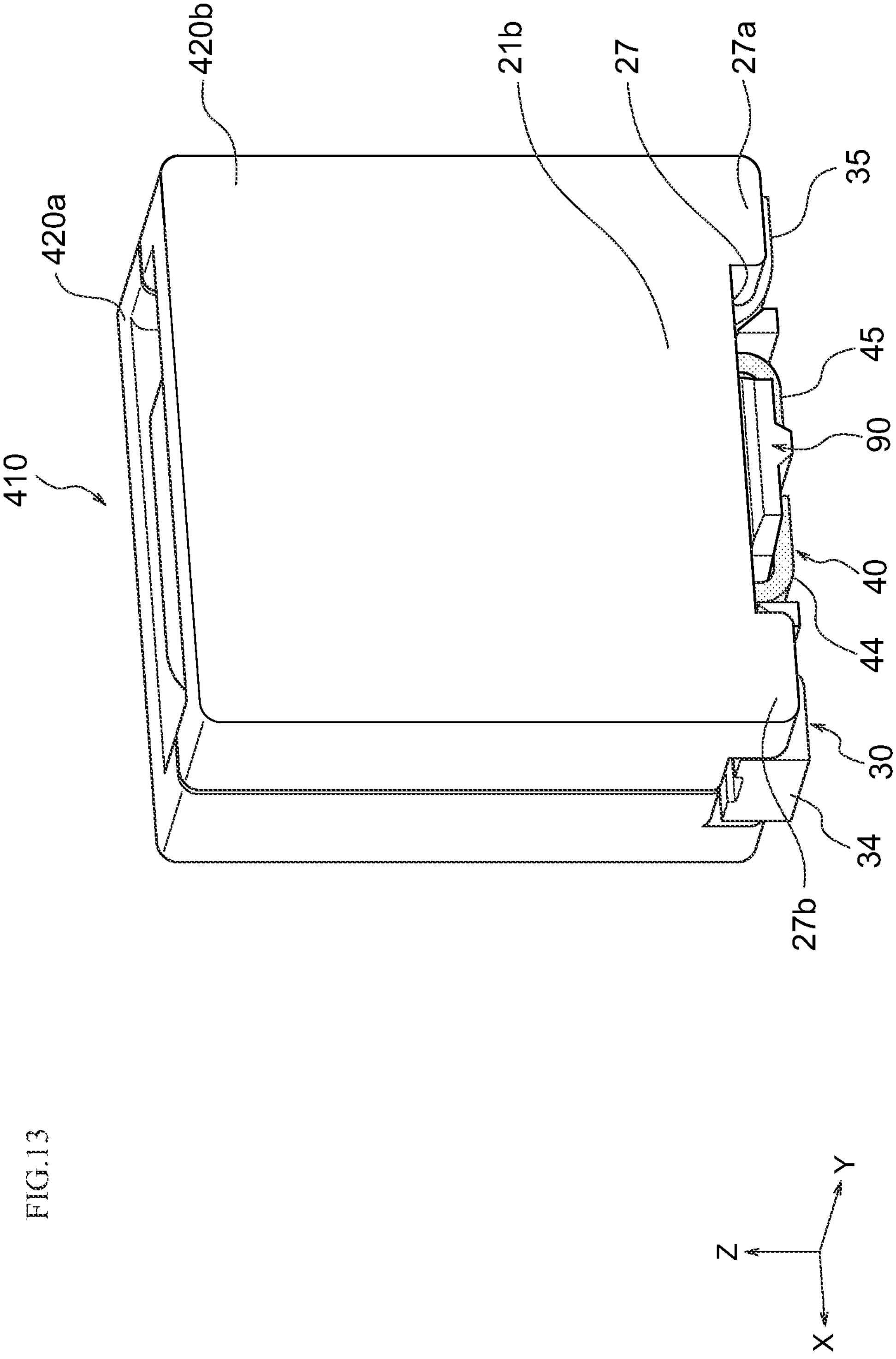
FIG. 13 is a perspective view of a coil device according to Fifth Embodiment of the present invention.

As shown in FIG. 13, the coil device 410 includes a first core 420*a*, a second core 420*b*, and a resin spacer 90. The second core 420*b* includes a bottom-surface concave part 27. The bottom-surface concave part 27 is formed on the bottom of the second base 21*b* of the second core 420*b* and is recessed upward in the Z-axis direction from the bottom of the second base 21*b*. The bottom-surface concave part 27 has a predetermined length in the X-axis direction and is formed continuously from one side to the other side of the second base 21*b* in the X-axis direction. Although not illustrated in detail, the bottom-surface concave part 27 is also formed on the bottom of the first base 21*a* of the first core 420*a*. The bottom-surface concave part 27 is disposed so that the resin spacer 90 does not interfere (contact) when the resin spacer 90 is disposed on the bottoms of the cores 420*a* and 420*b*. Thus, the depth of the bottom-surface concave parts 27 in the Z-axis direction is preferably equal to or larger than the thickness of the resin spacer 90 in the Z-axis direction.

A bottom-surface convex part 27*a* is formed at one end of the concave part 27 in the X-axis direction, and a bottom-surface convex part 27*b* is formed at the other end of the concave part 27 in the X-axis direction. The bottom surfaces of the bottom-surface convex part 27*a* and the bottom-surface convex part 27*b* are located higher than the bottom surfaces of the first mounting part 34 and the second mounting part 35 of the first conductor 30 and are located higher than the bottom surfaces of the first mounting part 44 and the second mounting part 45 of the second conductor 40. Incidentally, the bottom-surface convex parts 27*a* and 27*b* may not be formed (see FIG. 10).

Figure 14A:
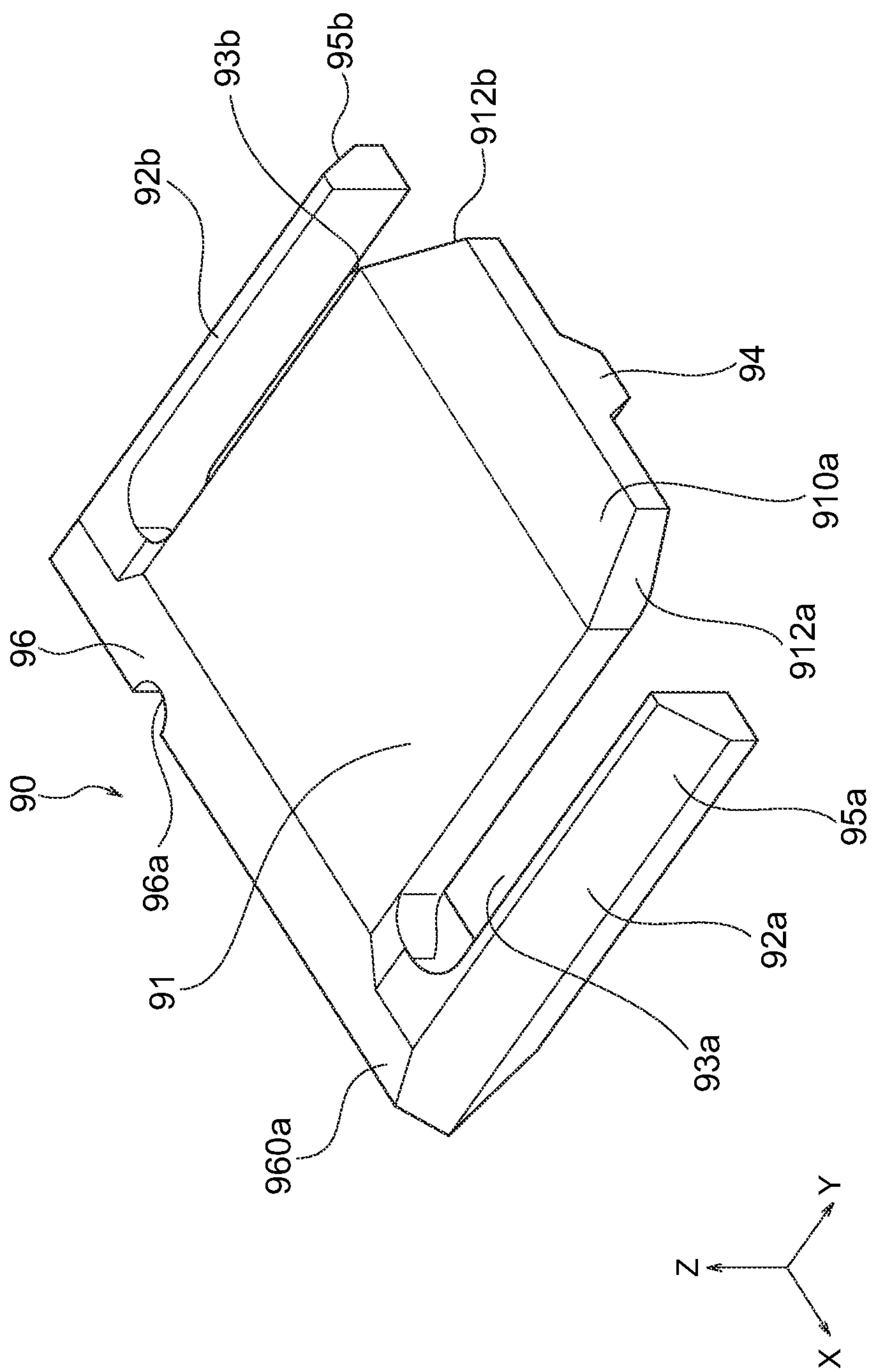
FIG. 14A is a perspective view of a resin spacer shown in FIG. 13.

As shown in FIG. 14A, the resin spacer 90 includes an inner insulating part 91, a first side insulating part 92*a*, a second side insulating part 92*b*, a first groove part 93*b*, a second groove part 93*b*, a protrusion part 94, and a connection part 96. The resin spacer 90 is attached at the positions of the first mounting part 44 and the second mounting part 45 of the second conductor 40.

Figure 15:
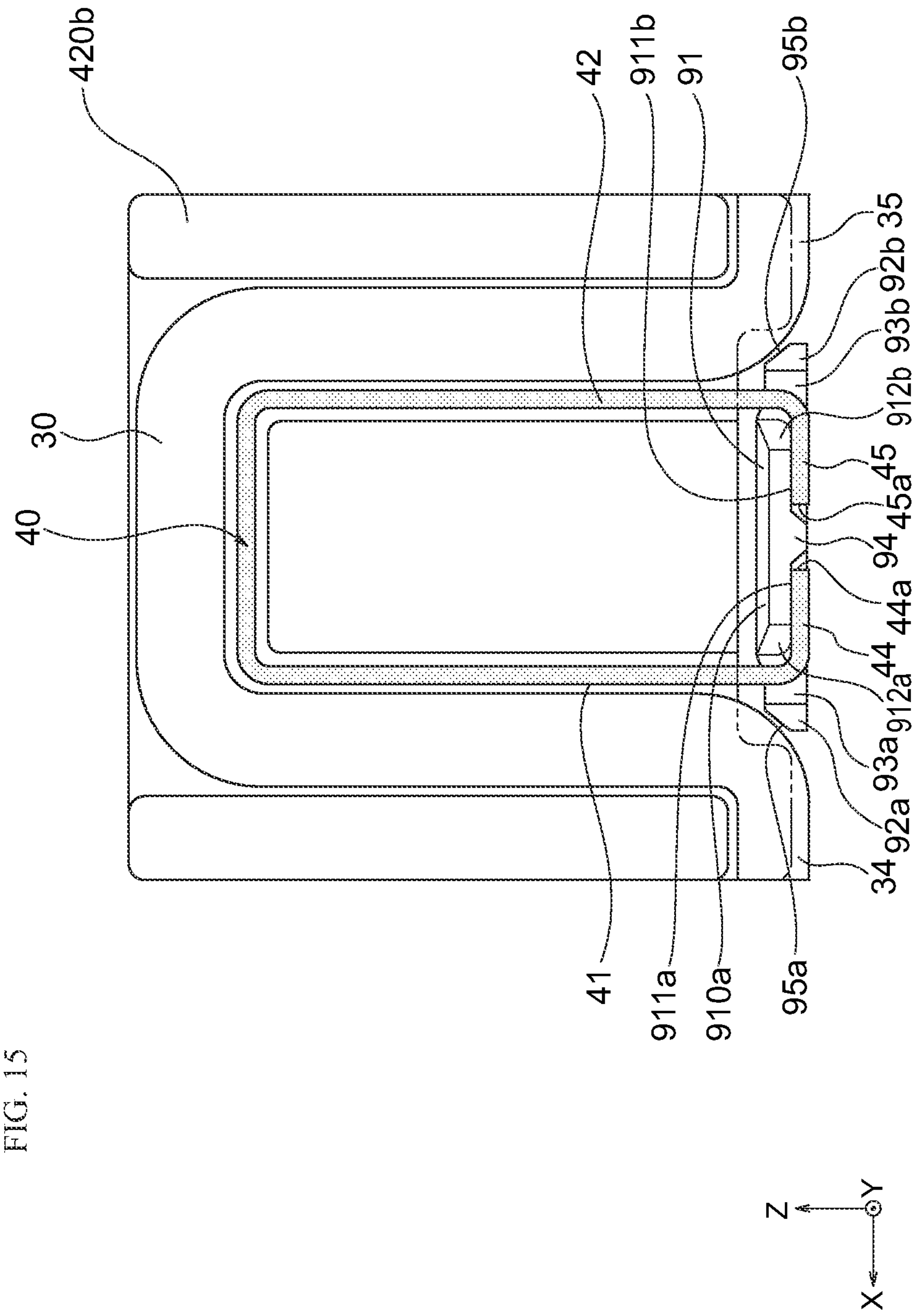
FIG. 15 is a side view illustrating an inside state of the coil device shown in FIG. 13.

The inner insulating part 91 has a substantially flat plate shape and extends in the Y-axis direction. As shown in FIG. 15, the inner insulating part 91 is disposed above the first mounting part 44 and the second mounting part 45 of the second conductor 40 and is fixed so as to be sandwiched between the lower end of the first conductor side part 41 and the lower end of the second conductor side part 42 of the second conductor 40. For more detail, between one end and the other end of the second conductor 40, the inner insulating part 91 is disposed between the bottom surfaces of the cores 420*a* and 420*b* and the first mounting part 44 of the second conductor 40 and between the bottom surfaces of the cores 420*a* and 420*b* and the second mounting part 45 of the second conductor 40.

The inner insulating part 91 mainly has a function of insulating between the cores 420*a* and 420*b* and the mounting parts 44 and 45 of the second conductor 40. That is, when the inner insulating part 91 is partly disposed between the bottom surfaces of the cores 420*a* and 420*b* and the first mounting part 44, the insulation distance therebetween can be secured sufficiently via the inner insulating part 91, and the bottom surfaces of the cores 420*a* and 420*b* and the first mounting part 44 can be insulated sufficiently. Likewise, when the inner insulating part 91 is partly disposed between the bottom surfaces of the cores 420*a* and 420*b* and the second mounting part 45, the insulation distance therebetween can be secured sufficiently via the inner insulating part 91, and the bottom surfaces of the cores 420*a* and 420*b* and the second mounting part 45 can be insulated sufficiently.

When the inner insulating part 91 is partly disposed between the bottom surfaces of the cores 420*a* and 420*b* and the first mounting part 44 of the second conductor 40 so as to fill the space therebetween with a part of the inner insulating part 91, it is possible to effectively prevent a problem that the first mounting part 44 and the bottom surfaces of the cores 420*a* and 420*b* are connected by a solder ball in connecting the first mounting part 44 to a land pattern of the mounting board with, for example, solder (generation of short-circuit failure). Likewise, when the inner insulating part 91 is partly disposed between the bottom surfaces of the cores 420*a* and 420*b* and the second mounting part 45 of the second conductor 40 so as to fill the space therebetween with a part of the inner insulating part 91, it is possible to effectively prevent a problem that the second mounting part 45 and the bottom surfaces of the cores 420*a* and 420*b* are connected by a solder ball in connecting the second mounting part 45 to a land pattern of the mounting board with, for example, solder (generation of short-circuit failure).

The upper surface of the inner insulating part 91 and the bottom surfaces of the cores 420*a* and 420*b* are not in contact, and a gap is formed between the upper surface of the inner insulating part 91 and the bottom surfaces of the cores 420*a* and 420*b*. The width of the inner insulating part 91 in the X-axis direction is smaller than the gap between the first conductor side part 41 and the second conductor side part 42 of the second conductor 40, and the inner insulating part 91 can thereby smoothly be inserted (disposed) in the Y-axis direction between the first conductor side part 41 and the second conductor side part 42.

As shown in FIG. 14A, an outer inclined part 910*a* is formed on the upper surface of the inner insulating part 91. The outer inclined part 910*a* has a taper surface and is inclined so as to be lower outward in the Y-axis direction at the end of the inner insulating part 91 on the positive side in the Y-axis direction. Since the outer inclined part 910*a* is provided, the thickness of the inner insulating part 91 in the Z-axis direction becomes smaller outward in the Y-axis direction. As shown in FIG. 15, the outer inclined part 910*a* is inclined so as to be separated from the bottom surfaces of the cores 420*a* and 420*b* in the Z-axis direction. The outer inclined part 910*a* is formed only on the upper surface of the inner insulating part 91, but may also be formed on the lower surface of the inner insulating part 91.

When the outer inclined part 910*a* is formed on at least one of the upper surface and the lower surface of the inner insulating part 91, the inner insulating part 91 can be prevented from interfering (contacting) with, for example, the bottom surfaces of the cores 420*a* and 420*b* in attaching the resin spacer 90 to the second conductor 40, and the resin spacer 90 is attached smoothly.

As shown in FIG. 14A, a side inclined part 912*a* is formed on one side of the inner insulating part 91 the X-axis direction, and a side inclined part 912*b* is formed on the other side of the inner insulating part 91 in the X-axis direction. The side inclined part 912*a* (912*b*) has a taper surface and is inclined inward in the X-axis direction at the end of the inner insulating part 91 on the positive side in the Y-axis direction. Since the side inclined parts 912*a* and 912*b* are provided, the width of the inner insulating part 91 in the X-axis direction becomes smaller outward in the Y-axis direction. As shown in FIG. 15, the side inclined part 912*a* is inclined so as to be separated from the lower end of the first conductor side part 41 of the second conductor 40 in the X-axis direction, and the side inclined part 912*b* is inclined so as to be separated from the lower end of the second conductor side part 42 of the second conductor 40 in the X-axis direction.

When the inner insulating part 91 is provided with the side inclined parts 912*a* and 912*b*, both ends of the resin spacer 90 in the X-axis direction can be prevented from interfering (contacting) with the first conductor side part 41 and the second conductor side part 42 of the second conductor 40 in attaching the resin spacer 90 to the second conductor 40, and the resin spacer 90 is attached smoothly.

Figure 14B:
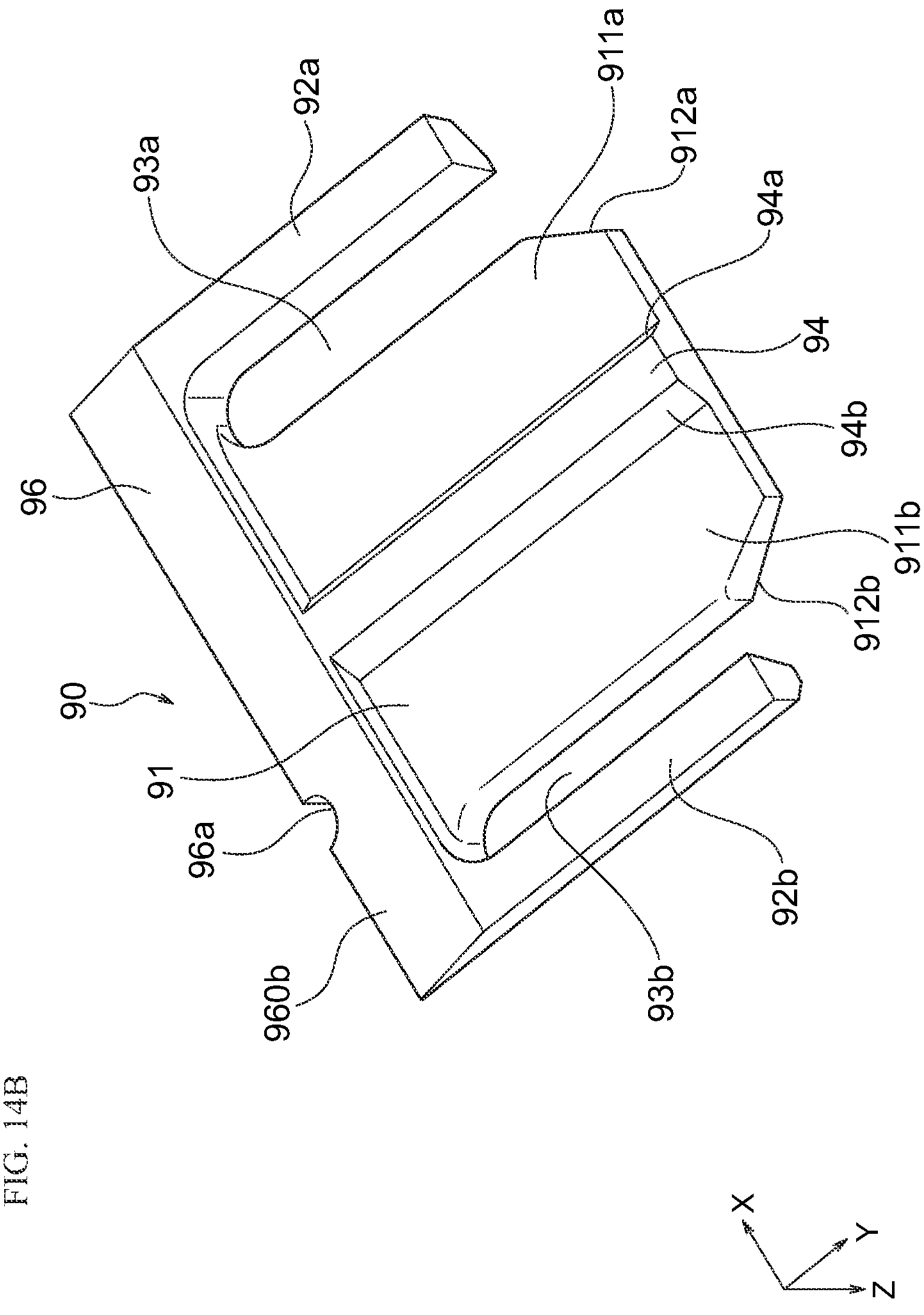
FIG. 14B is a perspective view of a bottom surface of the resin spacer shown in FIG. 14A.

As shown in FIG. 14B, the protrusion part 94 is formed on the lower surface (bottom surface) of the inner insulating part 91. The protrusion part 94 protrudes from the lower surface of the inner insulating part 91 and extends in the Y-axis direction. A bottom inclined part 94*a* is formed on one side surface of the protrusion part 94 in the X-axis direction, and a bottom inclined part 94*b* is formed on the other side surface of the protrusion part 94 in the X-axis direction. The protrusion part 94 has a tapering shape in its protruding direction, and the cross-sectional shape (cross-sectional shape parallel to the XZ plane) of the protrusion part 94 is substantially trapezoidal. One end of the protrusion part 94 in the Y-axis direction is connected to the connection part 96, and the other end of the protrusion part 94 in the Y-axis direction is located at the other end of the inner insulating part 91 in the Y-axis direction.

As shown in FIG. 15, the protrusion part 94 is at least partly (the whole of the protrusion part 94 in the present embodiment) disposed between the first mounting part 44 and the second mounting part 45 of the second conductor 40. When the protrusion part 94 is formed on the lower surface of the inner insulating part 91, a tip 44*a* of the first mounting part 44 and a tip 45*a* of the second mounting part 45 can be insulated favorably via the protrusion part 94, and it is possible to prevent a problem that they are connected by, for example, a solder ball (generation of short-circuit failure). Incidentally, the lower surface (protrusion surface) of the protrusion part 94 is substantially flush with the lower surface of the connection part 96 and the lower surfaces of the side insulating parts 92*a* and 92*b*.

As shown in FIG. 14B, a first step surface 911*a* and a second step surface 911*b* are formed on the lower surface of the inner insulating part 91. The first step surface 911*a* is formed on the positive side of the protrusion part 94 in the X-axis direction, and the second step surface 911*b* is formed on the negative side of the protrusion part 94 in the X-axis direction. The step height of the step surfaces 911*a* and 911*b* corresponds with the protrusion length of the protrusion part 94. As shown in FIG. 15, the upper surface of the first mounting part 44 is in contact with the first step surface

911*a*, and the upper surface of the second mounting part 45 is in contact with the second step surface 911*b*. Thus, the first mounting part 44 is fixed to the first step surface 911*a*, the second mounting part 45 is fixed to the second step surface 911*b*, and the resin spacer 90 can thereby be attached to the second conductor 40 in a stable state.

The step height of the first step surface 911*a* is smaller than the thickness of the first mounting part 44. Thus, the lower surface of the first mounting part 44 is located below (protruding) the tip of the protrusion part 94 in a state where the upper surface of the first mounting part 44 is in contact with the first step surface 911*a*. Likewise, the step height of the second step surface 911*b* is smaller than the thickness of the second mounting part 45. Thus, the lower surface of the second mounting part 45 is located below (protruding) the tip of the protrusion part 94 in a state where the upper surface of the second mounting part 45 is in contact with the second step surface 911*b*.

In a state where the resin spacer 90 is attached to the second conductor 40, the lower surface of the first mounting part 44 is located lower than the lower surface of the first side insulating part 92*a* of the resin spacer 90, and the lower surface of the second mounting part 45 is located lower than the lower surface of the second side insulating part 92*b* of the resin spacer 90. In the present embodiment, as a result, the bottom surface of the resin spacer 90 is disposed higher than the lower surfaces of the first mounting part 44 and the second mounting part 45 of the second conductor 40 and is disposed higher than the lower surfaces of the first mounting part 34 and the second mounting part 35 of the first conductor 30.

In such a configuration, when the coil device 410 is mounted on the mounting board in a state where the resin spacer 90 is attached to the second conductor 40, the resin spacer 90 can be prevented from interfering (contacting) with the mounting board, and the mounting strength between the coil device 410 and the mounting board can be secured sufficiently.

As shown in FIG. 14A, the first side insulating part 92*a* is disposed next to the positive side of the inner insulating part 91 in the X-axis direction and linearly extends in the Y-axis direction with a predetermined length, and the second side insulating part 92*b* is disposed next to the negative side of the inner insulating part 91 in the X-axis direction and linearly extends in the Y-axis direction with a predetermined length. The length of the side insulating parts 92*a* and 92*b* in the Y-axis direction is smaller than that of the inner insulating part 91 in the Y-axis direction. Thus, the length of the side insulating parts 92*a* and 92*b* in the Y-axis direction is comparatively small, and it is possible to enhance the durability of the side insulating parts 92*a* and 92*b* and prevent the breakage of the side insulating parts 92*a* and 92*b*.

As shown in FIG. 15, the thickness of the side insulating parts 92*a* and 92*b* in the Z-axis direction is smaller than that of the inner insulating part 91 in the Z-axis direction, and a step is formed between the upper surfaces of the side insulating parts 92*a* and 92*b* and the upper surface of the inner insulating part 91.

The first side insulating part 92*a* is disposed between the first mounting part 34 of the first conductor 30 and the first mounting part 44 of the second conductor 40. Thus, the insulation distance therebetween can be secured sufficiently via the first side insulating part 92*a*, and the first mounting part 34 of the first conductor 30 and the first mounting part 44 of the second conductor 40 can be insulated sufficiently. Likewise, the second side insulating part 92*b* is disposed between the second mounting part 35 of the first conductor 30 and the second mounting part 45 of the second conductor 40. Thus, the insulation distance therebetween can be secured sufficiently via the second side insulating part 92*b*, and the second mounting part 35 of the first conductor 30 and the second mounting part 45 of the second conductor 40 can be insulated sufficiently.

As shown in FIG. 14A, a first inclined part 95*a* is formed on the upper surface of the first side insulating part 92*a*, and a second inclined part 95*b* is formed on the upper surface of the second side insulating part 92*b*. The first inclined part 95*a* extends continuously in the longitudinal direction of the first side insulating part 92*a*, and the second inclined part 95*b* extends continuously in the longitudinal direction of the second side insulating part 92*b*.

As shown in FIG. 15, the first inclined part 95*a* is inclined so as to be lower toward the positive side in the X-axis direction at a position facing the first mounting part 34 of the first conductor 30, and the second inclined part 95*b* is inclined so as to be lower toward the negative side in the X-axis direction at a position facing the second mounting part 35 of the first conductor 30.

When the first side insulating part 92*a* is provided with the first inclined part 95*a*, the first side insulating part 92*a* can be prevented from interfering (contacting) with the first mounting part 34 of the first conductor 30 in disposing the first side insulating part 92*a* between the first mounting part 34 of the first conductor 30 and the first mounting part 44 of the second conductor 40. When the second side insulating part 92*b* is provided with the second inclined part 95*b*, the second side insulating part 92*b* can be prevented from interfering (contacting) with the second mounting part 35 of the first conductor 30 in disposing the second side insulating part 92*b* between the second mounting part 35 of the first conductor 30 and the second mounting part 45 of the second conductor 40.

As shown in FIG. 14A, a first groove part (first gap) 93*a* is formed between the first side insulating part 92*a* and one end of the inner insulating part 91 in the X-axis direction, and a second groove part (second gap) 93*b* is formed between the second side insulating part 92*b* and the other end of the inner insulating part 91 in the X-axis direction. In the present embodiment, one end of the second conductor 40 (the lower end of the first conductor side part 41) is engaged with the first groove part 93*a*, and the other end of the second conductor 40 (the lower end of the second conductor side part 42) is engaged with the second groove part 93*b*. Thus, the resin spacer 90 can be attached to the second conductor 40, and the resin spacer 90 is easily attached to the second conductor 40.

The end of the first side insulating part 92*a* on the negative side in the Y-axis direction, the end of the second side insulating part 92*b* on the negative side in the Y-axis direction, and the end of the inner insulating part 91 on the negative side in the Y-axis direction are connected by the connection part 96. The connection part 96 extends in the X-axis direction. When the first side insulating part 92*a*, the second side insulating part 92*b*, and the inner insulating part 91 are connected by the connection part 96 in the X-axis direction, it is possible to configure the resin spacer 90 in which these are integrated via the connection part 96, and it is easier to attach the resin spacer 90 to the second conductor 40 as compared with the case where these are configured separately. Incidentally, the end of the first side insulating part 92*a* on the positive side in the Y-axis direction, the end of the second side insulating part 92*b* on the positive side in the Y-axis direction, and the end of the inner insulating part

91 on the positive side in the Y-axis direction are not connected by a connection part, and the positive side of the first groove part 93*a* in the Y-axis direction and the positive side of the second groove part 93*b* in the Y-axis direction are open.

An outer inclined part 960*a* inclined so as to be lower toward the negative side in the Y-axis is formed on the upper surface of the connection part 96. The outer inclined part 960*a* is formed continuously from one end to the other end of the connection part 96 in the X-axis direction. As shown in FIG. 14B, an outer inclined part 960*b* inclined so as to be lower toward the negative side in the Y-axis is formed on the lower surface of the connection part 96. The outer inclined part 960*b* is formed continuously from one end to the other end of the connection part 96 in the X-axis direction. The outer inclined part 960*a* and the outer inclined part 960*b* have symmetrical shapes.

As mentioned below, an attachment treatment of an assembly of the first conductor 30 and the second conductor 40 to the cores 420*a* and 420*b* is carried out after the resin spacer 90 is attached to the second conductor 40. When the connection part 96 is provided with the outer inclined parts 960*a* and 960*b*, however, the connection part 96 can be prevented from interfering (contacting) with, for example, the bottom surfaces of the cores 420*a* and 420*b* during the attachment treatment, and the attachment treatment can be carried out easily.

A notch part 96*a* is formed at the end of the connection part 96 on the negative side in the Y-axis direction. The notch part 96*a* is made of a notch recessed from the end of the connection part 96 on the negative side in the Y-axis direction toward the positive side in the Y-axis direction. The notch part 96 is provided so that the front and back surfaces of the resin spacer 90 can easily be determined with an imaging device such as a CCD camera. The notch part 96*a* is disposed on the negative side of the center of the connection part 96 in the X-axis direction, but may be disposed on the positive side. When the notch part 96*a* is disposed on one side of the connection part 96 in the X-axis direction, the front and back surfaces of the resin spacer 90 is determined easily.

Figure 16A:
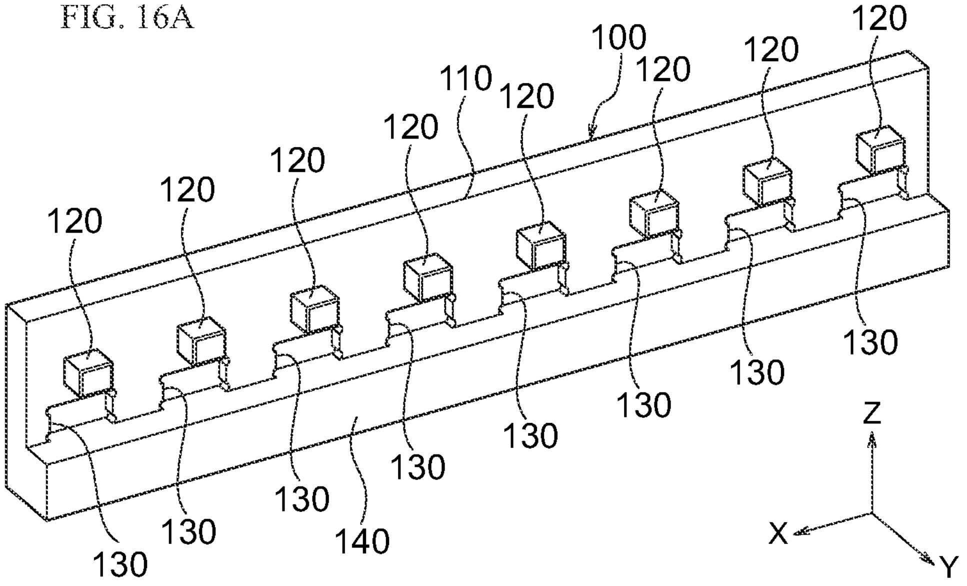
FIG. 16A is a perspective view for mainly explaining a method of attaching a resin spacer to a second conductor with respect to a method of manufacturing the coil device shown in FIG. 13.

Next, a method of manufacturing the coil device 410 is described focusing on a method of attaching the resin spacer 90 to the second conductor 40. First of all, the resin spacer 90 is attached to the second conductor 40, but the attachment of the resin spacer 90 to the second conductor 40 is carried out using a jig 100 as shown in FIG. 16A. The jig 100 includes a jig main body part 110, conductor fixation parts 120, spacer insertion parts 130, and a conductor installation part 140.

The jig main body part 110 has a substantially rectangular parallelepiped shape with a longitudinal direction in the X-axis direction. A plurality (eight) of conductor fixation parts 120 are arranged at regular intervals in the X-axis direction on the surface of the jig main body part 110 on the positive side in the Y-axis direction. The conductor fixation parts 120 have a substantially rectangular parallelepiped shape and protrude toward the positive side in the Y-axis direction. The inner surface of the second conductor 40 having a substantially C shape can be hooked on the outer surfaces of the conductor fixation parts 120, and the second conductor 40 can thereby be fixed to the conductor fixation parts 120 (See FIG. 16B).

The width of the conductor fixation parts 120 in the X-axis direction is preferably equal to or smaller than (more preferably, substantially equal to) the interval between the first conductor side part 41 and the second conductor side part 42 of the second conductor 40 in the X-axis direction. This makes it possible to fix the second conductor 40 to the conductor fixation parts 120 securely or without positional displacement.

A plurality (eight) of spacer insertion parts 130 are arranged at regular intervals in the X-axis direction on the surface of the jig main body part 110 on the positive side in the Y-axis direction. Each of the plurality of spacer insertion parts 130 is formed at a position of each of the plurality of conductor fixation parts 120. For more detail, the spacer insertion parts 130 are formed at the positions displaced below the conductor fixation parts 120. The spacer insertion parts 130 have a concave shape recessed from the surface of the jig main body part 110 on the positive side in the Y-axis direction toward the negative side of the jig main body part 110 in the Y-axis direction, and the resin spacer 90 can partly (the end of the inner insulating part 91 on the positive side in the Y-axis direction and the ends of the side insulating parts 92*a* and 92*b* on the positive side in the Y-axis direction shown in FIG. 14A) be disposed in the inside.

The width of the spacer insertion parts 130 in the X-axis direction is preferably equal to or smaller than (more preferably, substantially equal to) the width of the resin spacer 90 shown in FIG. 14A in the X-axis direction. This makes it possible to prevent the resin spacer 90 from being positionally displaced in the X-axis direction in partly disposing the resin spacer 90 in the spacer insertion parts 130.

The conductor installation part 140 has a substantially rectangular parallelepiped shape with a longitudinal direction in the X-axis direction and is connected to the lower end of the jig main body part 110. The width of the conductor installation part 140 in the X-axis direction is substantially equal to the width of the jig main body part 110 in the X-axis direction. The conductor installation part 140 has a shape protruding toward the positive side in the Y-axis direction from the surface of the jig main body part 110 on the positive side in the Y-axis direction.

The mounting parts 34 and 35 of the first conductor 30 and the mounting parts 44 and 45 of the second conductor 40 can be installed on the upper surface of the conductor installation part 140. Preferably, the width of the conductor installation part 140 in the Y-axis direction (the protrusion length from the surface of the conductor fixation part 120 on the positive side in the Y-axis direction) is larger than the width in the Y-axis direction of the mounting parts 34 and 35 of the first conductor 30 and the mounting parts 44 and 45 of the second conductor 40. This makes it possible to install the mounting parts 34 and 35 of the first conductor 30 and the mounting parts 44 and 45 of the second conductor 40 on the upper surface of the conductor installation part 140 in a stable state.

Figure 16B:
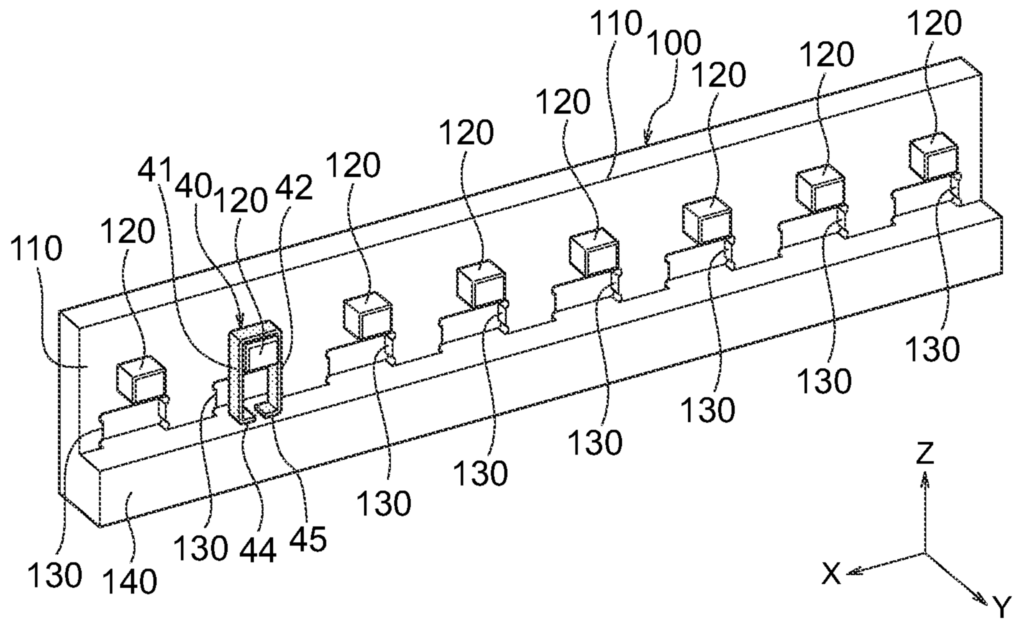
FIG. 16B is a perspective view illustrating the next step of FIG. 16A.

In the attachment of the resin spacer 90 to the second conductor 40, the jig 100 shown in FIG. 16A is initially prepared, and the second conductor 40 is fixed to the conductor fixation part 120 so that the inner surface of the second conductor 40 is in contact with the outer surface of the conductor fixation part 120 of the jig 100 as shown in FIG. 16B. The first mounting part 44 and the second mounting part 45 of the second conductor 40 are installed on the upper surface of the conductor installation part 140. In FIG. 16B, the second conductor 40 is fixed to only one conductor fixation part 120 provided in the jig 100, but another second conductor 40 may be fixed to another conductor fixation part 120.

Figure 16C:
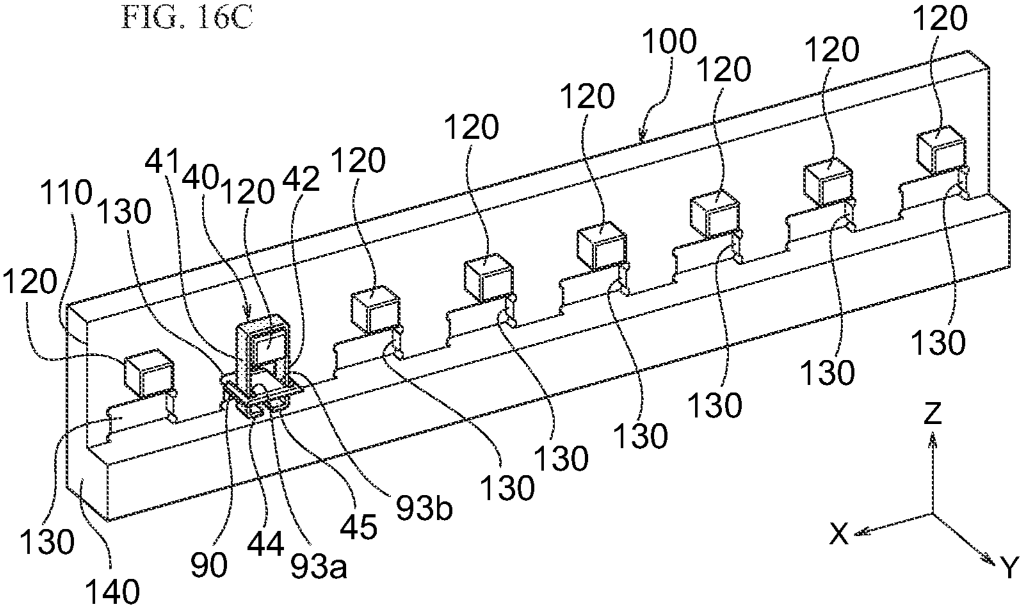
FIG. 16C is a perspective view illustrating the next step of FIG. 16B.

Next, as shown in FIG. 16C, the resin spacer 90 is attached to the second conductor 40. The resin spacer 90 is attached while sliding toward the second conductor 40 in the Y-axis direction so that the first groove part 93*a* and the second groove part 93*b* of the resin spacer 90 are inserted into the first conductor side part 41 and the second conductor side part 42 of the second conductor 40, respectively. When the resin spacer 90 is inserted toward the first conductor side part 41 and the second conductor side part 42 until the first conductor side part 41 is located near the bottom of the first groove part 93*a* and the second conductor side part 42 is located near the bottom of the second groove part 93*b*, the end of the resin spacer 90 on the negative side in the Y-axis direction is inserted in the spacer insertion part 130. Thus, when the end of the resin spacer 90 on the negative side in the Y-axis direction is inserted in the spacer insertion part 130, the end of the resin spacer 90 on the positive side in the Y-axis direction can be prevented from being disposed at a position where the resin spacer 90 unnecessarily protrudes on the positive side in the Y-axis direction.

Figure 16D:
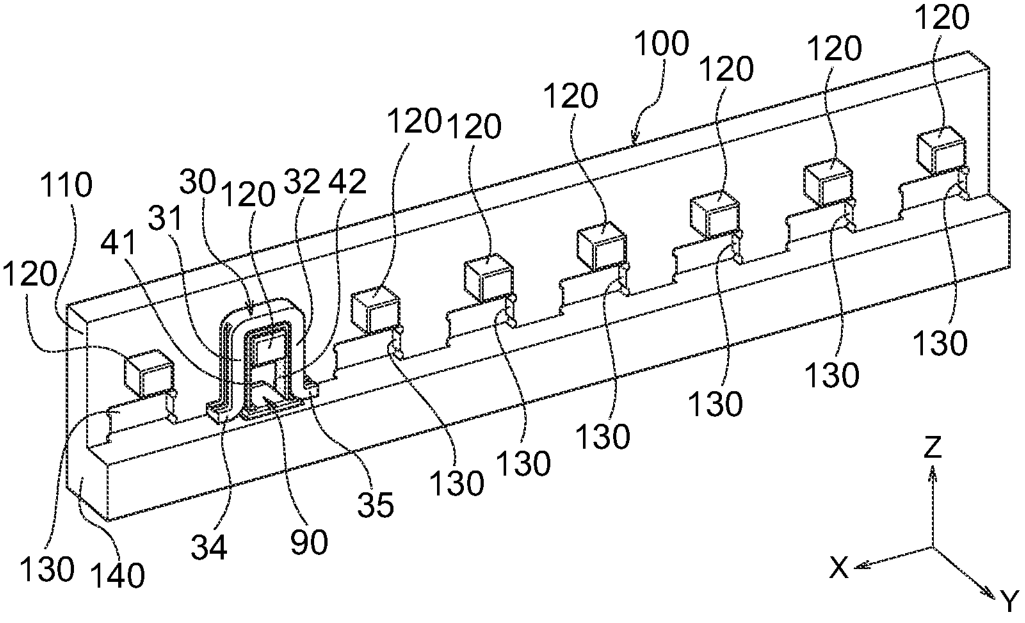
FIG. 16D is a perspective view illustrating the next step of FIG. 16C.

Next, as shown in FIG. 16D, the resin spacer 90 slides downward along the first conductor side part 41 and the second conductor side part 42 of the second conductor 40 so as to be disposed at the positions of the first mounting part 44 and the second mounting part 45 of the second conductor 40. At this time, the resin spacer 90 slides downward along the first conductor side part 41 and the second conductor side part 42 until the upper surface of the first mounting part 44 is in contact with the first step surface 911*a* (FIG. 14B) formed on the bottom surface of the inner insulating part 91 of the resin spacer 90 and the upper surface of the second mounting part 45 is in contact with the second step surface 911*b* (FIG. 14B).

An adhesive agent is applied in advance to the upper surfaces of the first mounting part 44 and the second mounting part 45 or to the first step surface 911*a* and the second step surface 911*b* of the inner insulating part 91. This makes it possible to join the first step surface 911*a* and the upper surface of the first mounting part 44 by the adhesive agent when they are in contact with each other. In addition, when the upper surface of the second mounting part 45 is in contact with the second step surface 911*b*, they can be joined by the adhesive agent. The adhesive agent can be epoxy resin, acrylic resin, urethane resin, etc. When the adhesive agent is cured, the upper surface of the resin spacer 90 is preferably pressed against the mounting parts 44 and 45 so as to enhance the joint between the step surface 911*a* (911*b*) and the mounting part 44 (45) for improvement in the adhesion therebetween.

Next, the first conductor 30 is disposed outside the second conductor 40. The first conductor 30 is disposed so that the first conductor side part 31 of the first conductor 30 faces the first conductor side part 41 of the second conductor 40 and the second conductor side part 32 of the first conductor 30 faces the second conductor side part 42 of the second conductor 40. The first mounting part 34 and the second mounting part 35 of the first conductor 30 are installed on the conductor installation part 140. Next, an adhesive agent is applied, for example, locally only at a few points and cured between the inner surface of the first conductor 30 and the outer surface of the second conductor 40. Thus, a conductor assembly consisting of the first conductor 30, the second conductor 40, and the resin spacer 90 is formed.

Next, the first core 420*a* and the second core 420*b* shown in FIG. 13 are attached to the conductor assembly. An adhesive agent joins between the side surface of the conductor assembly on the negative side in the Y-axis direction and the first core 420*a*, between the side surface of the conductor assembly on the positive side in the Y-axis direction and the second core 420*b*, and between the first core 420*a* and the second core 420*b*. The side surface of the conductor assembly on the negative side in the Y-axis direction and the first core 420*a* may be joined locally with an adhesive agent, for example, only at a few points, but the joint with an adhesive agent may not be carried out. The side surface of the conductor assembly on the positive side in the Y-axis direction and the second core 420*b* may be joined locally with an adhesive agent, for example, only at a few points, but the joint with an adhesive agent may not be carried out. As for the first core 420*a* and the second core 420*b*, the first middle leg 23*a* and the second middle leg 23*b* shown in FIG. 1B and FIG. 2 are joined with an adhesive agent, and the first outer legs 22*a* and the second outer legs 22*b* are joined with an adhesive agent. After that, the coil device 410 shown in FIG. 13 can be manufactured by curing the adhesive agent. Incidentally, the resin spacer 90 may be attached to the second conductor 40 after the cores 420*a* and 420*b* are assembled to the first conductor 30 and the second conductor 40.

In the present embodiment, effects similar to those of Fourth Embodiment are also obtained. In particular, in the present embodiment, as shown in FIG. 14A and FIG. 14B, the inner insulating part 91 is provided with the outer inclined part 910*a* and the side inclined parts 912*a* and 912*b*, and the connection part 96 is provided with the outer inclined parts 960*a* and 960*b*, so that it becomes possible to prevent the resin spacer 90 from interfering (contacting) with, for example, the cores 420*a* and 420*b* at the attachment of the resin spacer 90 to the second conductor 40, and the resin spacer 90 is easily attached to the second conductor 40.

Sixth Embodiment

A coil device 510 according to Sixth Embodiment of the present invention is different from the coil device 410 according to Fifth Embodiment only in the following matters and has structure and effect similar to those of the coil device 410 according to Fifth Embodiment. In the figures, common members with Fifth Embodiment are given common references and are not explained.

Figure 17A:
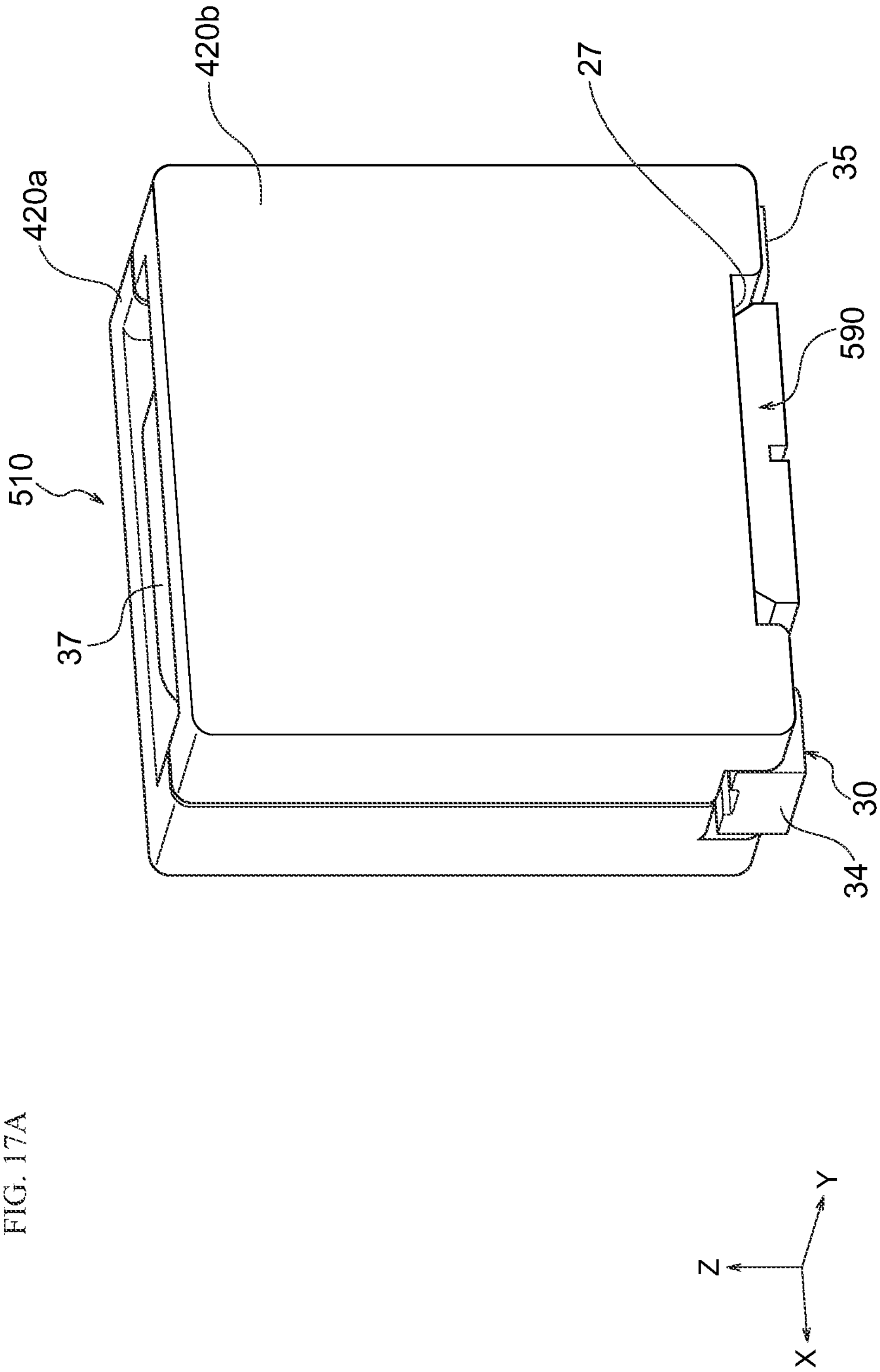
FIG. 17A is a perspective view of a coil device according to Sixth Embodiment of the present invention.
Figure 18:
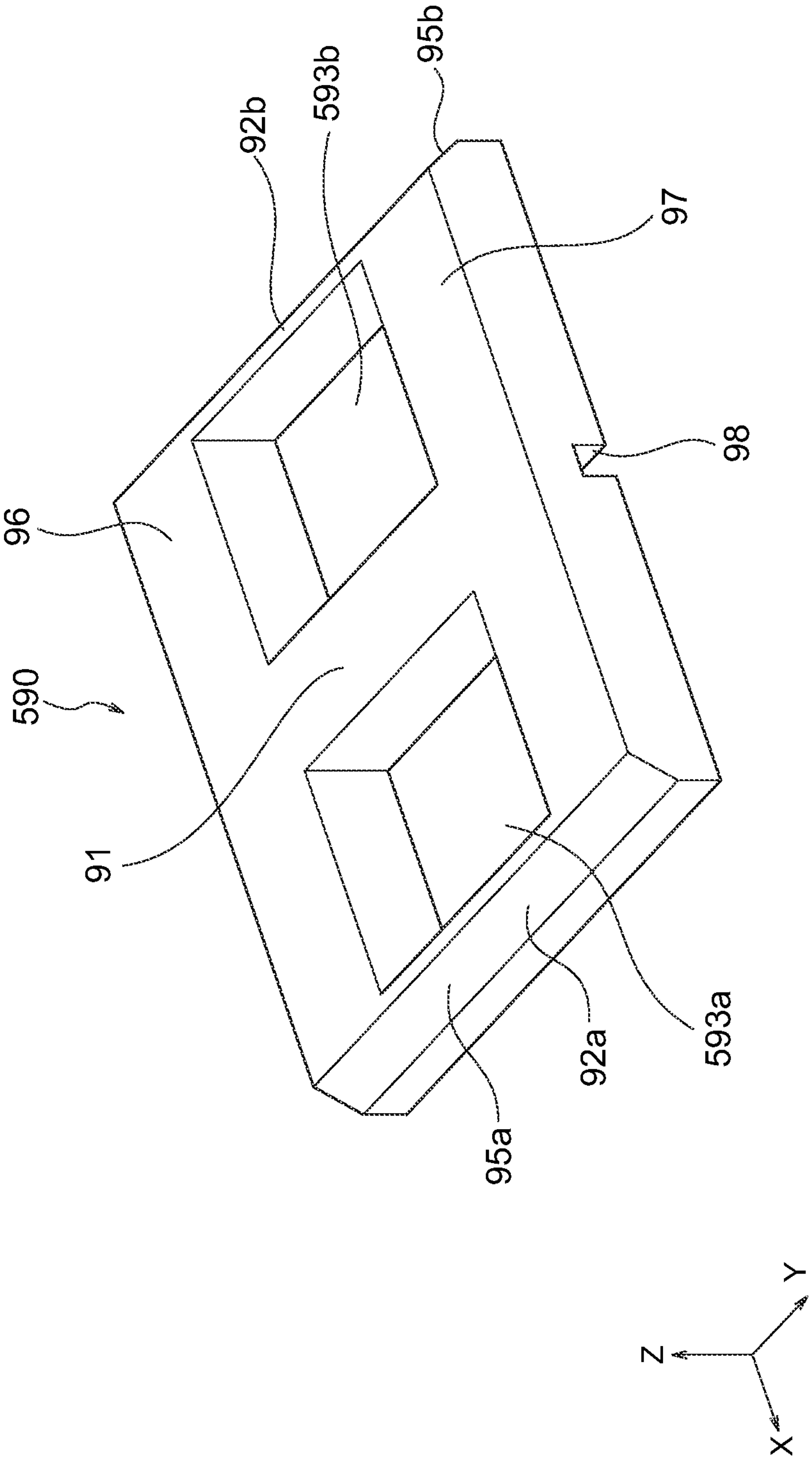
FIG. 18 is a perspective view of a resin spacer shown in FIG. 17A.

As shown in FIG. 17A, the coil device 510 includes a resin spacer 590. As shown in FIG. 18, the resin spacer 590 includes a connection part 97 in addition to the inner insulating part 91, the first side insulating part 92*a*, the second side insulating part 92*b*, and the connection part 96. The end of the first side insulating part 92*a* on the positive side in the Y-axis direction, the end of the inner insulating part 91 on the positive side in the Y-axis direction, and the end of the second side insulating part 92*b* on the positive side in the Y-axis direction are connected in the X-axis direction by the connection part 97. The shape of the connection part 97 is similar to that of the connection part 96.

The connection part 96 and the connection part 97 are not provided with the outer inclined part 960*a* and the outer inclined part 960*b* shown in FIG. 14A and FIG. 14B. The bottom surface of the resin spacer 590 is not provided with the first step surface 911*a* and the second step surface 911*b* shown in FIG. 14B. That is, the upper surface and the lower surface of the resin spacer 590 are flat surfaces.

On the other hand, a bottom groove part 98 is formed at a central part in the X-axis direction on the lower surface of the inner insulating part 91 of the resin spacer 590. The bottom groove part 98 extends in the Y-axis direction from one end to the other end of the inner insulating part 91 in the Y-axis direction. Since the bottom groove part 98 is formed on the lower surface of the inner insulating part 91, for example, when the first mounting part 44 and the second mounting part 45 of the second conductor 40 are connected to a mounting board by solder, the bottom groove part 98 can prevent a molten solder from flowing out between the first mounting part 44 and the second mounting part 45 in a creeping manner on the lower surface of the inner insulating part 91. Incidentally, a groove part corresponding to the bottom groove part 98 may also be formed in the Y-axis direction at a central part in the X-axis direction on the upper surface of the inner insulating part 91.

Figure 17B:
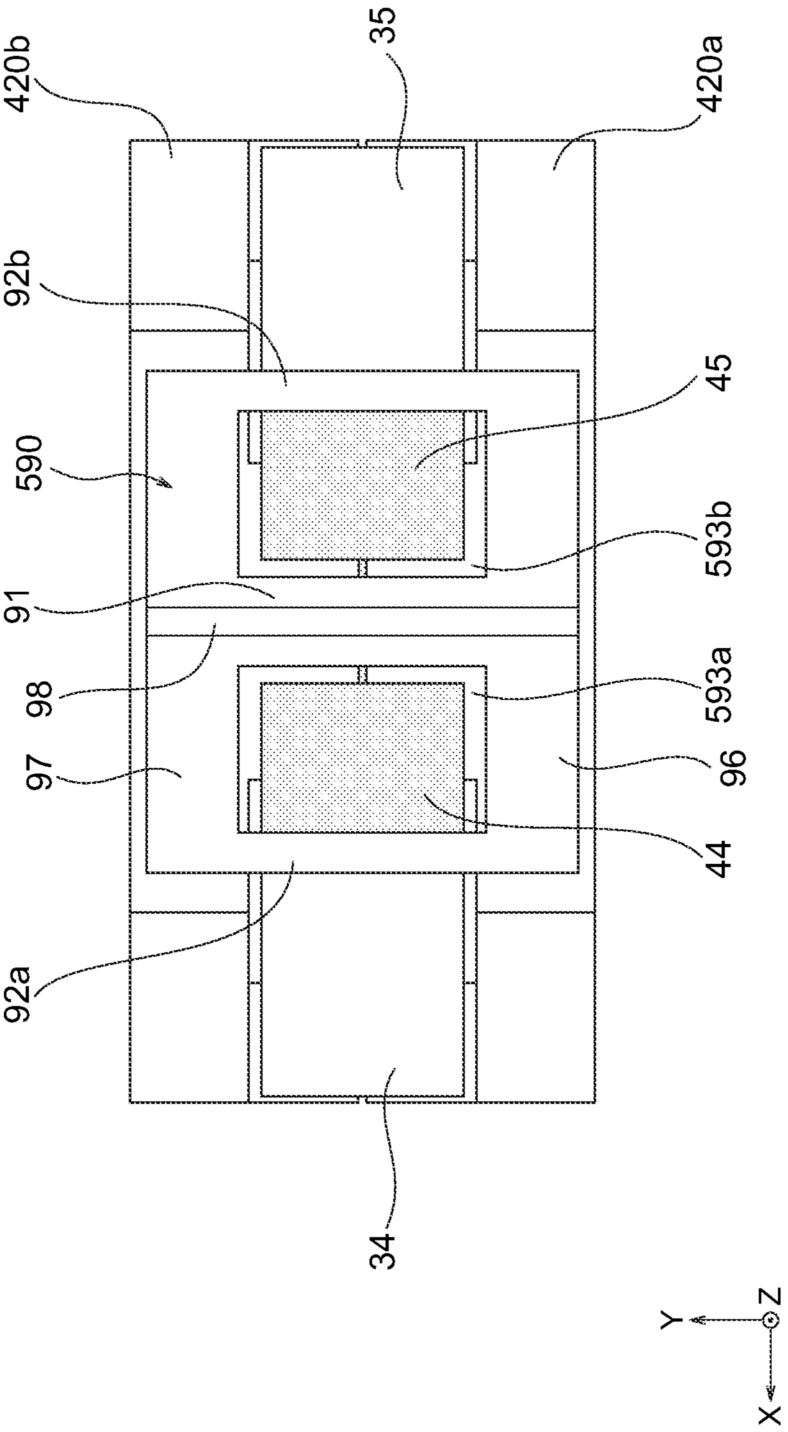
FIG. 17B is a bottom view of the coil device shown in FIG. 17A.

A first groove part 593*a* is surrounded by the first side insulating part 92*a*, one end of the inner insulating part 91 in the X-axis direction, the connection part 96, and the connection part 97. A second groove part 593*b* is surrounded by the second side insulating part 92*b*, the other end of the inner insulating part 91 in the X-axis direction, the connection part 96, and the connection part 97. As shown in FIG. 17B, the opening shape of the first groove part 593*a* corresponds to the shape of the bottom surface of the first mounting part 44 of the second conductor 40, and the first mounting part 44 can be inserted into the first groove part 593*a*. Moreover, the opening shape of the second groove part 593*b* corresponds to the shape of the bottom surface of the second mounting part 45 of the second conductor 40, and the second mounting part 45 can be inserted into the second groove part 593*b*.

Figure 19:
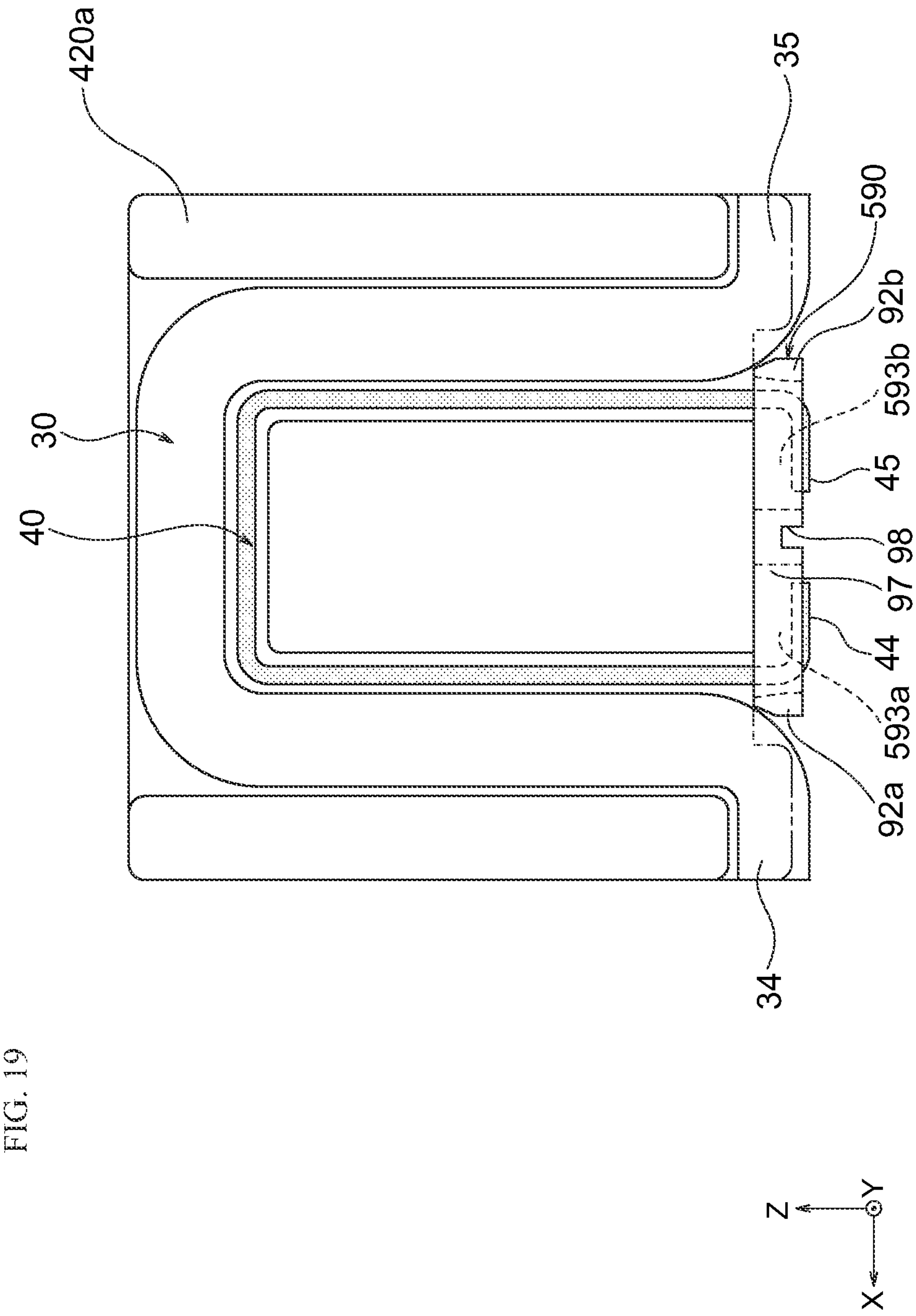
FIG. 19 is a side view illustrating an inside state of the coil device shown in FIG. 17A.

As shown in FIG. 19, the resin spacer 590 is mounted on the bottom surfaces of the cores 420*a* and 420*b* in a state where the cores 420*a* and 420*b* are attached to the first conductor 30 and the second conductor 40 (the assembly of the first conductor 30 and the second conductor 40 mentioned above) by an adhesive agent (or without an adhesive agent). The resin spacer 590 is mounted by inserting one end and the other end of the second conductor 40 into the first groove part 593*a* and the second groove part 593*b* of the resin spacer 590, respectively.

The upper surface of the resin spacer 590 is locally joined with the bottom surfaces of the cores 420*a* and 420*b* by an adhesive agent, for example, only at a few points. In the attachment state of the resin spacer 590 to the bottom surfaces of the cores 420*a* and 420*b*, the mounting parts 44 and 45 of the second conductor 40 are partly housed in the groove parts 593*a* and 593*b*, but the rest of the mounting parts 44 and 45 are partly exposed outside the groove parts 593*a* and 593*b*. That is, the bottom surface of the resin spacer 590 is located above the bottom surfaces of the mounting parts 44 and 45, and the mounting parts 44 and 45 can thereby favorably be connected to a land pattern of the mounting board by, for example, solder without being hindered by the resin spacer 590.

In the present embodiment, effects similar to those of Fifth Embodiment are also obtained. In particular, in the present embodiment, the coil device 510 can be provided with the resin spacer 590 only by inserting the first mounting part 44 and the second mounting part 45 of the second conductor 40 into the first groove part 593*a* and the second groove part 593*b*, respectively, and fixing the upper surface of the resin spacer 590 to the bottom surfaces of the cores 420*a* and 420*b*, and the resin spacer 590 is attached easily.

Seventh Embodiment

A coil device 610 according to Seventh Embodiment of the present invention is different from the coil device 510 according to Sixth Embodiment only in the following matters and has structure and effect similar to those of the coil device 510 according to Sixth Embodiment. In the figures, common members with Sixth Embodiment are given common references and are not explained.

Figure 20:
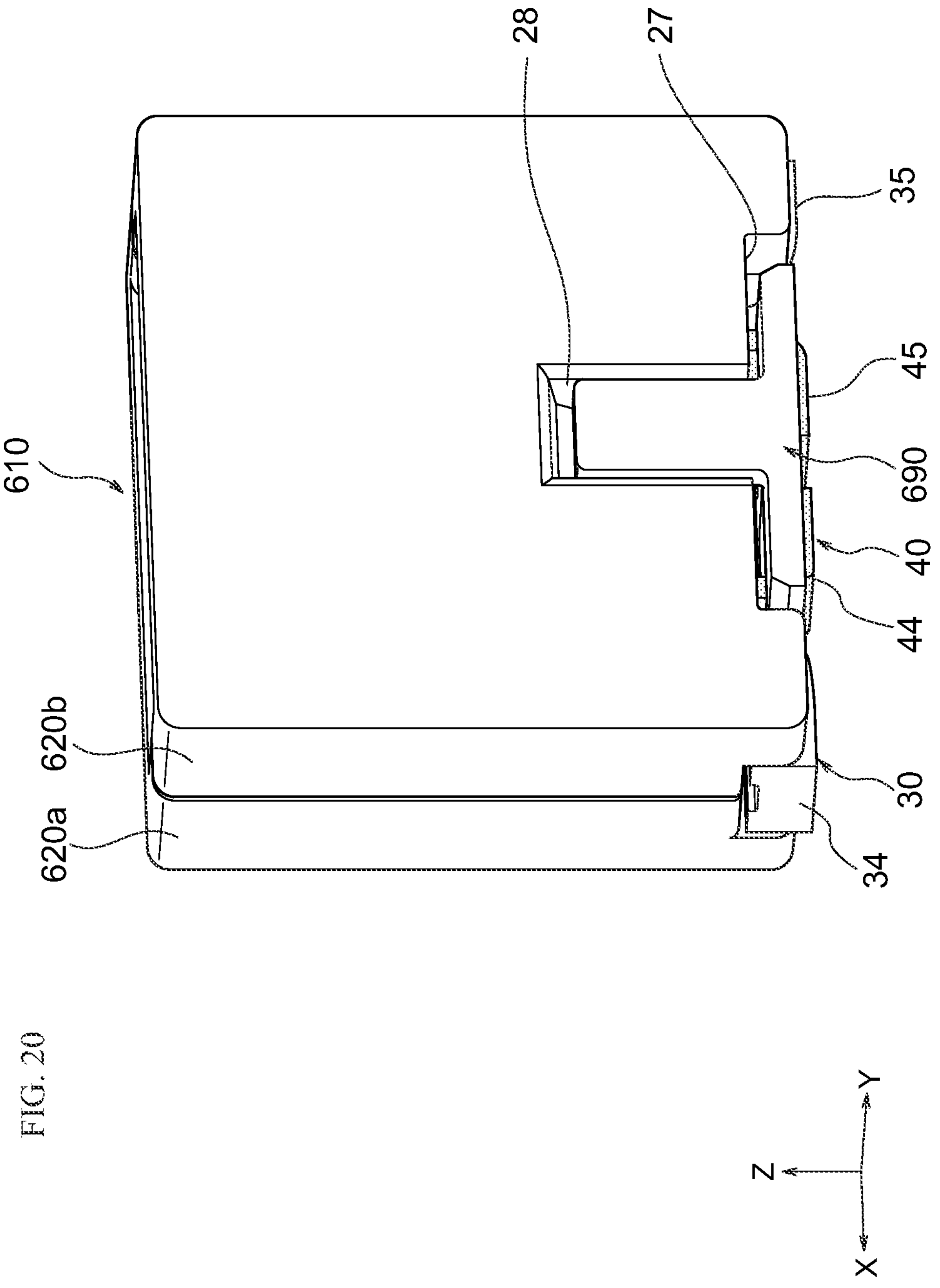
FIG. 20 is a perspective view of a coil device according to Seventh Embodiment of the present invention.
Figure 21:
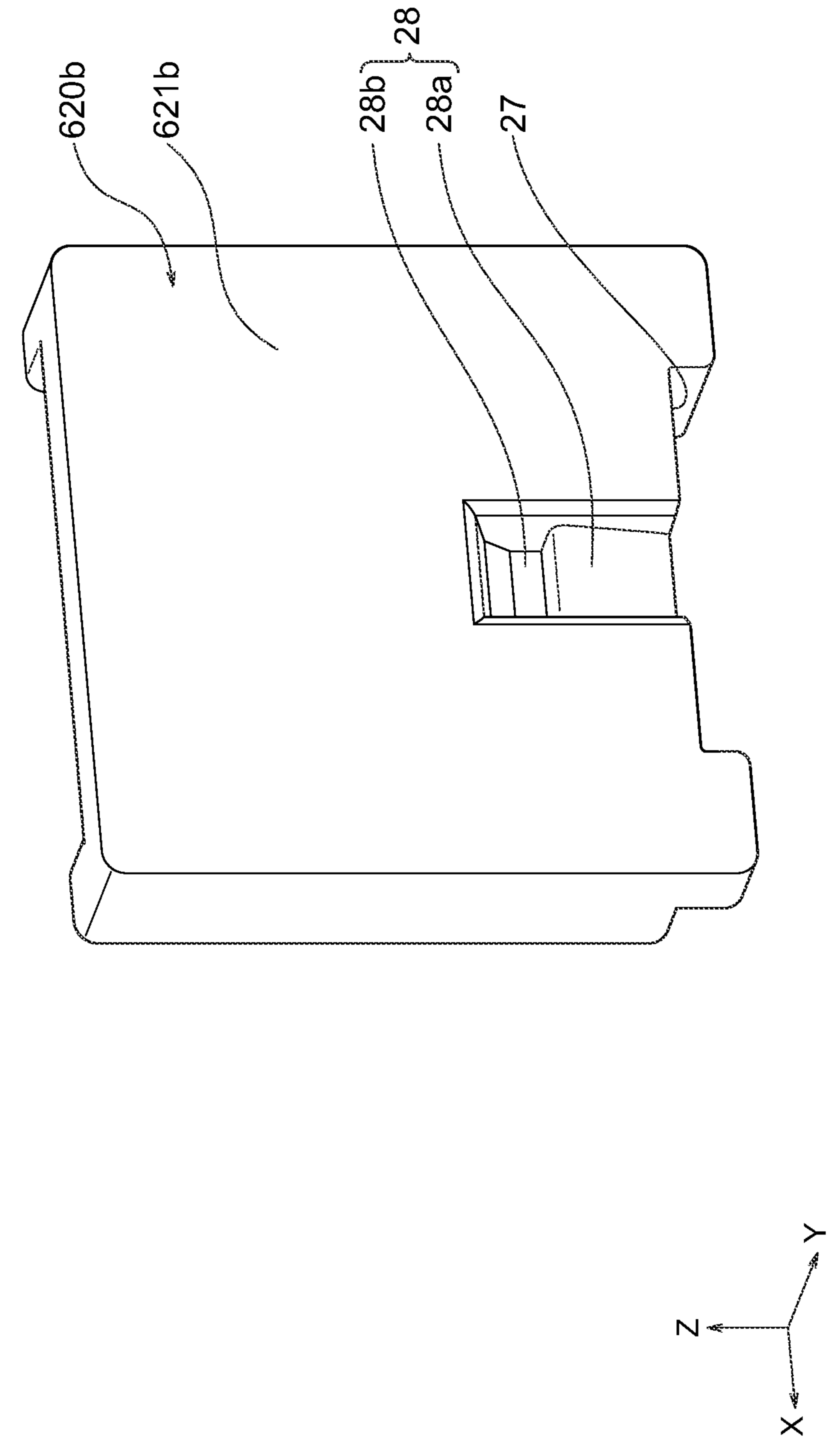
FIG. 21 is a perspective view of a second core shown in FIG. 20.

As shown in FIG. 20, the coil device 610 includes a first core 620*a*, a second core 620*b*, and a resin spacer 690. As shown in FIG. 21, the second core 620*b* includes a second base part 621*b*, and a side-surface concave part 28 is formed on the outer surface of the second base part 621*b*. The side-surface concave part 28 is formed at the lower end of the outer surface of the second base part 621*b*, and the lower end of the side-surface concave part 28 is connected to the bottom-surface concave part 27. Incidentally, the first core 620*a* has a similar shape to the second core 620*b* and is not explained in detail.

The side-surface concave part 28 includes an arm installation part 28*a* and an engagement concave part 28*b*. The arm installation part 28*a* has a concave shape recessed inward in the Y-axis direction from the surface of the second base part 621*b*. The arm installation part 28*a* is formed at a substantially central part of the second base part 621*b* in the X-axis direction and extends upward in the Z-axis direction from the bottom-surface concave part 27 of the second core 620*b* by a predetermined length.

The engagement concave part 28*b* is formed at the upper end of the arm installation part 28*a*. The engagement concave part 28*b* has a concave shape recessed inward in the Y-axis direction from the surface of the second base part 621*b*. The depth of the engagement concave part 28*b* in the Y-axis direction is larger than that of the arm installation part 28*a* in the Y-axis direction. An inclined surface is formed on the bottom surface of the engagement concave part 28*b*. The engagement concave part 28*b* is formed so as to be narrower toward the bottom.

Figure 22:
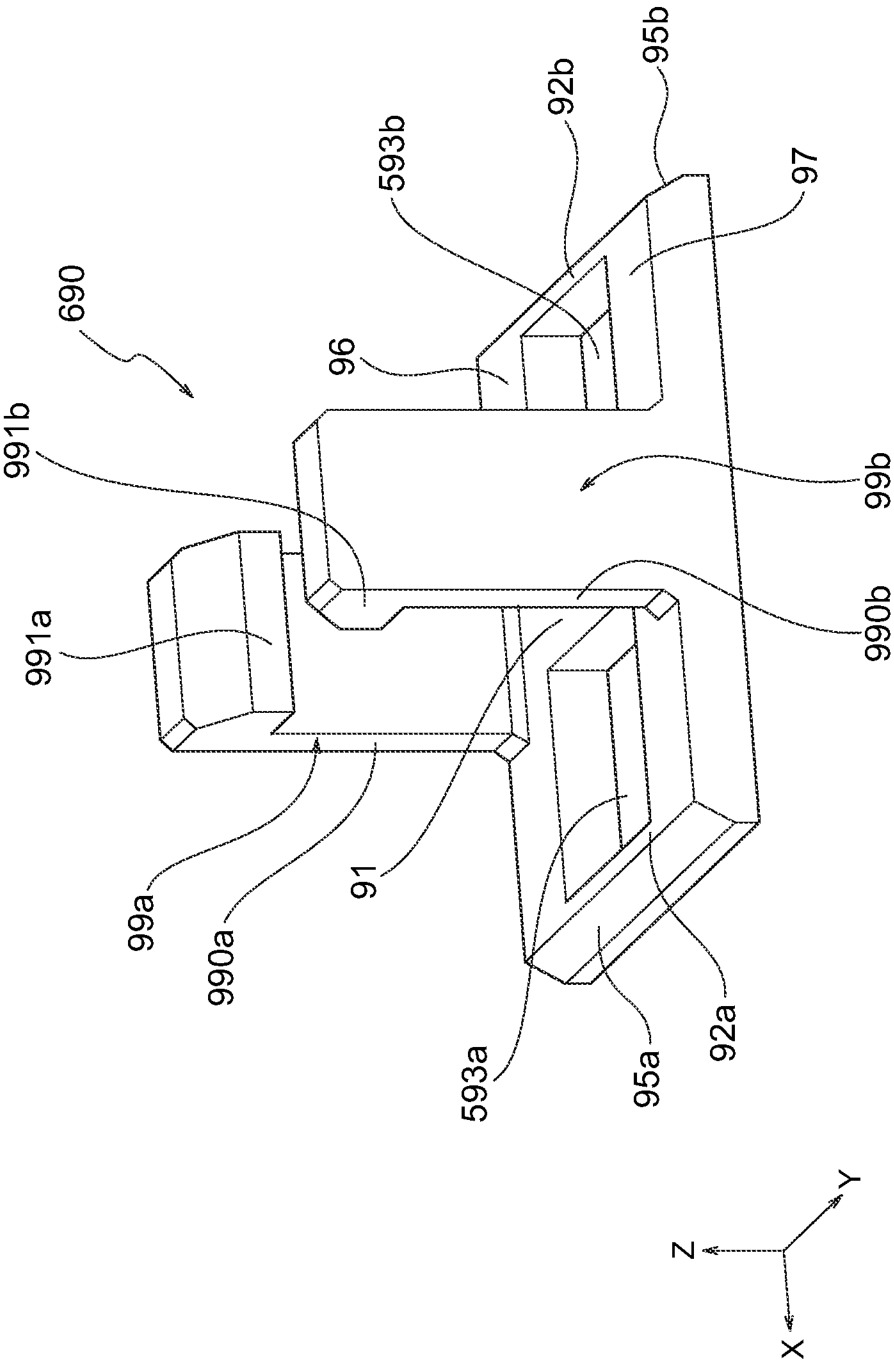
FIG. 22 is a perspective view of a resin spacer shown in FIG. 20.

As shown in FIG. 22, the resin spacer 690 is different from the resin spacer 590 according to Sixth Embodiment shown in FIG. 18 in that the resin spacer 690 includes an arm part 99*a* and an arm part 99*b*. The arm part 99*a* stands upward in the Z-axis direction from the upper surface of the connection part 96, and the arm part 99*b* stands upward in the Z-axis direction from the upper surface of the connection part 97.

The arm part 99*a* (99*b*) includes an arm main body part 990*a* (990*b*) and a convex part 991*a* (991*b*). The arm main body part 990*a* (990*b*) has a column structure (substantially rectangular parallelepiped shape) with a longitudinal direction in the Z-axis direction. The convex part 991*a* is formed at the tip of the arm main body part 990*a* and protrudes toward the positive side in the Y-axis direction (the center of the resin spacer 690). The convex part 991*b* is formed at the tip of the arm main body part 990*b* and protrudes toward the negative side in the Y-axis direction (the inside of the resin spacer 690). The convex part 991*a* and the convex part 991*b* are arranged to face each other in the Y-axis direction. The convex part 991*a* (991*b*) is provided with an inclined surface and is formed so as to be tapered toward the protrusion direction. The convex shape of the convex part 991*b* corresponds to the concave shape of the engagement concave part 28*b* shown in FIG. 21.

As shown in FIG. 21 and FIG. 22, the arm main body part 990*b* is fixed to the arm installation part 28*a* of the second core 620*b*. Likewise, the arm main body part 990*a* is fixed to an arm installation part (not shown) of the first core 620*a*. The convex part 991*b* engages with the engagement concave part 28*b* of the second core 620*b* (see FIG. 23), and the convex part 991*a* engages with an engagement concave part of the first core 620*a* (not shown). When the arm parts 99*a* and 99*b* are fixed to the cores 620*a* and 620*b*, the surface of the arm part 99*a* (99*b*) is substantially flush with the outer surface of the core 620*a* (620*b*).

Figure 23:
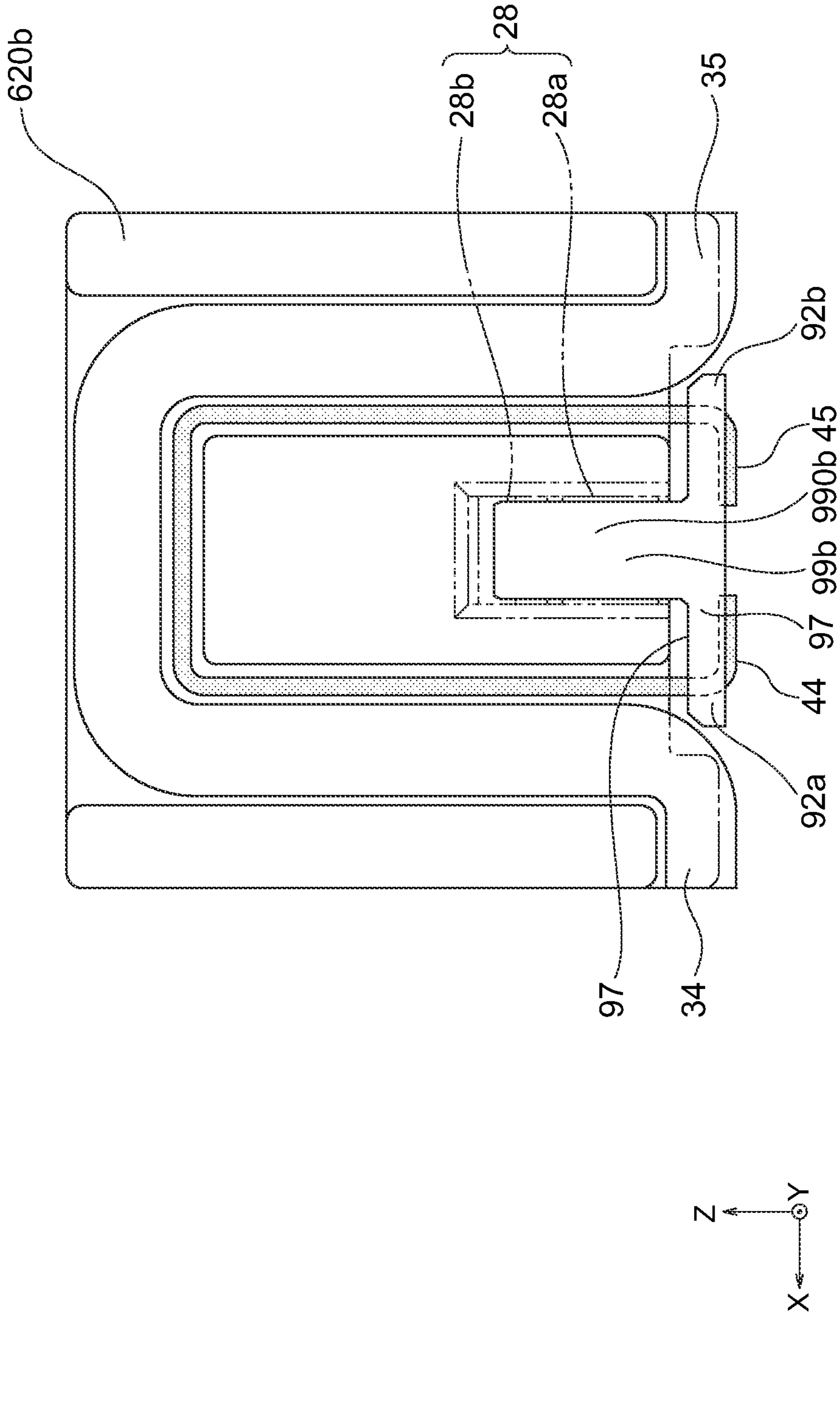
FIG. 23 is a side view illustrating an inside state of the coil device shown in FIG. 20.

The arm part 99*b* can be fixed to the outer surface of the second core 620*b* in the Y-axis direction by engaging the convex part 991*b* with the engagement concave part 28*b* of the second core 620*b*. Likewise, the arm part 99*a* can be fixed to the outer surface of the first core 620*a* in the Y-axis direction by engaging the convex part 991*a* with an engagement concave part of the second core 620*b* (not shown). As a result, the resin spacer 690 can be fixed to the cores 620*a* and 620*b* via the arm parts 99*a* and 99*b* and can be attached to the cores 620*a* and 620*b* without using an adhesive agent. The resin spacer 690 is mounted to the cores 620*a* and 620*b* in a state where the cores 620*a* and 620*b* are attached to the first conductor 30 and the second conductor 40 (an assembly of the first conductor 30 and the second conductor 40) by an adhesive agent (or without using an adhesive agent). In a state where the resin spacer 690 is fixed to the cores 620*a* and 620*b*, as shown in FIG. 23, a gap is formed between the upper surface of the resin spacer 690 (the inner insulating part 91, the connection parts 96 and 97, and the side insulating parts 92*a* and 92*b*) and the bottom surfaces of the cores 620*a* and 620*b*, and they are not closely contacted.

Eighth Embodiment

A coil device 710 according to Eighth Embodiment of the present invention is different from the coil device 510 according to Sixth Embodiment only in the following matters and has structure and effect similar to those of the coil device 510 according to Sixth Embodiment. In the figures, common members with Sixth Embodiment are given common references and are not explained.

Figure 24A:
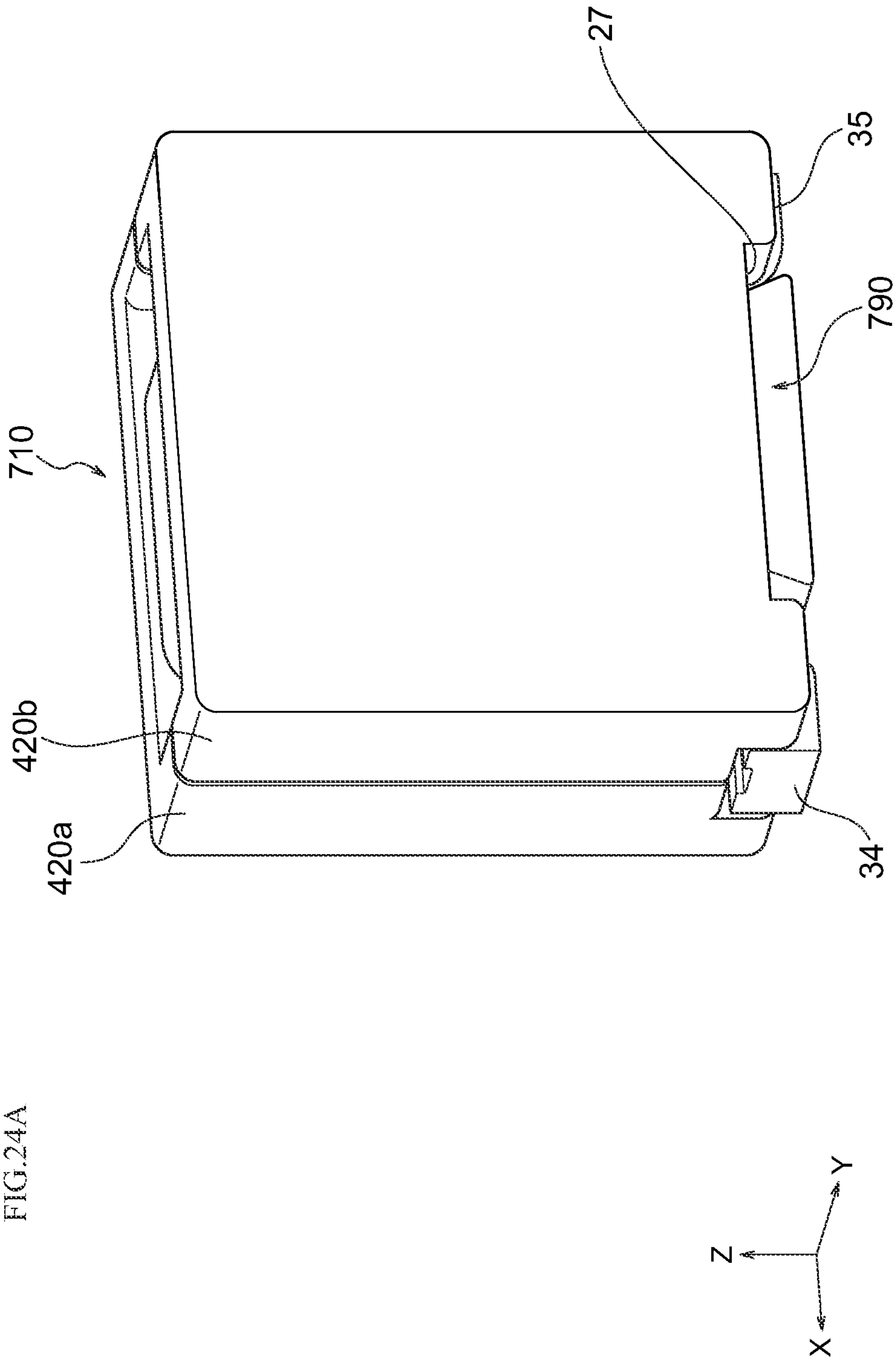
FIG. 24A is a perspective view of a coil device according to Eighth Embodiment of the present invention.
Figure 25:
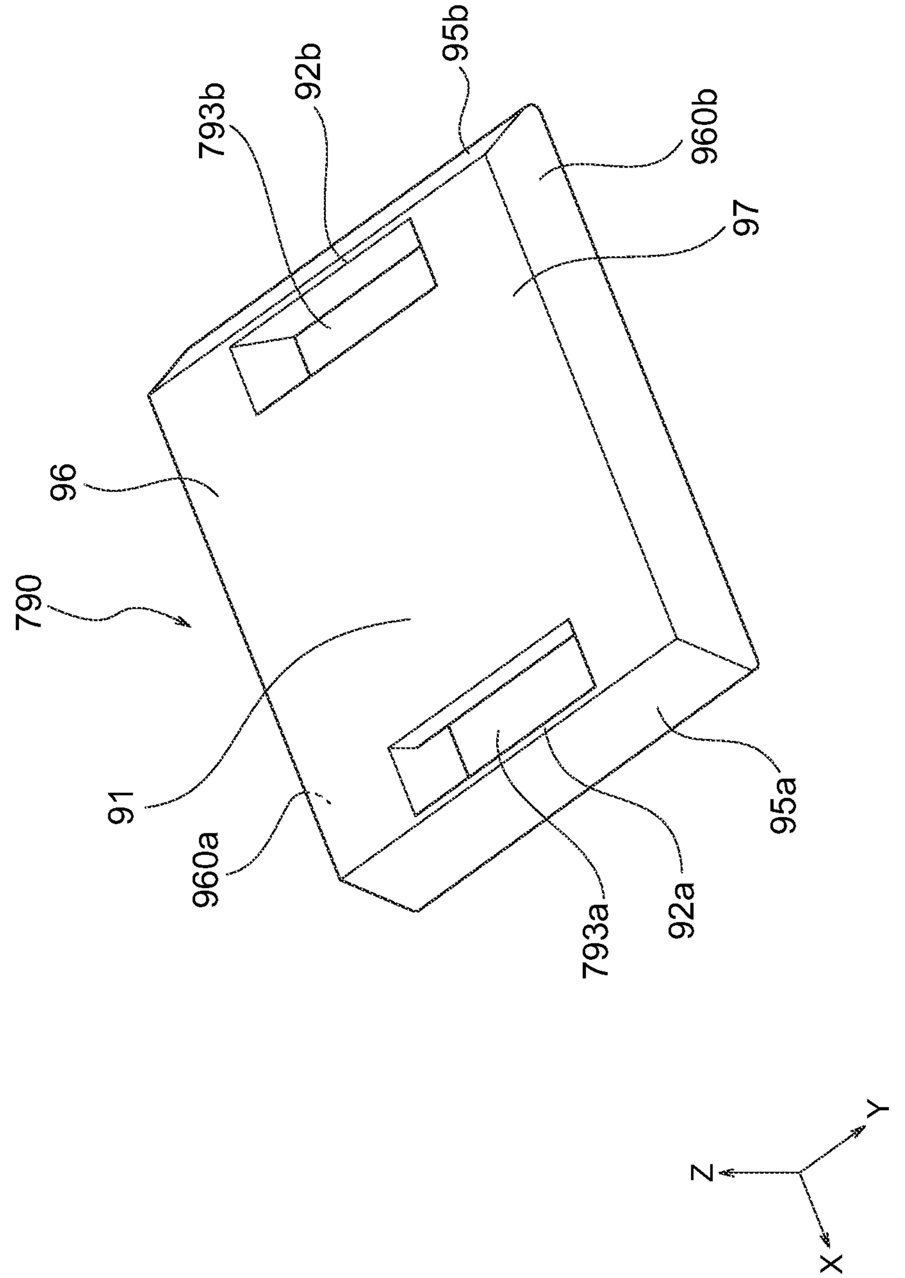
FIG. 25 is a perspective view of a resin spacer shown in FIG. 24A.

As shown in FIG. 24A, the coil device 710 includes a resin spacer 790. As shown in FIG. 25, the resin spacer 790 includes a first groove part 793*a* and a second groove part 793*b*. The width of the first groove part 793*a* in the X-axis direction is smaller than that of the first groove part 593*a* of the resin spacer 590 shown in FIG. 18 in the X-axis direction. Likewise, the width of the second groove part 793*b* in the X-axis direction is smaller than that of the second groove part 593*b* of the resin spacer 590 shown in FIG. 18 in the X-axis direction. The width of the groove part 793*a* (793*b*) in the X-axis direction is substantially equal to the plate thickness of the second conductor 40.

Figure 26:
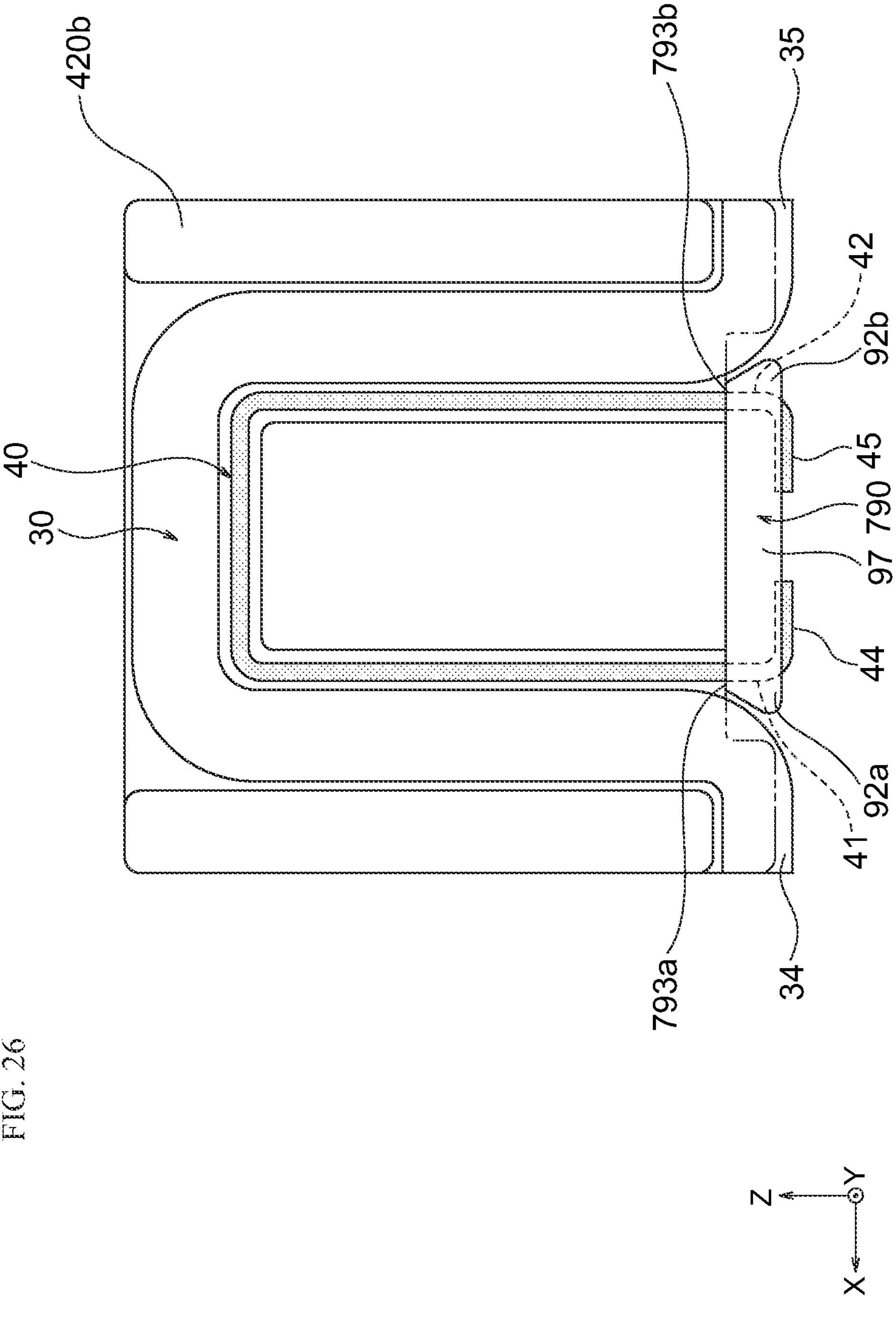
FIG. 26 is a side view illustrating an inside state of the coil device shown in FIG. 24A.

In the present embodiment, as shown in FIG. 26, the first groove part 793*a* functions as an insertion passage for the first conductor side part 41 of the second conductor 40, and the lower end of the first conductor side part 41 of the second conductor 40 is inserted into the first groove part 793*a*. Likewise, the second groove part 793*b* functions as an insertion passage for the second conductor side part 42 of the second conductor 40, and the lower end of the second conductor side part 42 of the second conductor 40 is inserted into the second groove part 793*b*. That is, the first mounting part 44 of the second conductor 40 is not disposed (inserted) in the first groove part 793*a*, and the second mounting part 45 of the second conductor 40 is not disposed (inserted) in the second groove part 793*b*.

As shown in FIG. 25, an outer inclined part 960*a* extending in the X-axis direction is formed at the end of the connection part 96 on the negative side in the Y-axis direction, and an outer inclined part 960*b* extending in the X-axis direction is formed at the end of the connection part 97 on the positive side in the Y-axis direction.

Figure 24B:
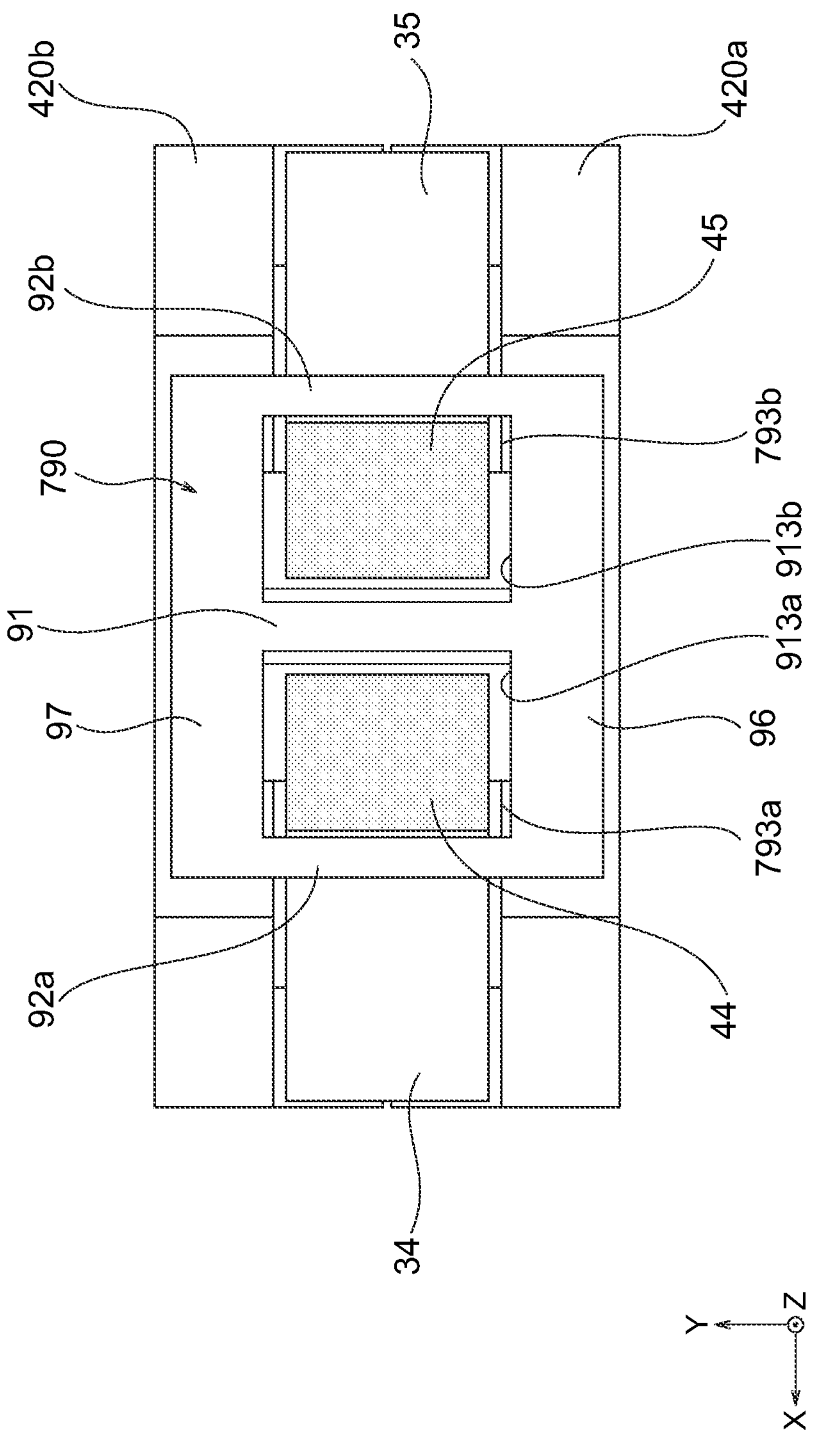
FIG. 24B is a bottom view of the coil device shown in FIG. 24A.

As shown in FIG. 24B, the lower surface of the inner insulating part 91 is provided with a spacer concave part 913*a* formed on the positive side in the X-axis direction and a spacer concave part 913*b* formed on the negative side in the X-axis direction. The spacer concave part 913*a* and the spacer concave part 913*b* are arranged at a predetermined interval in the X-axis direction. This interval is equal to or larger than the interval between the first mounting part 44 and the second mounting part 45 of the second conductor 40.

The first mounting part 44 of the second conductor 40 is housed in the spacer concave part 913*a*, and the upper surface of the first mounting part 44 is in contact with the bottom surface of the spacer concave part 913*a*. The second mounting part 45 of the second conductor 40 is housed in the spacer concave part 913*b*, and the upper surface of the second mounting part 45 is in contact with the bottom surface of the spacer concave part 913*b*. In a state where the mounting parts 44 and 45 are housed in the spacer concave parts 913*a* and 913*b*, as shown in FIG. 26, the mounting parts 44 and 45 of the second conductor 40 are partly housed in the spacer concave parts 913*a* and 913*b*, but the rest of the mounting parts 44 and 45 is partly exposed outside the spacer concave parts 913*a* and 913*b*. Thus, when the mounting parts 44 and 45 are partly housed in the spacer concave parts 913*a* and 913*b*, the first mounting part 44 and the second mounting part 45 can be insulated favorably.

In the attachment of the resin spacer 790 to the second conductor 40, the second conductor 40 before the shapes of the first mounting part 44 and the second mounting part 45 are provided, namely, the second conductor 40 having a substantially C shape is prepared. Then, the first groove part 793*a* is inserted into one end of the second conductor 40, and the second groove part 793*b* is inserted into the other end of the second conductor 40. After that, one end of the second conductor 40 is bent (i.e., the second conductor 40 is provided with the first mounting part 44) and is housed in the spacer concave part 913*a* so that the upper surface is in contact with the bottom surface of the spacer concave part 913*a*. Likewise, the other end of the second conductor 40 is bent (i.e., the second conductor 40 is provided with the second mounting part 45) and is housed in the spacer concave part 913*b* so that the upper surface is in contact with the bottom surface of the spacer concave part 913*b*. That is, a forming for providing the second conductor 40 with the shapes of the first mounting part 44 and the second mounting part 45 is carried out after the resin spacer 790 is attached to the second conductor 40 having a substantially C shape. Incidentally, the resin spacer 790 is mounted to the second conductor 40 or the bottom surfaces of the cores 420*a* and 420*b* in a state where the cores 420*a* and 420*b* are attached to the first conductor 30 and the second conductor 40 (an assembly of the first conductor 30 and the second conductor 40) by an adhesive agent (or without using an adhesive agent).

In the present embodiment, effects similar to those of Sixth Embodiment are also obtained. In the present embodiment, as shown in FIG. 26, the upper surface of the resin spacer 790 (the inner insulating part 91, the connection parts 96 and 97, and the side insulating parts 92*a* and 92*b*) is in contact with the bottom surfaces of the cores 420*a* and 420*b* in a state where the resin spacer 790 is attached to the second conductor 40. Thus, the mounting parts 44 and 45 of the second conductor 40 and the bottom surfaces of the cores 420*a* and 420*b* can be insulated favorably by, for example, the inner insulating part 91.

The resin spacer 790 is pressed upward in the Z-axis direction by the first mounting part 44 and the second mounting part 45 and is thereby fixed so as to be sandwiched between the mounting parts 44 and 45 and the cores 420*a* and 420*b*. Thus, the resin spacer 790 can be attached without using an adhesive agent.

Ninth Embodiment

A coil device 810 according to Ninth Embodiment of the present invention is different from the coil device 710 according to Eighth Embodiment only in the following matters and has structure and effect similar to those of the coil device 710 according to Eighth Embodiment. In the figures, common members with Eighth Embodiment are given common references and are not explained.

Figure 27:
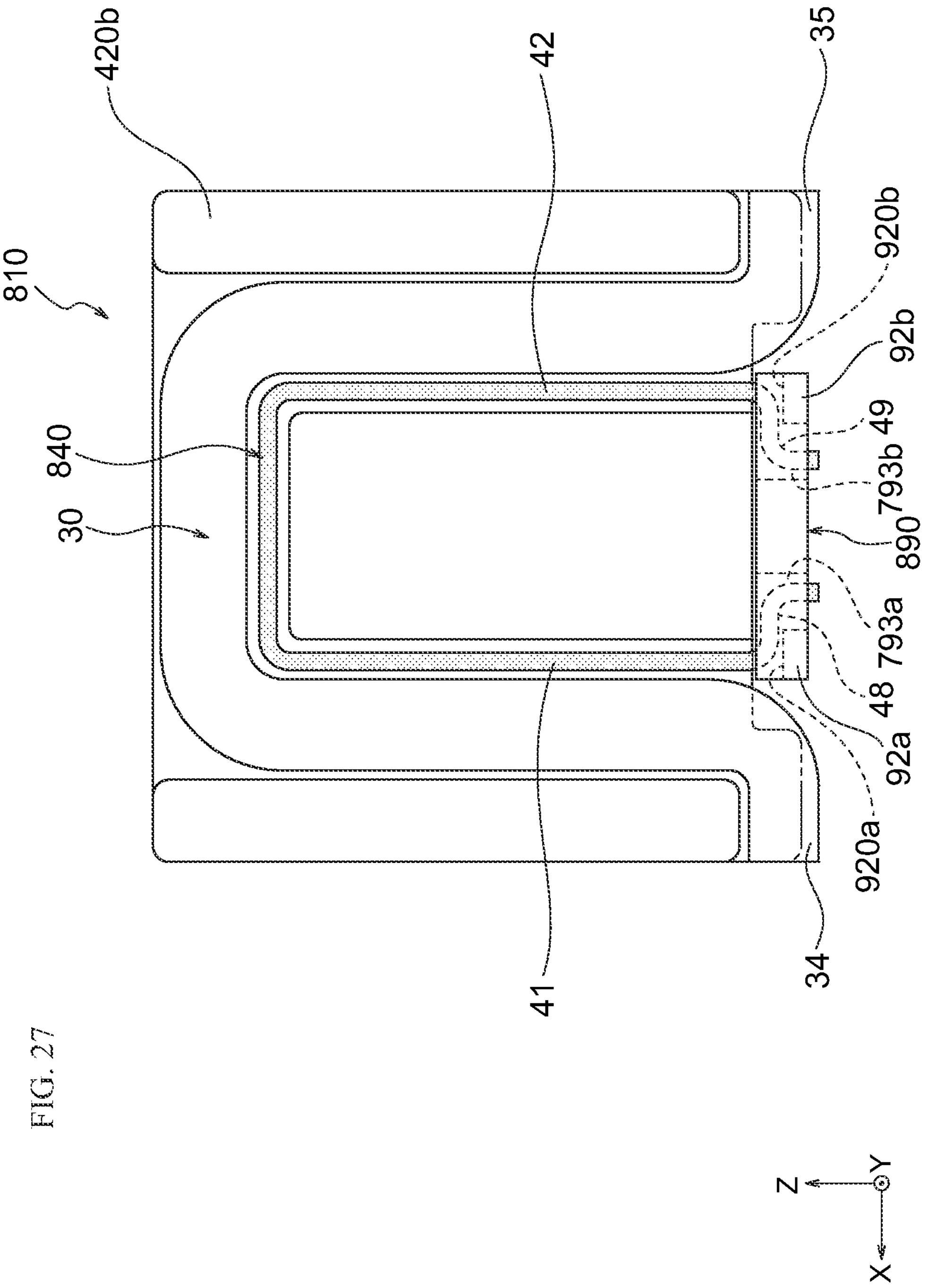
FIG. 27 is a side view illustrating an inside state of a coil device according to Ninth Embodiment of the present invention.

As shown in FIG. 27, the coil device 810 includes a second conductor 840 and a resin spacer 890. The second conductor 840 is not provided with the first mounting part 44 and the second mounting part 45 shown in FIG. 26, but is provided with a first side bending part 48 and a second side bending part 49. The first side bending part 48 is formed at one end of the second conductor 840 and is bent inward in the X-axis direction and downward in the Z-axis direction. Likewise, the second side bending part 49 is formed at the other end of the second conductor 840 and is bent inward in the X-axis direction and downward in the Z-axis direction. That is, the first side bending part 48 and the second side bending part 49 are bent so as to approach each other in the X-axis direction and then extend in parallel to each other in the Z-axis direction.

Figure 28:
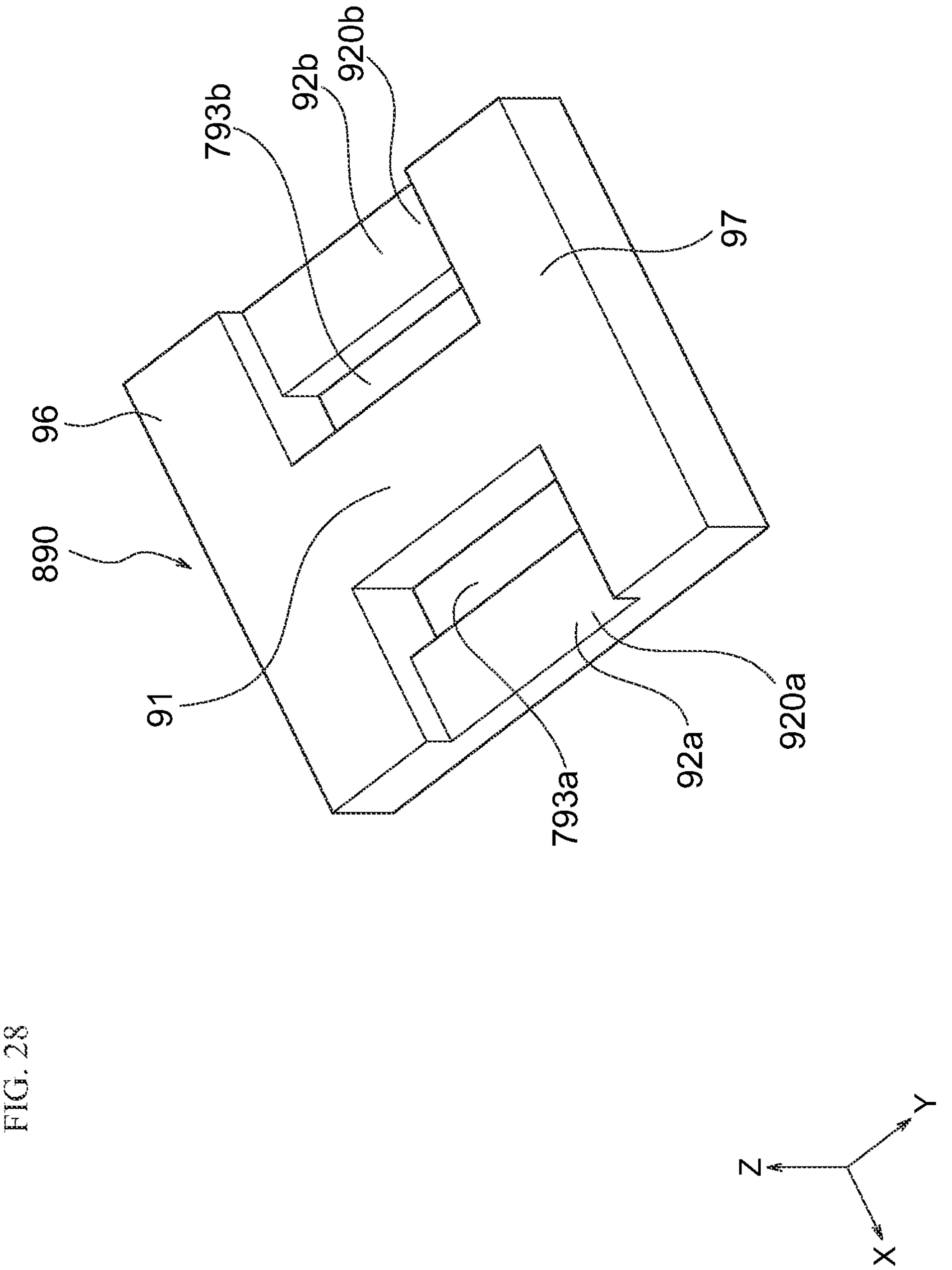
FIG. 28 is a perspective view of a resin spacer shown in FIG. 27.

As shown in FIG. 28, a first side step part 920*a* extending in the Y-axis direction is formed on the upper surface of the first side insulating part 92*a* of the resin spacer 890, and a second side step part 920*b* extending in the Y-axis direction is formed on the upper surface of the second side insulating part 92*b* of the resin spacer 890. The step height of each of the first side step part 920*a* and the second side step part 920*b* is equal to or larger than the plate thickness of the second conductor 840. Incidentally, the upper surface of the side insulating part 92*a* (92*b*) is not provided with the inclined part 95*a* (95*b*) shown in FIG. 25, and the connection part 96 (97) is not provided with the outer inclined part 960*a* (960*b*) shown in FIG. 25. In addition, the lower surface of the inner insulating part 91 is not provided with the spacer concave parts 913*a* and 913*b* shown in FIG. 24B.

As shown in FIG. 27, the first side bending part 48 (a part extending in the X-axis direction) is disposed in the first side step part 920*a*, and the second side bending part 49 of the second conductor 840 (a part extending in the X-axis direction) is disposed in the second side step part 920*b*. The first side bending part 48 is inserted downward in the first groove part 793*a*, and the second side bending part 49 is inserted downward in the second groove part 793*b*. That is, a substantially L-shaped insertion passage into which the first side bending part 48 is inserted is formed by the first side step part 920*a* and the first groove part 793*a* in the resin spacer 890, and a substantially L-shaped insertion passage into which the second side bending part 49 is inserted is formed by the second side step part 920*b* and the second groove part 793*b*.

The upper surface of the resin spacer 890 is joined with the bottom surfaces of the cores 420*a* and 420*b* by, for example, an adhesive agent. In the present embodiment, effects similar to those of Eighth Embodiment are also obtained. In the present embodiment, since the second conductor 840 is not provided with the first mounting part 44 or the second mounting part 45, it is not necessary to carry out a forming for providing the second conductor 840 with the shapes of the first mounting part 44 and the second mounting part 45 after the side bending parts 48 and 49 of the second conductor 40 is inserted into the groove parts 793*a* and 793*b* of the resin spacer 890. Thus, the coil device 810 is manufactured easily.

Tenth Embodiment

A coil device 910 according to Tenth Embodiment of the present invention is different from the coil device 10 according to First Embodiment only in the following matters and has structure and effect similar to those of the coil device 10 according to First Embodiment. In the figures, common members with First Embodiment are given common references and are not explained.

Figure 29:
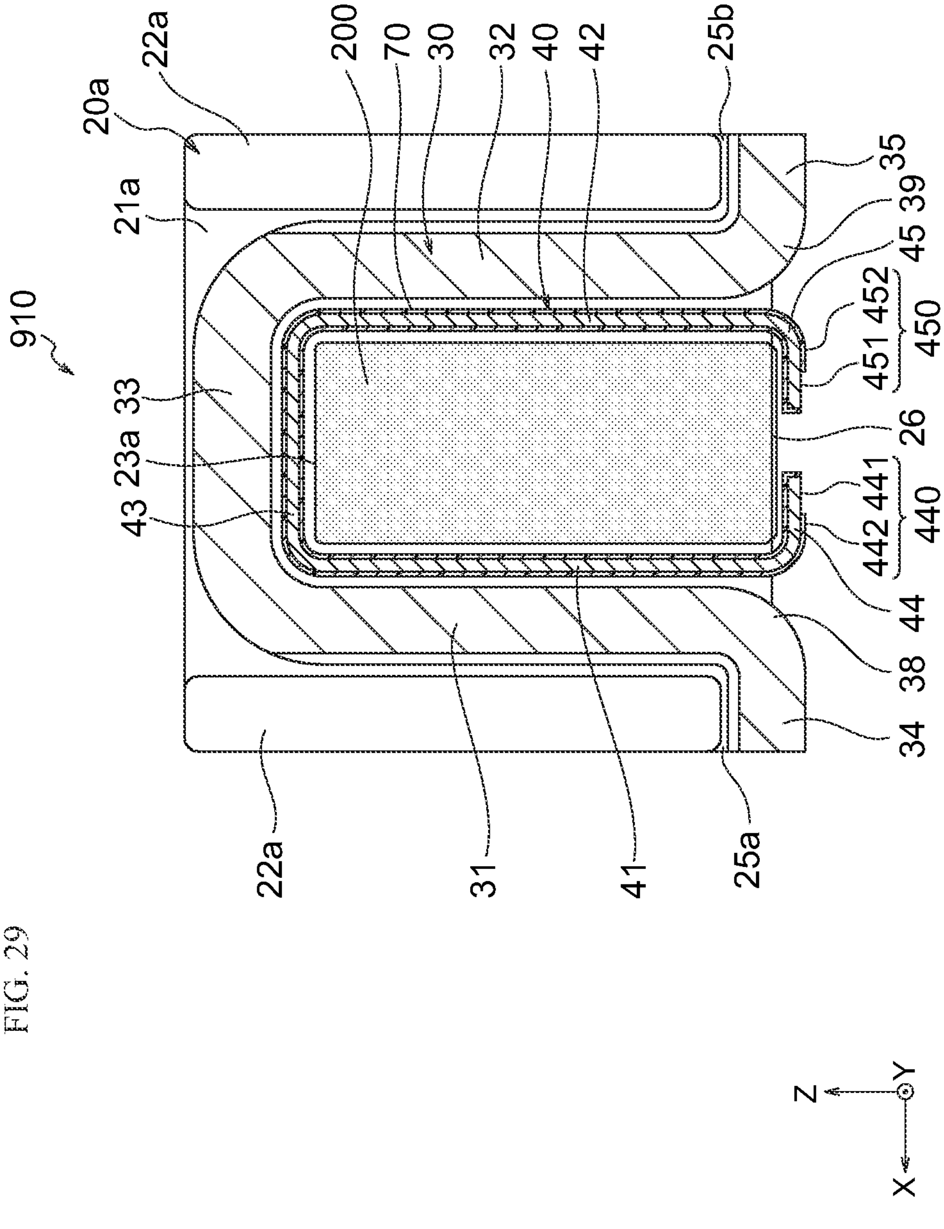
FIG. 29 is a side view illustrating an inside state of a coil device according to Tenth Embodiment of the present invention.
Figure 30:
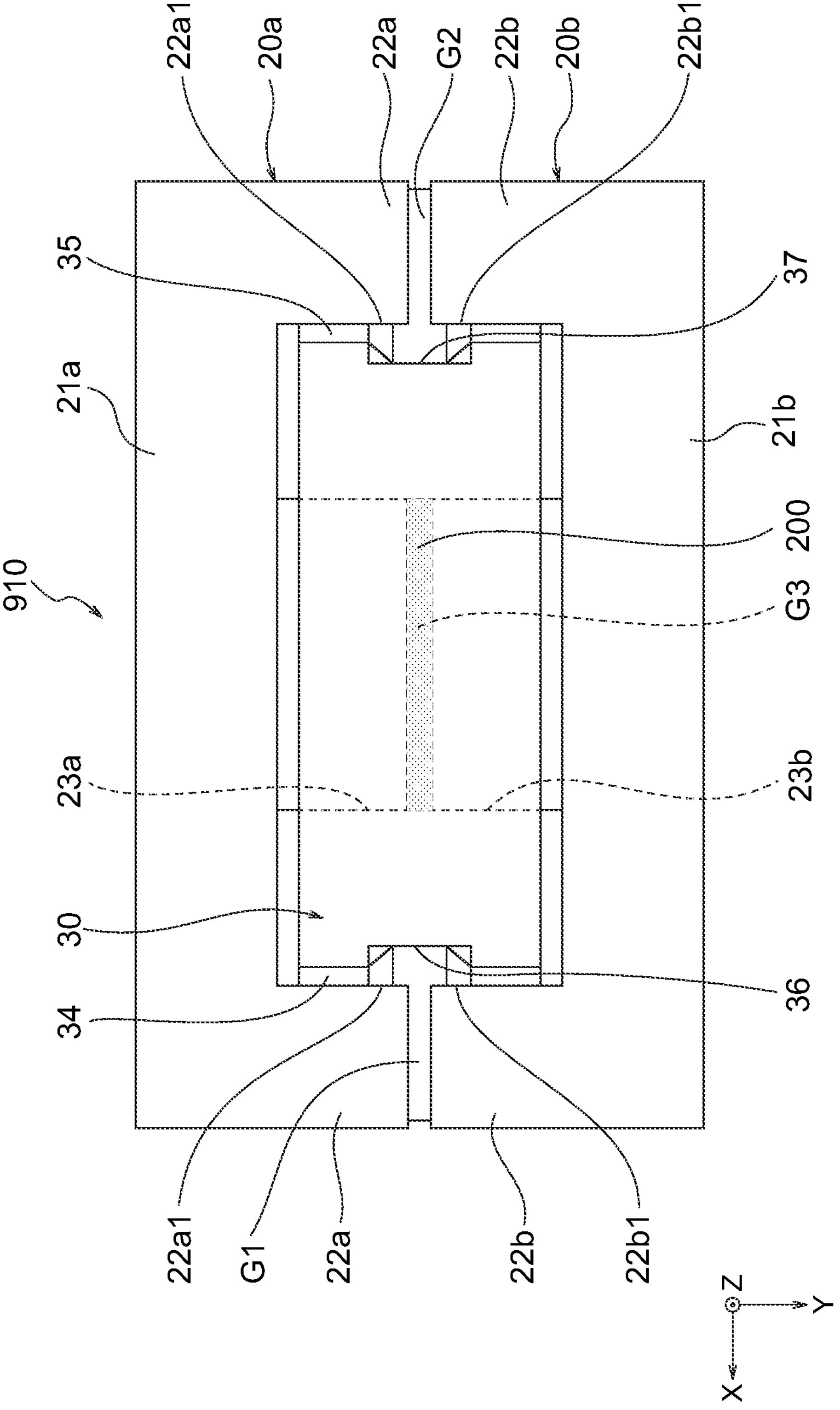
FIG. 30 is a bottom view of the coil device shown in FIG. 29.

In the coil device 910, as shown in FIG. 29 and FIG. 30, the first middle leg 23*a* of the first core 20*a* and the second middle leg 23*b* of the second core 20*b* are connected by a magnetic resin layer 200. The magnetic resin layer 200 is made of a magnetic powder and a resin containing the magnetic powder. Examples of the magnetic powder include metal powder (metal magnetic material) and ferrite. Examples of the ferrite include Ni—Zn based ferrite and Mn—Zn based ferrite. Examples of the resin include epoxy resin, acrylic resin, and urethane resin. The magnetic resin layer 200 is closely attached to the surface of the first middle leg 23*a* on the positive side in the Y-axis direction and is closely attached to the surface of the first middle leg 23*b* on the negative side in the Y-axis direction.

In the present embodiment, the magnetic resin layer 200 is formed (applied) on the whole of the surface of the first middle leg 23*a* on the positive side in the Y-axis direction (and/or the surface of the first middle leg 23*b* on the negative side in the Y-axis direction), but the magnetic resin layer 200 may be formed only on a part of the surface of the first middle leg 23*a* on the positive side in the Y-axis direction (and/or the surface of the first middle leg 23*b* on the negative side in the Y-axis direction). The magnetic resin layer 200 is preferably formed on 30% or more (more preferably 50% or more, particularly preferably 75% or more) of the surface of the first middle leg 23*a* on the positive side in the Y-axis direction (or the surface of the first middle leg 23*b* on the negative side in the Y-axis direction). The larger the area of the magnetic resin layer 200 is, the further the loss of the magnetic flux passing through the first core 20*a* and the second core 20*b* can be reduced. This makes it possible to achieve the coil device 910 having excellent inductance characteristics.

The width of the magnetic resin layer 200 in the Y-axis direction corresponds to that of the gap G3 shown in FIG. 30 in the Y-axis direction and is preferably 0.1-1.0 mm, more preferably 0.1-0.5 mm, but the width of the magnetic resin layer 200 in the Y-axis direction may be smaller than that of the gap G3 in the Y-axis direction. The magnetic resin layer 200 may be formed on only one of the surface of the first middle leg 23*a* on the positive side in the Y-axis direction and the surface of the second middle leg 23*b* on the negative side in the Y-axis direction. In this case, the width of the magnetic resin layer 200 in the Y-axis direction is smaller than that of the gap G3 in the Y-axis direction. Even if the magnetic resin layer 200 is formed on each of the surfaces, the width of the magnetic resin layer 200 in the Y-axis direction is smaller than that of the gap G3 in the Y-axis direction when the magnetic resin layer 200 is not formed so as to straddle the surface of the first middle leg 23*a* on the positive side in the Y-axis direction and the surface of the second middle leg 23*b* on the negative side in the Y-axis direction.

The magnetic resin layer 200 may be formed locally (spot manner) at a plurality of points on the surface of the first middle leg 23*a* on the positive side in the Y-axis direction (or the surface of the second middle leg 23*b* on the negative side in the Y-axis direction). Instead, the magnetic resin layer 200 may be formed continuously or discontinuously only at the outer edge of the surface of the first middle leg 23*a* on the positive side in the Y-axis direction (and/or the surface of the second middle leg 23*b* on the negative side in the Y-axis direction). In this case, the magnetic resin layer 200 may have a ring shape surrounding the outer edge of the surface of the first middle leg 23*a* on the positive side in the Y-axis direction (or the surface of the second middle leg 23*b* on the negative side in the Y-axis direction).

In the coil device 910, although not illustrated in detail, the first outer leg 22*a* of the first core 20*a* and the second outer leg 22*b* of the second core 20*b* may be connected by the magnetic resin layer 200. The magnetic resin layer 200 may be formed on each of a pair of first outer legs 22*a* (and/or a pair of second outer legs 22*b*) or may be formed on only one of a pair of first outer legs 22*a* (and/or a pair of second outer legs 22*b*).

In this case, the magnetic resin layer 200 may also be formed locally (spot manner) at a plurality of points on the surface of the first outer leg 22*a* on the positive side in the Y-axis direction (or the surface of the second middle leg 22*b* on the negative side in the Y-axis direction). Instead, the magnetic resin layer 200 may be formed continuously or discontinuously only at the outer edge of the surface of the first outer leg 22*a* on the positive side in the Y-axis direction (and/or the surface of the second middle leg 22*b* on the negative side in the Y-axis direction). In this case, the magnetic resin layer 200 may have a ring shape surrounding the outer edge of the surface of the first outer leg 22*a* on the positive side in the Y-axis direction (or the surface of the second outer leg 22*b* on the negative side in the Y-axis direction).

When the magnetic resin layer 200 is formed only between the first middle leg 23*a* and the second middle leg 23*b* without forming the magnetic resin layer 200 between the first outer leg 22*a* and the second middle leg 22*b*, however, it is possible to more effectively reduce the loss of the magnetic flux passing through the first core 20*a* and the second core 20*b*, and the coil device 910 having excellent inductance characteristics can be achieved.

The first core 20*a* and the second core 20*b* can be connected more favorably (firmly) by forming a resin layer including no magnetic powder between the first outer leg 22*a* and the second middle leg 22*b* and forming a resin layer (magnetic resin layer 200) including a magnetic powder only between the first middle leg 23*a* and the second middle leg 23*b*.

Incidentally, the present invention is not limited to the above-mentioned embodiments and can variously be modified within the scope of the present invention.

In First Embodiment, the first conductor 30 and the second conductor 40 are insulated by the insulating layer 70 formed on the surface of the second conductor 40, but the first conductor 30 and the second conductor 40 may be insulated by forming the insulating layer 70 on the surface of the first conductor 30 (particularly, the inner surface of the first conductor 30). The insulating layer 70 may be formed on both of the surface of the second conductor 40 and the inner surface of the first conductor 30. This is also the case with Second Embodiment to Fourth Embodiment.

In First Embodiment, the second conductor 40 and the middle legs 23*a* and 23*b* of the cores 20*a* and 20*b* are insulated by the insulating layer 70 formed on the surface of the second conductor 40, but the first conductor 30 and the outer legs 22*a* and 22*b* of the cores 20*a* and 20*b* may be insulated by forming the insulating layer 70 on the surface of the first conductor 30 (particularly, the outer surface of the first conductor 30). Instead, the second conductor 40 and the middle legs 23*a* and 23*b* of the cores 20*a* and 20*b* may be insulated by forming the insulating layer 70 on the outer circumferential surfaces of the middle legs 23*a* and 23*b* of the cores 20*a* and 20*b* (the middle legs 23*a* and 23*b* are subjected to insulation coating), and the first conductor 30 and the outer legs 22*a* and 22*b* of the cores 20*a* and 20*b* may be insulated by forming the insulating layer 70 on the outer circumferential surfaces of the outer legs 22*a* and 22*b* of the cores 20*a* and 20*b* (the outer legs 22*a* and 22*b* are subjected to insulation coating). This is also the case with Second Embodiment to Fourth Embodiment.

In First Embodiment, the insulating layer 70 is formed continuously along the outer surface or the inner surface of the second conductor 40, but may be formed intermittently along the outer surface or the inner surface of the second conductor 40. This is also the case with Second Embodiment to Fourth Embodiment.

In First Embodiment, the first core 20*a* and the second core 20*b* are formed separately, but may be formed integrally. This is also the case with Second Embodiment to Fourth Embodiment.

In First Embodiment, the radius of curvature of the outer surface of the inner bending part 46 (47) of the second conductor 40 is smaller than that of the inner surface of the outer bending part 38 (39) of the first conductor 30, but the radius of curvature of the outer surface of the inner bending part 46 (47) of the second conductor 40 may be larger than that of the inner surface of the outer bending part 38 (39) of the first conductor 30. In this case, similar effects are also obtained. This is also the case with Second Embodiment to Fourth Embodiment.

In each of the above-mentioned embodiments, the insulating layer 70 extends continuously along the inner surface or the outer surface of the second conductor 40, but may extend intermittently along the inner surface or the outer surface of the second conductor 40.

In First Embodiment, as shown in FIG. 3, the insulating coating layer 26 is formed on the bottom surfaces of the middle legs 23*a* and 23*b*, but the insulating coating layer 26 may be formed at any other position. For example, the insulating coating layer 26 may be formed on the entire core 20*a* (20*b*). Instead, the insulating coating layer 26 may be formed on the bottom surfaces of the outer legs 22*a* and 22*b*. In this case, it is possible to favorably insulate the bottom surface of the outer leg 22*a* (22*b*) and the mounting part 34 (35) of the first conductor 30. The bottom surface of the base part 21*a* (21*b*) and the mounting surface of the mounting board can be insulated favorably by forming the insulating coating layer 26 on the bottom surface of the base part 21*a* (21*b*).

Figure 31:
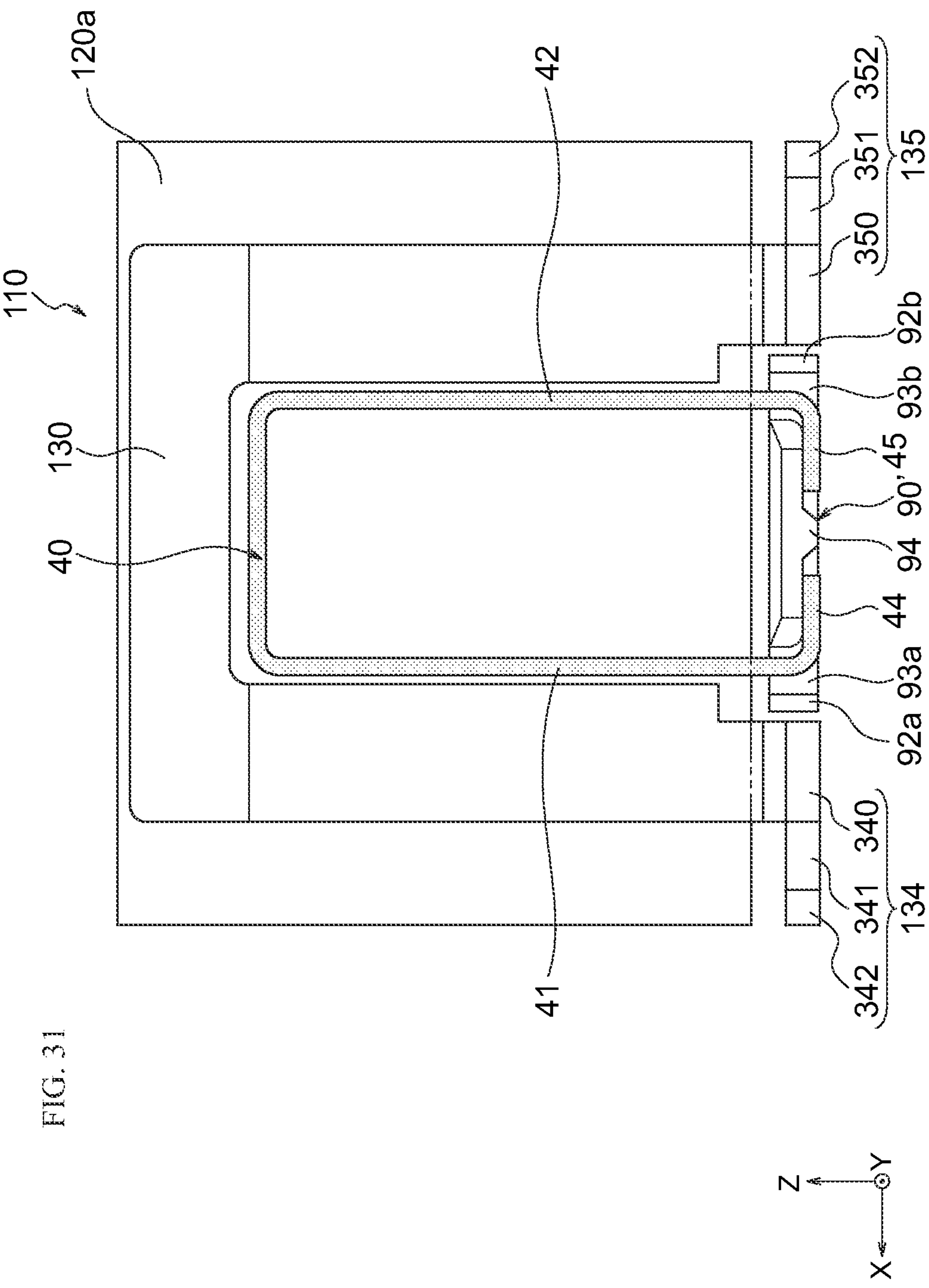
FIG. 31 is a side view illustrating an inside state of a modified example of the coil device shown in FIG. 4A.
Figure 32:
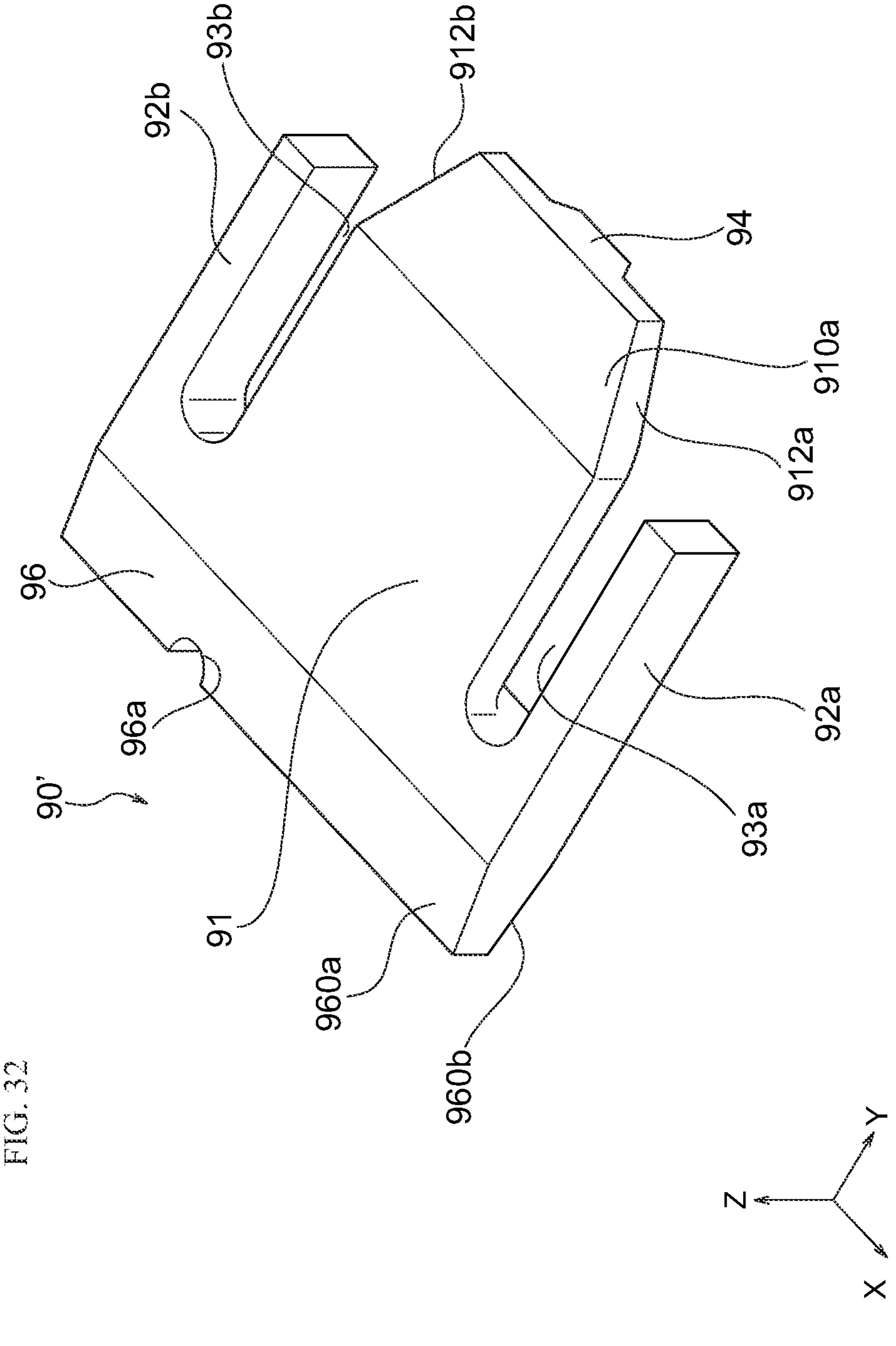
FIG. 32 is a perspective view of a resin spacer shown in FIG. 31.

As shown in FIG. 29, the coil device 110 according to Second Embodiment (FIG. 4A) may be provided with the resin spacer 90 shown in FIG. 14A or a resin spacer 90' shown in FIG. 32 by applying Fifth Embodiment to Second Embodiment. The resin spacer 90' shown in FIG. 32 is different from the resin spacer 90 shown in FIG. 14 in that the side insulating part 92*a* (92*b*) is not provided with the inclined part 95*a* (95*b*). As shown in FIG. 31, the mounting bending parts 340 and 350 of the mounting parts 134 and 135 of the first conductor 130 are arranged next to each other on the side of the side insulating parts 92*a* and 92*b* in the X-axis direction, but the side surface shape of the mounting bending part 340 (350) on the inner side in the X-axis direction is a vertical shape, and the side insulating part 92*a* (92*b*) does not thereby interfere (contact) with the mounting bending part 340 (350) even if the side insulating part 92*a* (92*b*) is not provided with the inclined part 95*a* (95*b*).

Figure 33A:
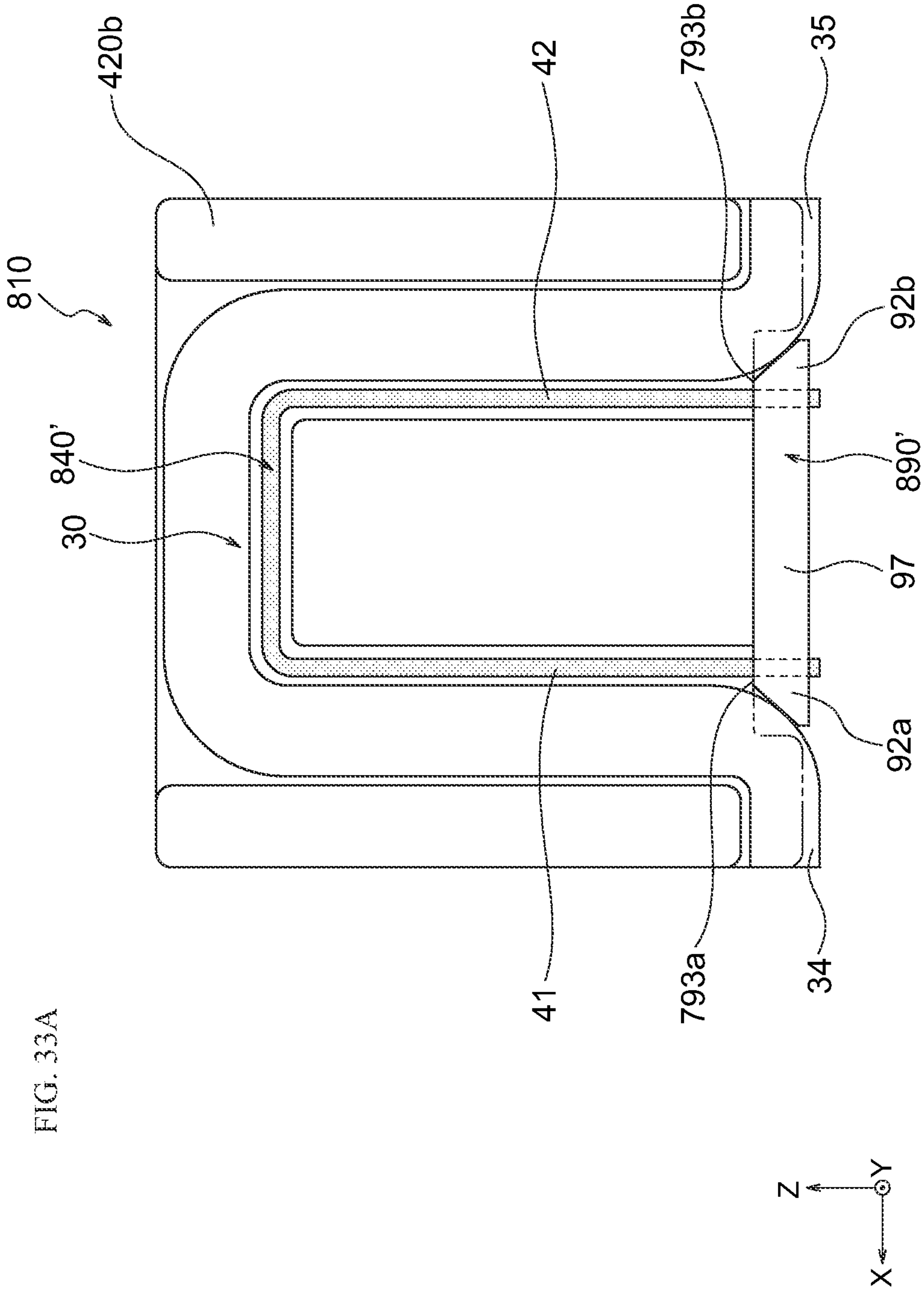
FIG. 33A is a side view illustrating an inside state of a modified example of the coil device shown in FIG. 27.
Figure 33B:
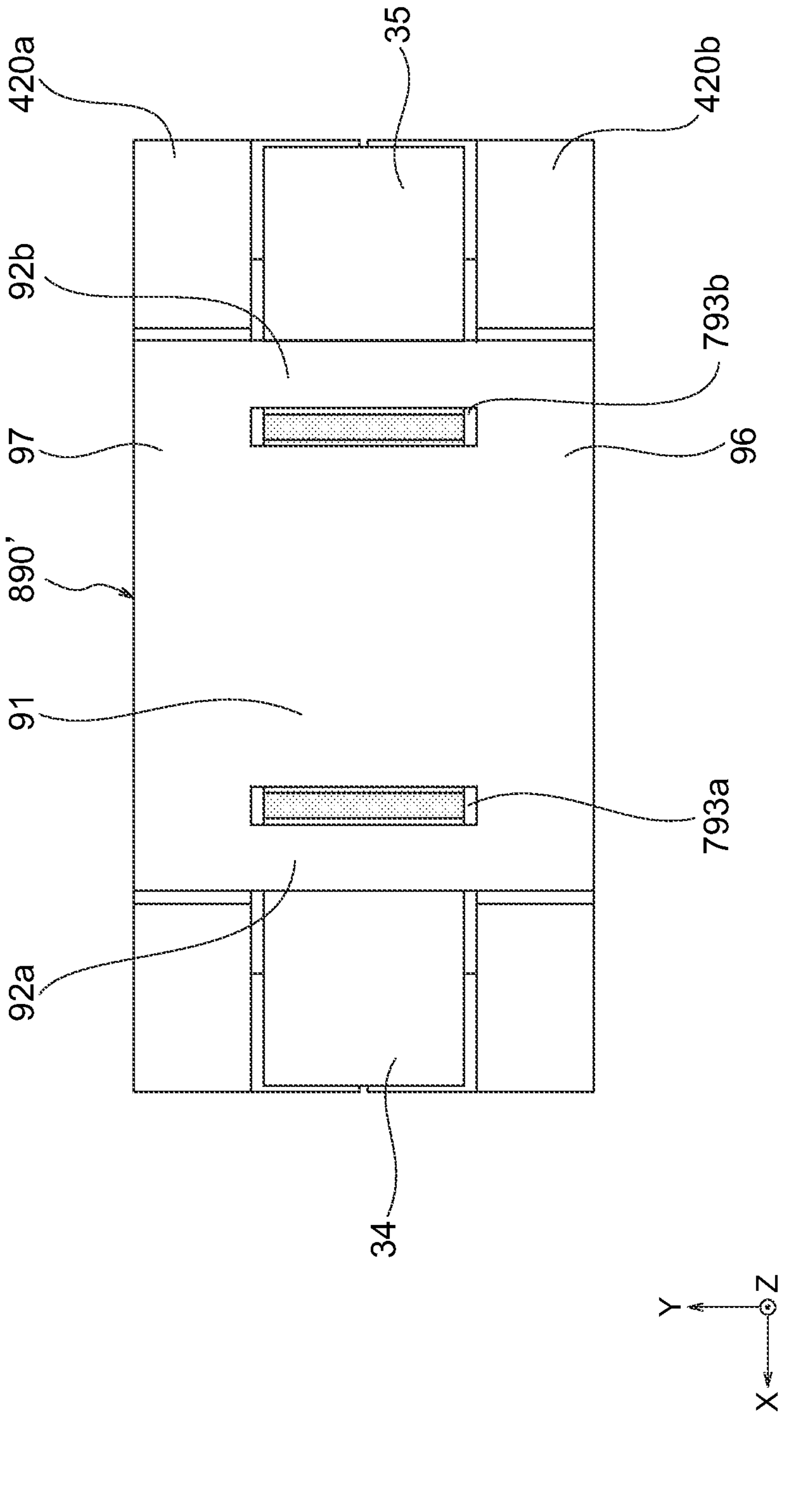
FIG. 33B is a bottom view of the coil device shown in FIG. 33A.

In Ninth Embodiment, the second conductor 840 shown in FIG. 27 may not be provided with the side bending parts 48 and 49. In this case, as shown in FIG. 33A, the conductor side part 41 (42) of a second conductor 840' has a linear shape linearly extending in the Z-axis direction. Thus, as shown in FIG. 33B, a resin spacer 890' may not be provided with the side step parts 920*a* and 920*b* shown in FIG. 28. This is because, although the side step parts 920*a* and 920*b* are provided for arranging the side bending parts 48 and 49, unlike the second conductor 840 shown in FIG. 27, the second conductor 840' shown in FIG. 33A is not provided with the side bending parts 48 and 49. As shown in FIG. 33A, the lower ends of the conductor side parts 41 and 42 of the second conductor 840' protrude downward from the lower surface of the resin spacer 890'. The side bending parts 48 and 49 of the second conductor 840' can be connected to a land pattern of the mounting board using, for example, solder via the protrusions of the conductor side parts 41 and 42.

The coil devices according to Second Embodiment to Ninth Embodiment may be provided with the magnetic resin layer 200 by applying Tenth Embodiment to Second Embodiment to Ninth Embodiment.

In First Embodiment, the tape member 60 shown in FIG. 1C is pre-printed with characters (identifiers) such as serial number, but the tape member 60 may be a plain tape member on which no characters are printed.

DESCRIPTION OF THE REFERENCE NUMERICAL

10, 110, 210, 310, 410, 510, 610, 710, 810, 910 . . . coil device
20*a*, 120*a*, 420*a*, 620*a* . . . first core
20*b*, 120*b*, 220*b*, 420*b*, 620*b* . . . second core
21*a*, 621*b* . . . first base
21*b* . . . second base
22*a*, 122*a* . . . first outer leg
22*a*1, 122*a*1 . . . first outer leg edge
22*b* . . . second outer leg
22*b*1 . . . second outer leg edge
23*a* . . . first middle leg
23*b* . . . second middle leg
24*a* . . . first groove
24*b* . . . second groove
241 . . . first side part
242 . . . second side part
243 . . . upper part
25*a* . . . first side groove
25*b* . . . second side groove
26 . . . insulating coating layer
27 . . . bottom-surface concave part
27*a*, 27*b* . . . bottom-surface convex part
28 . . . side-surface concave part
28*a* . . . arm installation part
28*b* . . . engagement concave part
30, 130 . . . first conductor
31, 131 . . . first conductor side part
32, 132 . . . second conductor side part
33, 133 . . . conductor upper part
34, 134 . . . first mounting part
340 . . . first mounting bending part
341 . . . first mounting connection part
343 . . . first mounting body part
35, 135 . . . second mounting part
350 . . . second mounting bending part
351 . . . second mounting connection part
353 . . . second mounting body part
36, 136 . . . first outer notch
37, 137 . . . second outer notch
38 . . . first outer bending part
39 . . . second outer bending part
40, 240, 840, 840' . . . second conductor
41 . . . first conductor side part
42 . . . second conductor side part
43 . . . conductor upper part
44, 244 . . . first mounting part
440, 440' . . . mount facing surface
441, 441' . . . joinable surface
442 . . . non-joinable surface
443 . . . standing part
45, 245 . . . second mounting part
450, 450' . . . mount facing surface
451, 451' . . . joinable surface
452 . . . non-joinable surface
453 . . . standing part
46 . . . first inner bending part
47 . . . second inner bending part
48 . . . first side bending part
49 . . . second side bending part
50 . . . mounting surface of mounting board
60 . . . tape member
70 . . . insulating layer
80, 90, 590, 690, 790, 890, 890' . . . resin spacer
91 . . . inner insulating part
911*a*, 911*b* . . . step surface
910*a*, 910*b*, 960*a*, 960*b* . . . outer inclined part
912*a*, 912*b* . . . side inclined part
913*a*, 913*b* . . . spacer concave part
92*a*, 92*b* . . . side insulating part
920*a*, 920*b* . . . side step part
93*a*, 593*a*, 793*a* . . . first groove (first gap)
93*b*, 593*b*, 793*b* . . . second groove (second gap)
94 . . . protrusion part
94*a*, 94*b* . . . bottom inclined part
95*a*, 95*b* . . . inclined part
96, 97 . . . connection part
96*a* . . . notch part
98 . . . bottom surface groove
99*a*, 99*b* . . . arm part
990*a*, 990*b* . . . arm main body part
991*a*, 991*b* . . . convex part
100 . . . jig
110 . . . jig main body part
120 . . . conductor fixation part
130 . . . spacer insertion part
140 . . . conductor installation part
200 . . . magnetic resin layer

What is claimed is:

1. A coil device comprising:
a first conductor;
a second conductor disposed inside the first conductor and at least partly extending along the first conductor;
a core for internally arranging the first conductor and the second conductor; and
an insulating layer is formed at least between the first conductor and the second conductor, wherein the second conductor includes a mount facing surface capable of facing a mounting surface, the mount facing surface consists of a joinable surface not including the insulating layer and a non-joinable surface including the insulating layer, and the non-joinable surface is located closer to the first conductor than the joinable surface.

2. The coil device according to claim 1, wherein the second conductor is made of a flat wire, and the insulating layer is made of an insulating film formed on a surface of the second conductor.

3. The coil device according to claim 1, wherein the first conductor and the second conductor are adhered via a fusion layer formed by fusing the insulating layer formed on a surface of the second conductor.

4. The coil device according to claim 1, wherein the insulating layer is formed between the core and the first conductor or the second conductor.

5. The coil device according to claim 1, wherein the first conductor is made of a conductive plate with a plating layer formed on a surface of the conductive plate.

6. The coil device according to claim 1, wherein the joinable surface includes a standing part standing from the mounting surface.

7. The coil device according to claim 1, wherein an outer bending part bending outward is provided at an end of the first conductor, an inner bending part bending inward is provided at an end of the second conductor, and a radius of curvature of an inner surface of the outer bending part is larger than that of an outer surface of the inner bending part.

8. The coil device according to claim 1, wherein a cross-sectional area of the first conductor perpendicular to its extending direction is larger than that of the second conductor perpendicular to its extending direction.

9. The coil device according to claim 1, wherein a bottom surface of the core is disposed away from a mounting surface.

10. The coil device according to claim 1, wherein an insulating coating layer is provided at least on a bottom surface of the core.

11. The coil device according to claim 1, wherein a mounting part of the first conductor and a mounting part of the second conductor are insulated by a resin spacer.

12. A coil device comprising:

a first conductor including a first outer mounting part formed at one end and a second outer mounting part formed at the other end;

a second conductor disposed inside the first conductor and including a first inner mounting part formed at one end and a second inner mounting part formed at the other end;

a core for internally arranging the first conductor and the second conductor; and a resin spacer including:

a first side insulating part disposed between the first outer mounting part and the first inner mounting part; and a second side insulating part disposed between the second outer mounting part and the second inner mounting part, wherein the resin spacer includes an inner insulating part disposed between one end and the other end of the second conductor and disposed between a bottom surface of the core and the first inner mounting part or between the bottom surface of the core and the second inner mounting part, a first gap is formed between the first side insulating part and one end of the inner insulating part in a first direction, a second gap is formed between the second side insulating part and the other end of the inner insulating part in the first direction, the first side insulating part, the second side insulating part, and the inner insulating part extend in a second direction perpendicular to the first direction, and the resin spacer includes a first connection part connecting one ends in the second direction of the first side insulating part, the second side insulating part, and the inner insulating part along the first direction.

13. The coil device according to claim 12, wherein a bottom surface of the resin spacer is disposed higher than bottom surfaces of the first inner mounting part and the second inner mounting part and is disposed higher than bottom surfaces of the first outer mounting part and the second outer mounting part.

14. The coil device according to claim 12, wherein a first outer inclined part inclined so as to be lower outward in the second direction is formed on at least one of an upper surface and a lower surface of the first connection part.

15. The coil device according to claim 12, wherein a second outer inclined part inclined so as to be lower outward in the second direction is formed on at least one of an upper surface and a lower surface of the inner insulating part at the other end of the inner insulating part located opposite to the first connection part in the second direction.

16. The coil device according to claim 12, wherein a width of the inner insulating part in the first direction becomes smaller toward outside in the second direction at the other end of the inner insulating part located opposite to the first connection part in the second direction.

17. The coil device according to claim 12, wherein the resin spacer includes a protrusion part protruding from a bottom surface of the resin spacer and at least partly disposed between a first tip of the first inner mounting part and a second tip of the second inner mounting part.

18. The coil device according to claim 17, wherein a first step surface located on one side of the protrusion part and a second step surface located on the other side of the protrusion part are formed on the bottom surface of the resin spacer, the first inner mounting part is in contact with the first step surface, and the second inner mounting part is in contact with the second step surface.

19. The coil device according to claim 12, wherein a first gap is formed between the first side insulating part and one end of the inner insulating part in a first direction, a second gap is formed between the second side insulating part and the other end of the inner insulating part in the first direction, the first side insulating part, the second side insulating part, and the inner insulating part extend in a second direction perpendicular to the first direction, and the resin spacer includes:

a first connection part connecting one ends in the second direction of the first side insulating part, the second side insulating part, and the inner insulating part along the first direction; and a second connection part connecting the other ends in the second direction of the first side insulating part, the second side insulating part, and the inner insulating part along the first direction.

20. The coil device according to claim 19, wherein a first concave part located on one side in the first direction and a second concave part located on the other side in the first direction are formed on a bottom surface of the resin spacer, the first inner mounting part is housed in the first concave part, and the second inner mounting part is housed in the second concave part.

21. The coil device according to claim 19, wherein the resin spacer includes a first arm part standing from the first connection part and a second arm part standing from the second connection part, a first convex part protruding inward in the second direction is formed at a tip of the first arm part, a second convex part protruding inward in the second direction is formed at a tip of the second arm part, a first concave part is formed on a side surface of the core on one side in the second direction, a second concave part is formed on a side surface of the core on the other side in the second direction, the first convex part engages with the first concave part, and the second convex part engages with the second concave part.

22. The coil device according to claim 12, wherein a third inclined part inclined so as to be lower outward is formed at a position facing the first outer mounting part on a surface of the first side insulating part, and a fourth inclined part inclined so as to be lower outward is formed at a position facing the second outer mounting part on a surface of the second side insulating part.

23. The coil device according to claim 12, wherein one of the first inner mounting part and the first outer mounting part has a bent shape bent in a substantially L-shaped manner, the other of the first inner mounting part and the first outer mounting part has a substantially linear shape, one of the second inner mounting part and the second outer mounting part has a bent shape bent in a substantially L-shaped manner, and the other of the second inner mounting part and the second outer mounting part has a substantially linear shape.

24. A coil device comprising:

a first conductor including a first outer mounting part formed at one end and a second outer mounting part formed at the other end;

a second conductor disposed inside the first conductor and including a first inner mounting part formed at one end and a second inner mounting part formed at the other end;

a core for internally arranging the first conductor and the second conductor; and a resin spacer including:

a first side insulating part disposed between the first outer mounting part and the first inner mounting part; and a second side insulating part disposed between the second outer mounting part and the second inner mounting part, wherein the resin spacer includes a protrusion part protruding from a bottom surface of the resin spacer and at least partly disposed between a first tip of the first inner mounting part and a second tip of the second inner mounting part.

25. The coil device according to claim 24, wherein a first step surface located on one side of the protrusion part and a second step surface located on the other side of the protrusion part are formed on the bottom surface of the resin spacer, the first inner mounting part is in contact with the first step surface, and the second inner mounting part is in contact with the second step surface.

26. A coil device comprising:

a first conductor including a first outer mounting part formed at one end and a second outer mounting part formed at the other end;

a second conductor disposed inside the first conductor and including a first inner mounting part formed at one end and a second inner mounting part formed at the other end;

a core for internally arranging the first conductor and the second conductor; and a resin spacer including:

a first side insulating part disposed between the first outer mounting part and the first inner mounting part; and a second side insulating part disposed between the second outer mounting part and the second inner mounting part, wherein a third inclined part inclined so as to be lower outward is formed at a position facing the first outer mounting part on a surface of the first side insulating part, and a fourth inclined part inclined so as to be lower outward is formed at a position facing the second outer mounting part on a surface of the second side insulating part.

* * * * *